(12) United States Patent
Roper, Jr. et al.

(10) Patent No.: US 12,488,131 B2
(45) Date of Patent: Dec. 2, 2025

(54) MULTIMODAL DIGITAL DOCUMENT INTERFACES FOR DYNAMIC AND COLLABORATIVE REVIEWS

(71) Applicant: Istari Digital, Inc., Charleston, SC (US)

(72) Inventors: William Roper, Jr., Charleston, SC (US); Christopher Lee Benson, Arlington, VA (US); Sriram Krishnan, Cambridge, MA (US); Christopher Alexis Kotelly, Boston, MA (US); Eric Watz, Beavercreek, OH (US); Abraham Aldaraca, Pittsburgh, PA (US); James C. Pavur, Arlington, VA (US); Hillary Hester, Birmingham, AL (US); Ross Billings, Reisterstown, MD (US); Kyle Caldwell, Framingham, MA (US); Michael Welles, Brooklyn, NY (US)

(73) Assignee: Istari Digital, Inc., Charleston, SC (US)

( * ) Notice: Subject to any disclaimer, the term of this patent is extended or adjusted under 35 U.S.C. 154(b) by 0 days.

(21) Appl. No.: 19/067,938

(22) Filed: Mar. 2, 2025

(65) Prior Publication Data
US 2025/0200208 A1 Jun. 19, 2025

Related U.S. Application Data

(63) Continuation of application No. PCT/US2024/044938, filed on Sep. 1, 2024.
(Continued)

(51) Int. Cl.
*G06F 21/62* (2013.01)

(52) U.S. Cl.
CPC ............... *G06F 21/6218* (2013.01)

(58) Field of Classification Search
CPC .................................................. G06F 21/6218
(Continued)

(56) References Cited

U.S. PATENT DOCUMENTS

| | | | | |
|---|---|---|---|---|
| 6,049,766 A | * | 4/2000 | Laroche | G10L 21/01 704/503 |
| 6,549,221 B1 | * | 4/2003 | Brown | G06F 9/451 715/767 |

(Continued)

FOREIGN PATENT DOCUMENTS

| | | | | |
|---|---|---|---|---|
| CN | 114362358 A | * | 4/2022 | |
| JP | 2004537187 A | * | 12/2004 | H04L 65/1104 |

(Continued)

OTHER PUBLICATIONS

Ciortea, Andrei, Antoine Zimmermann, Olivier Boissier, and Adina Magda Florea. "Towards a social and ubiquitous web: A model for socio-technical networks." In 2015 IEEE/WIC/ACM International Conference on Web Intelligence and Intelligent Agent Technology (WI-IAT), vol. 1, pp. 461-468. IEEE, 2015. (Year: 2015).*

(Continued)

*Primary Examiner* — Luu T Pham
*Assistant Examiner* — Walter J Malinowski
(74) *Attorney, Agent, or Firm* — American Patent Agency PC; Daniar Hussain; Stephen M. Hou

(57) ABSTRACT

Methods and systems for a document review process are provided. The method includes receiving an input digital model representation comprising at least one externally-accessible model endpoint for generating a digital artifact. Then, generating a document splice comprising access to multiple document subunits, with at least one document subunit written in a natural language and comprising the digital artifact; the access to each document subunit is provided through an externally-accessible document end- (Continued)

point for the subunit. Then, generating a document by combining the document subunits, and generating a view associated with the document, based on an user authorization result including selective access rights to the document subunits. The view comprises access to the digital model representation, the digital artifact, each document subunit, and the document. Finally, receiving a user input and updating, via one of the externally-accessible document endpoints, the document splice based on the user input.

18 Claims, 33 Drawing Sheets

Related U.S. Application Data

(60) Provisional application No. 63/590,420, filed on Oct. 14, 2023, provisional application No. 63/580,384, filed on Sep. 3, 2023.

(58) Field of Classification Search
USPC .......................................................... 726/28
See application file for complete search history.

(56) References Cited

U.S. PATENT DOCUMENTS

| | | | | |
|---|---|---|---|---|
| 6,812,941 | B1* | 11/2004 | Brown | G06F 16/9577 715/767 |
| 8,886,798 | B2* | 11/2014 | Richards | H04W 4/08 709/224 |
| 10,417,679 | B1* | 9/2019 | Furbish | G06Q 30/0609 |
| 10,831,704 | B1 | 11/2020 | Sanchez et al. | |
| 11,107,209 | B2 | 8/2021 | Srivastava et al. | |
| 11,212,316 | B2 | 12/2021 | Sweeney et al. | |
| 12,367,015 | B2* | 7/2025 | Roper, Jr. | G06F 30/27 |
| 2006/0015291 | A1* | 1/2006 | Parks | G16B 45/00 702/179 |
| 2008/0019299 | A1* | 1/2008 | Lekutai | G01W 1/02 370/328 |
| 2009/0204585 | A1* | 8/2009 | Shigeeda | G06F 16/93 |
| 2012/0117516 | A1* | 5/2012 | Guinness | G06F 16/211 715/853 |
| 2013/0002647 | A1 | 1/2013 | Bacus et al. | |
| 2014/0365347 | A1* | 12/2014 | Murray | G06Q 40/12 705/30 |
| 2017/0013014 | A1* | 1/2017 | Foster | H04L 43/062 |
| 2018/0027006 | A1* | 1/2018 | Zimmermann | H04L 63/0227 726/11 |
| 2018/0341631 | A1* | 11/2018 | Verma | G06F 40/30 |
| 2019/0042206 | A1* | 2/2019 | Hulbert | H04L 61/5076 |
| 2019/0180029 | A1* | 6/2019 | Copty | G06F 21/56 |
| 2019/0236661 | A1* | 8/2019 | Hogg | G06F 16/9537 |
| 2019/0340518 | A1* | 11/2019 | Merrill | G06N 5/022 |
| 2020/0153855 | A1 | 5/2020 | Kirti et al. | |
| 2020/0241716 | A1* | 7/2020 | Sowden | G06N 3/08 |
| 2021/0099478 | A1* | 4/2021 | Seetharamaiah | H04L 63/1433 |
| 2022/0046059 | A1* | 2/2022 | Pandurangi | H04L 63/20 |
| 2022/0164701 | A1* | 5/2022 | Shrivastava | G06F 30/27 |
| 2022/0269601 | A1* | 8/2022 | Monteith | G06F 3/0652 |
| 2022/0277018 | A1* | 9/2022 | Umay | G06F 9/547 |
| 2022/0308943 | A1* | 9/2022 | Srinivasan | G06F 40/40 |
| 2023/0328123 | A1* | 10/2023 | Bonnett-Brooks | H04L 63/10 370/498 |
| 2023/0409293 | A1* | 12/2023 | Batygin | G06N 3/08 |
| 2024/0028414 | A1* | 1/2024 | Vasanad | G06F 9/5077 |
| 2024/0223628 | A1* | 7/2024 | Kumar | H04L 65/4015 |
| 2024/0370828 | A1* | 11/2024 | Michael | G06Q 10/103 |
| 2025/0200253 | A1* | 6/2025 | Roper, Jr. | G06F 8/30 |
| 2025/0217114 | A1* | 7/2025 | Roper, Jr. | G06N 20/00 |
| 2025/0272459 | A1* | 8/2025 | Roper, Jr. | G06F 8/36 |

FOREIGN PATENT DOCUMENTS

| | | | | |
|---|---|---|---|---|
| JP | 2014183585 A | * | 9/2014 | ........ H04L 41/0213 |
| WO | WO-2018201182 A1 | * | 11/2018 | ............ G16H 40/20 |
| WO | 2022047332 A1 | | 3/2022 | |
| WO | WO-2022104297 A1 | * | 5/2022 | |
| WO | 2022234240 A1 | | 11/2022 | |

OTHER PUBLICATIONS

Vogt, Lars, Roman Baum, Philipp Bhatty, Christian Köhler, Sandra Meid, Björn Quast, and Peter Grobe. "SOCCOMAS: a FAIR web content management system that uses knowledge graphs and that is based on semantic programming." Database 2019 (2019): baz067. (Year: 2019).*

Gladney, Henry M. "A storage subsystem for image and records management." IBM Systems Journal 32, No. 3 (1993): 512-540. (Year: 1993).*

International Search Report and Written Opinion of PCT Application No. PCT/US2024/044938, mailed on Nov. 25, 2024, 13 pages.

* cited by examiner

FIG. 21

MULTIMODAL DIGITAL DOCUMENT INTERFACES FOR DYNAMIC AND COLLABORATIVE REVIEWS

REFERENCE TO RELATED APPLICATIONS

If an Application Data Sheet ("ADS") or PCT Request Form ("Request") has been filed on the filing date of this application, it is incorporated by reference herein. Any applications claimed on the ADS or Request for priority under 35 U.S.C. §§ 119, 120, 121, or 365 (c), and any and all parent, grandparent, great-grandparent, etc. applications of such applications, are also incorporated by reference, including any priority claims made in those applications and any material incorporated by reference, to the extent such subject matter is not inconsistent herewith.

Furthermore, this application is related to the U.S. patent applications listed below, which are incorporated by reference in their entireties herein, as if fully set forth herein:

PCT patent application No. PCT/US24/35885, filed on Jun. 27, 2024, entitled "Artificial Intelligence (AI) Assisted Integration of New Digital Model Types and Tools into Integrated Digital Model Platform," describes the enhancement of model splicer technology through AI-assistance.

PCT patent application No. PCT/US24/27912, filed on May 5, 2024, entitled "Secure and Scalable Sharing of Digital Engineering Documents," describes secure and scalable document splicing technology.

PCT patent application No. PCT/US24/27898, filed on May 4, 2024, entitled "Digital Twin Enhancement using External Feedback within Integrated Digital Model Platform," describes digital and physical twin management and the integration of external feedback within a DE platform.

PCT patent application No. PCT/US24/19297, filed on Mar. 10, 2024, entitled "Software-Code-Defined Digital Threads in Digital Engineering Systems with Artificial Intelligence (AI) Assistance," describes AI-assisted digital threads for digital engineering platforms.

PCT patent application No. PCT/US24/18278, filed on Mar. 3, 2024, entitled "Secure and Scalable Model Splicing of Digital Engineering Models for Software-Code-Defined Digital Threads," describes model splicing for digital engineering platforms.

PCT patent application No. PCT/US24/14030, filed on Feb. 1, 2024, entitled "Artificial Intelligence (AI) Assisted Digital Documentation for Digital Engineering," describes AI-assisted documentation for digital engineering platforms.

U.S. provisional patent application No. 63/442,659, filed on Feb. 1, 2023, entitled "AI-Assisted Digital Documentation for Digital Engineering with Supporting Systems and Methods," describes AI-assistance tools for digital engineering (DE), including modeling and simulation applications, and the certification of digitally engineered products.

U.S. provisional patent application No. 63/451,545, filed on Mar. 10, 2023, entitled "Digital Threads in Digital Engineering Systems, and Supporting AI-Assisted Digital Thread Generation," describes model splicer and digital threading technology.

U.S. provisional patent application No. 63/451,577, filed on Mar. 11, 2023, entitled "Model Splicer and Microservice Architecture for Digital Engineering," describes model splicer technology.

U.S. provisional patent application No. 63/462,988, filed on Apr. 29, 2023, also entitled "Model Splicer and Microservice Architecture for Digital Engineering," describes model splicer technology.

U.S. provisional patent application No. 63/511,583, filed on Jun. 30, 2023, entitled "AI-Assisted Model Splicer Generation for Digital Engineering," describes model splicer technology with AI-assistance.

U.S. provisional patent application No. 63/516,624, filed on Jul. 31, 2023, entitled "Document and Model Splicing for Digital Engineering," describes document splicer technology.

U.S. provisional patent application No. 63/520,643, filed on Aug. 20, 2023, entitled "Artificial Intelligence (AI)-Assisted Automation of Testing in a Software Environment," describes software testing with AI-assistance.

U.S. provisional patent application No. 63/590,420, filed on Oct. 14, 2023, entitled "Commenting and Collaboration Capability within Digital Engineering Platform," describes collaborative capabilities.

U.S. provisional patent application No. 63/586,384, filed on Sep. 28, 2023, entitled "Artificial Intelligence (AI)-Assisted Streamlined Model Splice Generation, Unit Testing, and Documentation," describes streamlined model splicing, testing and documentation with AI-assistance.

U.S. provisional patent application No. 63/470,870, filed on Jun. 3, 2023, entitled "Digital Twin and Physical Twin Management with Integrated External Feedback within a Digital Engineering Platform," describes digital and physical twin management and the integration of external feedback within a DE platform.

U.S. provisional patent application No. 63/515,071, filed on Jul. 21, 2023, entitled "Generative Artificial Intelligence (AI) for Digital Engineering," describes an AI-enabled digital engineering task fulfillment process within a DE software platform.

U.S. provisional patent application No. 63/517,136, filed on Aug. 2, 2023, entitled "Machine Learning Engine for Workflow Enhancement in Digital Engineering," describes a machine learning engine for model splicing and DE script generation.

U.S. provisional patent application No. 63/516,891, filed on Aug. 1, 2023, entitled "Multimodal User Interfaces for Digital Engineering," describes multimodal user interfaces for DE systems.

U.S. provisional patent application No. 63/580,384, filed on Sep. 3, 2023, entitled "Multimodal Digital Engineering Document Interfaces for Certification and Security Reviews," describes multimodal user interfaces for certification and security reviews.

U.S. provisional patent application No. 63/613,556, filed on Dec. 21, 2023, entitled "Alternative Tool Selection and Optimization in an Integrated Digital Engineering Platform," describes tool selection and optimization.

U.S. provisional patent application No. 63/584,165, filed on Sep. 20, 2023, entitled "Methods and Systems for Improving Workflows in Digital Engineering," describes workflow optimization in a DE platform.

U.S. provisional patent application No. 63/590,456, filed on Oct. 15, 2023, entitled "Data Sovereignty Assurance for Artificial Intelligence (AI) Models," relates to data sovereignty assurance during AI model training and evaluation.

U.S. provisional patent application No. 63/606,030, filed on Dec. 4, 2023, also entitled "Data Sovereignty Assurance for Artificial Intelligence (AI) Models," further details data sovereignty assurances during AI model training and evaluation.

U.S. provisional patent application No. 63/419,051, filed on Oct. 25, 2022, entitled "Interconnected Digital Engineering and Certification Ecosystem."

U.S. non-provisional patent application Ser. No. 17/973,142 filed on Oct. 25, 2022, entitled "Interconnected Digital Engineering and Certification Ecosystem."

U.S. non-provisional patent application Ser. No. 18/383,635, filed on Oct. 25, 2023, entitled "Interconnected Digital Engineering and Certification Ecosystem."

U.S. provisional patent application No. 63/489,401, filed on Mar. 9, 2023, entitled "Security Architecture for Interconnected Digital Engineering and Certification Ecosystem."

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

ISTARI DIGITAL is a trademark name carrying embodiments of the present invention, and hence, the aforementioned trademark name may be interchangeably used in the specification and drawings to refer to the products/process offered by embodiments of the present invention. The terms ISTARI and ISTARI DIGITAL may be used in this specification to describe the present invention, as well as the company providing said invention.

FIELD OF THE INVENTION

This invention relates to digital software platforms, and more specifically to digital document interfaces for collaborative document reviews within said digital software platforms.

BACKGROUND OF THE INVENTION

The statements in the background of the invention are provided to assist with understanding the invention and its applications and uses, and may not constitute prior art.

Digital workflows that thread digital models have become indispensable across various fields of human endeavor, revolutionizing how tasks are accomplished. From healthcare and finance to manufacturing and creative industries, these automated sequences of digital operations streamline complex procedures, enhance collaboration, and boost productivity. Digital engineering (DE), an integrated digital approach to systems engineering, exemplifies this trend by utilizing authoritative sources of system data and digital models across disciplines to support lifecycle activities from conception through disposal.

As an iterative process, digital engineering relies heavily on structured reviews conducted at various stages of a project's lifecycle to assess progress, identify issues, and make informed decisions. Some common types of DE reviews include, but are not limited to, requirements reviews, preliminary design reviews (PDR), alternative systems review (ASR), critical design reviews (CDR), and verification and validation (V&V) reviews. These reviews generate a multitude of documents that are frequently updated and tracked throughout the digitally engineered product lifecycle, confirming specific processes and adhering to stringent design, material, cost, and V&V requirements.

The dynamic nature of DE review documents, which are often updated based on new information or changes in underlying digital models and digital workflow, poses significant challenges for human reviewers. The sheer volume, complexity, and frequent updates of these documents make it difficult for reviewers to keep track of changes and make informed decisions based on the latest data. This is further complicated by the interconnected nature of DE, where changes in one digital model can propagate to other models within the same complex system, creating an exponential effect when multiple reviewers are involved. Similar issues are seen in digital workflows generally outside the confines of digital engineering.

Therefore, there is an unsolved need for a system that can facilitate the comprehension and interpretation of written reports for decision-making, provide versatile and sophisticated presentations of collaboration data to technical and non-technical stakeholders, and enable efficient and effective communication among the stakeholders to ensure they receive and provide appropriate and secure information in the correct context throughout a digital workflow, supporting a wide range of digital tasks and reviews. Accordingly, it would be an advancement in the state of the art to enable a user interface for digital document presentation and reviews, in a unified, scalable, collaborative, and secure digital model platform that integrates multidisciplinary digital models from disparate, disconnected tools.

It is against this background that various embodiments of the present invention were developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

Broadly, the present invention relates to methods and systems for dynamic and collaborative document review, and more specifically, to a digital model platform dashboard and document review interface that facilitate dynamic document updates in response to changes or modifications to linked digital models, propagation of user feedback to the linked digital models and/or digital workflows, and editing and commenting at individual artifact, file, folder, and workflow levels across previously non-interoperable digital models. Embodiments of the present invention further facilitate discussions and feedback at various levels of a digital workflow by different stakeholders, reviewers, and counterparties, thereby expanding the scope of collaboration and providing a user experience that is intuitive and contextually relevant for human-led decision-making, while also maintaining security, auditability and traceability.

Two exemplary use cases and specific implementation instances of embodiments of the present invention are document review for digital certification, where users must make decisions based on dynamic data updates, and security audits, where frequent threat assessment messages must be efficiently processed to ensure security experts receive the appropriate information in the correct context. The system provides an interconnected, unified, dynamic, collaborative, and secure interface by implementing various features, including but not limited to, digital model and document splicing, model-to-model and model-to-document linking, AI-assisted machine-readable data conversion into human-readable documents, mapping of data artifacts and analytics to standard document benchmarks, dynamic document updates, selective-access document viewing, change highlighting, dynamic linking of underlying digital models and digital threads in comments, nested comments, AI-supported comment analysis, sequential approvals, and zero-trust security access policies and real-time monitoring.

Accordingly, various methods, processes, systems, and non-transitory storage medium storing program code for executing processes to facilitate dynamic and collaborative digital document review are within the scope of the present invention.

In a first aspect or in one embodiment, one or more non-transitory physical storage media storing program code are provided. The program code when executed by the processor causes the processor to execute a computerized process for a digital document review. The program code may include code to receive an input digital model representation in an interconnected digital model platform. The input digital model representation may comprise at least one externally-accessible model endpoint for generating a digital artifact from the input digital model representation. The program code may include code to generate a document splice from the input digital model representation. The document splice may comprise access to a plurality of document subunits. At least one document subunit may be written in a natural language and may comprise the digital artifact from the input digital model representation. The access to each document subunit may be provided through an externally-accessible document endpoint for the document subunit. The program code may include code to generate a human-readable document by combining the plurality of document subunits. The program code may include code to generate for presentation on a user interface of the interconnected digital model platform, a view associated with the human-readable document to a user, based on an user authorization result for the user. The user authorization result may comprise selective access rights to the plurality of document subunits. The view may comprise access to the digital model representation, the digital artifact, each of the plurality of document subunits, and the human-readable document. The program code may include code to receive a user input from the user via the user interface. Finally, the program code may include code to update, via one of the externally-accessible document endpoints, the document splice based on the user input.

In another embodiment, each of the digital model representation, the digital artifact, the plurality of document subunits, the document splice, the human-readable document, and the user input may be uniquely identified by a universally unique identifier (UUID). The digital artifact may comprise the digital model representation's UUID. The document splice may comprise each document subunit's UUID. The user input may be associated with the human-readable document's UUID. The access to the digital model representation, the digital artifact, each of the plurality of document subunits, and the human-readable document may be provided by their UUIDs.

In another embodiment, the input digital model representation may be a first digital model representation. The digital artifact may be a first digital artifact. The program code may further cause the processor to receive a second input digital model representation. The program code to generate the document splice may cause the processor to generate the document splice from the first input digital model representation and the second input digital model representation. At least a second document subunit may be written in the natural language and may comprise a second digital artifact from the second input digital model representation. The first digital model representation may be generated using a first digital tool. The second digital model representation may be generated using a second digital tool. The first digital tool may not be directly interoperable with the second digital tool.

In another embodiment, the program code to generate a document splice from the input digital model representation causes the processor to execute a digital thread script that may generate the digital artifact from the input digital model representation, and may execute the digital thread script to prompt a large language model (LLM)-based artificial intelligence (AI) model to generate the at least one document subunit written in the natural language and comprising the digital artifact.

In another embodiment, the program code to generate the document splice from the input digital model representation further causes the processor to generate the at least one document subunit comprising the digital artifact using an AI module comprising a transformer model.

In another embodiment, the user may be a first user. The user input may be a first user input. The program code may further cause the processor to generate for presentation on the user interface of the digital model platform, a second view associated with the human-readable document based on a user authorization result for a second user. The user authorization result for the second user may comprise selective access rights to the plurality of document units. The program code may further include code to receive, from the second user via the user interface, a second user input related to the human-readable document. The program code may further include code to update the document splice based on the second user input.

In another embodiment, the first user input is an approval decision on the human-readable document. The program code to generate the second view further causes the processor to determine whether or not the first user has approved the human-readable document. The second view may comprise an option to approve the human-readable document by the second user after the first user has approved the human-readable document.

In another embodiment, the user input may be a comment on a digital data entity. The program code further comprises program code to generate a record comprising the comment, a key corresponding to the digital data entity, and at least one attribute for the comment. The program code further comprises program code to store the record in a comment table.

In another embodiment, the user input may be a comment. The program code may further cause the processor to add the comment to the document splice.

In another embodiment, the program code to generate the document splice from the input digital model representation may further cause the processor to identify, from a compliance standard, one or more requirements corresponding to the digital artifact. The program code to generate the document splice from the input digital model representation may further cause the processor to determine whether or not the one or more requirements are satisfied. The at least one document subunit comprising the digital artifact may further include an indication of whether or not the one or more requirements have been satisfied.

In another embodiment, the program code further causes the processor to execute a script referenced by the at least one externally-accessible model endpoint to generate the digital artifact from the input digital model representation. The first view may comprise an access to the script.

In another embodiment, the user interface may be a multimodal interface comprising a conversational interface configured to receive a text-based input or a voice-based input. The user input may comprise the text-based input or the voice-based input.

In another embodiment, the user interface may be a multimodal interface comprising a spatial computing interface configured to receive input from at least two different modalities. The user input may comprise input from the at least two different modalities.

In another embodiment, the program code further causes the processor to update the input digital model representation based on the user input.

In a second aspect, an embodiment of the present invention is a method for a digital document review, comprising receiving an input digital model representation in an interconnected digital model platform. The input digital model representation may comprise at least one externally-accessible model endpoint for generating a digital artifact from the input digital model representation. The method may further include generating a document splice from the input digital model representation. The document splice may comprise access to multiple document subunits. At least one document subunit may be written in a natural language and comprises the digital artifact from the input digital model representation. The access to each document subunit may be provided through an externally-accessible document endpoint for the document subunit. The method may further include generating a human-readable document by combining the plurality of document subunits. The method may further include generating for presentation on a user interface of the interconnected digital model platform, a view associated with the human-readable document to a user, based on an user authorization result for the user. The user authorization result may comprise selective access rights to the plurality of document subunits. The view may comprise access to the digital model representation, the digital artifact, each of the plurality of document subunits, and the human-readable document. The method may further include receiving a user input from the user via the user interface. The method may further include updating, via one of the externally-accessible document endpoints, the document splice based on the user input.

Embodiments as set out for the first aspect may apply equally to the second aspect.

In a third aspect or in another embodiment, a system for digital document review is provided. The system comprises at least one hardware processor, and at least one non-transitory physical storage medium storing program code. The program code is executable by the at least one hardware processor. The at least one hardware processor when executing the program code causes the at least one hardware processor to execute a computer-implemented process for a digital document review. The program code may include code to receive an input digital model representation in an interconnected digital model platform. The input digital model representation may comprise at least one externally-accessible model endpoint for generating a digital artifact from the input digital model representation. The program code may include code to generate a document splice from the input digital model representation. The document splice may comprise access to a plurality of document subunits. At least one document subunit may be written in a natural language and comprises the digital artifact from the input digital model representation. The access to each document subunit may be provided through an externally-accessible document endpoint for the document subunit. The program code may include code to generate a human-readable document by combining the plurality of document subunits. The program code may include code to generate for presentation on a user interface of the interconnected digital model platform, a view associated with the human-readable document to a user, based on an user authorization result for the user. The user authorization result may comprise selective access rights to the plurality of document subunits. The view may comprise access to the digital model representation, the digital artifact, each of the plurality of document subunits, and the human-readable document. The program code may include code to receive a user input from the user via the user interface. The program code may include code to update, via one of the externally-accessible document endpoints, the document splice based on the user input.

Embodiments as set out for the first aspect may apply equally to the third aspect.

In a fourth aspect, an embodiment of present invention is one or more non-transitory storage media for a security compliance review process, the non-transitory storage medium comprising program code executable by a hardware processor, the program code when executed by the hardware processor, causing the processor to monitor a system log for transaction data related to transactions on one or more digital artifacts, digital models, digital documents, digital thread scripts, and digital workflows on an interconnected digital model platform. The program code may further include code to detect one or more potential security threats from the transaction data under a zero-trust security access policy implemented on the digital model platform. The program code may further include code to generate a security assessment report from the one or more detected potential security threats. The program code may further include code to retrieve digital artifacts from the security assessment report. The program code may further include code to generate a document splice of an input standard document. The document splice may comprise access to a plurality of document subunits. The access to each document subunit may be provided through an externally-accessible document endpoint for the document subunit. The program code may further include code to generate a security compliance review document by mapping the digital artifacts to the document splice of the input standard document. The program code may further include code to generate for presentation on a user interface of the digital model platform, a first view associated with the security compliance review document based on a first authorization result for a first user. The first authorization result may comprise selective access rights to the plurality of document subunits. The view may comprise access to the detected potential security threats, the security assessment report, each of the plurality of document subunits, and the security compliance review document. The program code may further include code to receive, from the first user, a first user input related to the security compliance review document via the user interface. The program code may further include code to generate for presentation on the user interface of the digital model platform, a second view associated with the security compliance review document based on a second authorization result for a second user. The second authorization result may comprise selective access rights to the plurality of document subunits. The program code may further include code to receive, from the second user, a second user input related to the security compliance review document. Finally, the program code may further include code to generate a security compliance review approval based on the first user input and the second user input.

In some embodiments, the program code to detect one or more potential security threats from the transaction data may cause the processor to analyze the transaction data using an artificial intelligence (AI) model.

In yet another aspect or embodiment of the present invention, a computer program product is provided. The computer program may be used for collaborative document review, and may include a computer-readable storage medium having program instructions, or program code, embodied therewith, the program instructions executable by a processor to cause the processor to perform the aforementioned steps.

In another aspect or embodiment of the present invention, a system for collaborative document review is provided, the system including a memory that stores computer-executable components, and a hardware processor, operably coupled to the memory, and that executes the computer-executable components stored in the memory, where the computer-executable components may include components communicatively coupled with the processor that execute the aforementioned steps.

In yet another aspect or embodiment of the present invention, a system for collaborative document review is provided, the system including a user device having a processor, a display, a first memory; a server including a second memory and a data repository; a communications link between said user device and said server; and a plurality of computer codes embodied on said first and second memory of said user device and said server, said plurality of computer codes which when executed causes said server and said user device to execute a process including the steps described herein.

In another aspect or embodiment of the present invention, a computerized server is provided, including at least one processor, memory, and a plurality of computer codes embodied on said memory, said plurality of computer codes which when executed causes said processor to execute a process including the steps described herein. Other aspects and embodiments of the present invention include the methods, processes, and algorithms including the steps described herein, and also include the processes and modes of operation of the systems and servers described herein.

In yet another aspect or embodiment of the present invention, an edge computerized system is provided, the edge computerized system running on a physical system or physical twin (PTw) with either access to, or dedicated, processing, memory, computer code stored on a non-transitory computer-readable storage medium of the physical system or PTw, and a plurality of sensor data being measured on said physical system or PTw, the computer code causing the processor to perform the aforementioned steps.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with the non-transitory physical storage medium may have corresponding features definable and/or combinable with respect to a digital documentation system and/or method and/or system, or vice versa, and these embodiments are specifically envisaged.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which:

FIG. 21 shows an expanded view corresponding to FIG. 20, in accordance with example embodiments of the present invention.

DETAILED DESCRIPTION OF THE INVENTION

Figure 1:
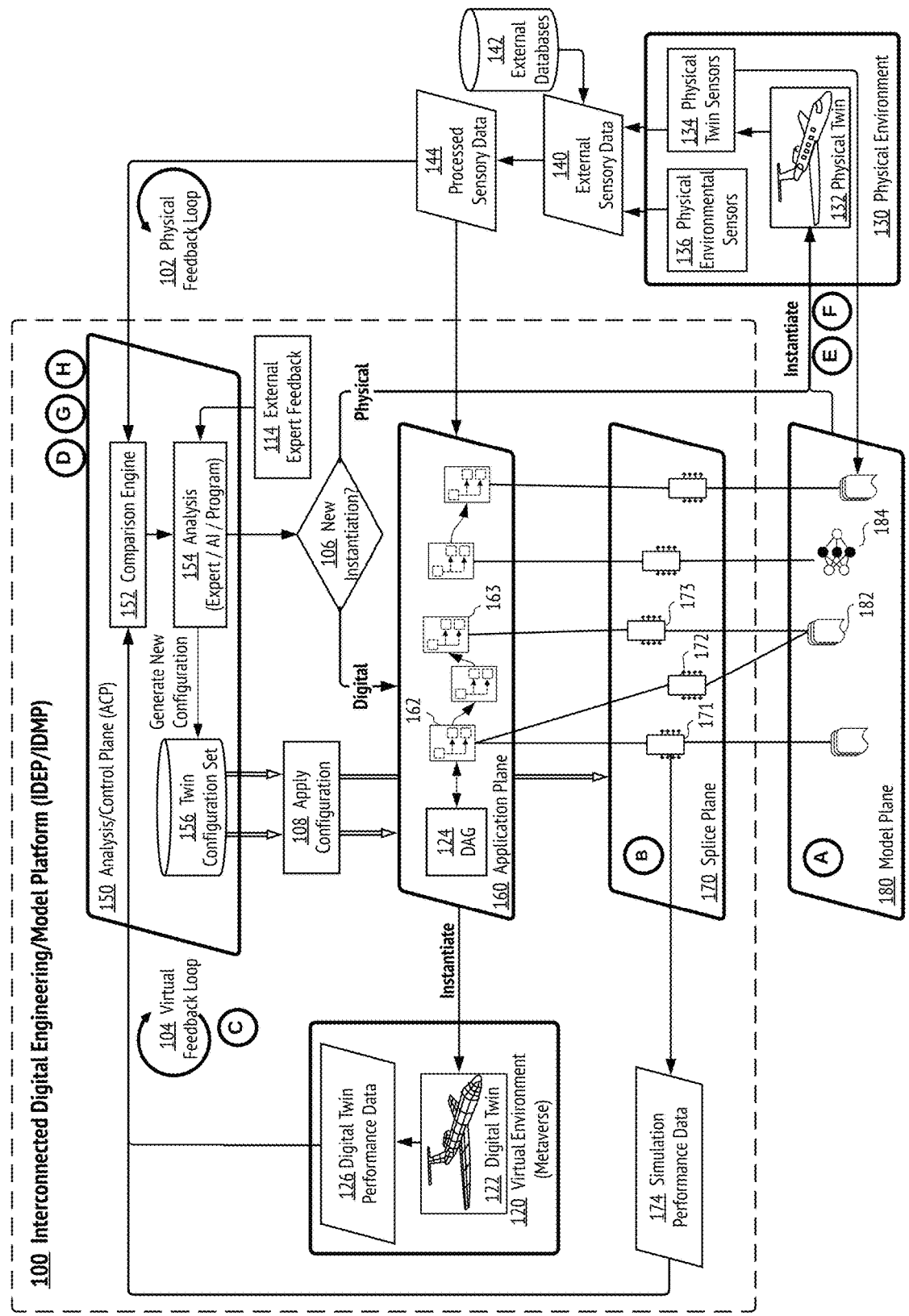
FIG. 1 shows an exemplary interconnected digital engineering/model platform (IDEP/IDMP) architecture, in accordance with some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

The present invention relates to methods and systems for addressing digital model and document processing techniques, multimodal user interface designs, and secure collaboration channels. These elements converge to create a comprehensive document interface or dashboard for efficient and secure review of human-readable documents, with data dynamically updated in response to changes within an interconnected digital model platform (IDMP).

Embodiments of the present invention integrate model splicing, document splicing, model-to-model and model-to-document linking, AI-assisted generation and update of human-readable documents, resource primitives, and tiered commenting on data resources or entities associated with different digital tools across different organizational structures. This integration ensures compatibility across multiple digital model types and review processes, streamlines dynamic data updates, and provides an intuitive user experience while maintaining security, auditability, and traceability. For example, in the context of digital engineering (DE) certification reviews, the system's ability to handle multiple DE models and simulations, linking them seamlessly with relevant certification or standards documents, allows for coherent distillation of complex data interactions. This makes information both comprehensible and actionable, potentially reducing cognitive load on users, especially when faced with high-bandwidth series of DE data updates requiring decisions. The system further implements zero-trust security access policies, and in the context of security compliance reviews, real-time monitoring. By leveraging artificial intelligence (AI) models for proactive threat detection, system log data scanning, identification of potential threats, and report generation, embodiments of present invention again make complex security information more comprehensive and actionable for human reviewers.

The IDMP is designed to support a robust commenting system, with a data architecture design centered around the concept of a Resource Primitive, a foundational entity uniquely identified by a Universally Unique Identifier (UUID). This structure facilitates the systematic association and management of comments across various resources, such as files and folders, within the platform.

The tiered commenting system expands the scope of collaboration and facilitates discussions among stakeholders, reviewers, and counterparties over previously non-interoperable digital models. Users can add comments to various data entities, for example digital model files, model splices, folders, and organizational structures at different levels of a digital workflow. Properties or attributes such as author, timestamp, status, urgency level, and deadline for resolution may be further assigned to comments. This clear bookkeeping of comments may be particularly useful when multiple rounds of reviews are conducted by different reviewers and it ensures user inputs are transparent, accountable, auditable and traceable. The system's ability to monitor comments and analyze their patterns also becomes especially helpful in managing extensive reviews across numerous digital data models within a digital workflow. For example, comment analytics may be generated via AI-assistance to summarize comments, identify issues that arise more frequently than others, or pinpoint a root comment with all related discussions that have stemmed from it. Furthermore, selective-access options enable users to selectively access comments based on their authorization levels with respect to the underlying digital model data, or based on a user's priority level during a sequential review process.

A multimodal user interface may be implemented to enhance communication efficiency, enrich user experience, and reduce cognitive load. Beyond text comments, voice and video comments can be supported. With AI-generated transcripts, they allow for natural, conversation-based communications while preserving emotional nuances and context. The interface may also provide user notification functions, selective-access viewing and editing options, and AI-supported comment analysis that allows users to efficiently manage, monitor, and analyze comments across multiple rounds of collaborative reviews.

Prior to deployment, the ML and AI modules mentioned above may be trained on sample input and output datasets, which may be generated from historical reviews or synthetically created by subject matter experts. Fine-tuning can be customized within customer environments with enterprise documents and data to capture specific language and document dependencies within client databases. These training and fine-tuning processes ensure that the system can efficiently synthesize digital workflow and document data as well as user requests and feedback, providing a coherent context for complex data interactions, and making information accessible, comprehensible, and actionable for both technical and non-technical stakeholders.

In short, by developing and unifying various features as disclosed herein, embodiments of the present invention facilitate comprehensive digital document review, security compliance, and collaboration, to address the challenges of managing complex, dynamic content in digital workflows while promoting effective communication and decision-making among diverse stakeholders and users of the IDMP.

With reference to the figures, embodiments of the present invention are now described in detail. First, the IDMP is explained. Next, the document review interface, which may be considered a subsystem of the IDMP, is described in detail. Finally, IDMP and document review-specific terminologies are provided.

Terminology

Some illustrative terminologies used herein are provided at the end of this document to assist in understanding the present invention, but these are not to be read as restricting the scope of the present invention. The terms may be used in the form of nouns, verbs, or adjectives, within the scope of the definition.

An Interconnected Digital Engineering/Model Platform (IDEP/IDMP) Architecture

FIG. 1 shows an exemplary interconnected digital model platform (IDMP) architecture, in accordance with some embodiments of the present invention. In what follows, the terms IDMP and IDEP are used interchangeably, as an interconnected digital engineering platform (IDEP) is a representative type of IDMP used with digital engineering (hereinafter, "DE") data.

IDEP 100 streamlines the process of product development from conception to production, by using a virtual representation or digital twin (DTw) 122 of the product to optimize and refine features before building a physical prototype or physical twin (PTw) 132, and to iteratively update DTw 122 until DTw 122 and PTw 132 are in sync to meet the product's desired performance goals.

Specifically, a product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) manufacturer may use IDEP platform 100 to develop a new product. The engineering team from the manufacturer may create or instantiate digital twin (DTw) 122 of the product in a virtual environment 120, encompassing detailed computer-aided design (CAD) models and finite element analysis (FEA) or computational fluid dynamics (CFD) simulations of component systems such as fuselage, wings, engines, propellers, tail assembly, and aerodynamics. DTw 122 represents the product's design and performance characteristics virtually, allowing the team to optimize and refine features before building a physical prototype 132 in a physical environment 130. In some embodiments, PTw 132 may be an existing entity, while DTw 122 is a digital instance that replicates individual configurations of PTw 132, as-built or as-maintained. In the present disclosure, for illustrative purposes only, DTw 122 and PTw 132 are discussed in the context of building a new product, but it would be understood by persons of ordinary skill in the art that the instantiation of DTw 122 and PTw 132 may take place in any order, based on the particular use case under consideration.

Digital models (e.g., CAD models, FEA models, CFD models) used for creating DTw 122 are shown within a model plane 180 in FIG. 1. Also shown in model plane 180 is a neural network (NN) model 184, which may provide machine-learning based predictive modeling and simulation for a DE process. A DE model such as 182 may be spliced into one or more model splices, such as 172 and 173 within a splice plane 170. Individual DTws such as 122 are instantiated from splice plane 170 via an application plane 160. A model splice such as 172 may be linked to another model splice such as 171 by a platform script or application 162 on application plane 160 into a digital thread. Multiple digital threads such as 162 and 163 may be further linked across different stages or phases of a product life cycle, from concept, design, testing, to production. Digital threads further enable seamless data exchange and collaboration between departments and stakeholders, ensuring optimized and validated designs.

As model splicing provides input and output splice functions that can access and modify DE model data, design updates and DE tasks associated with the digital threads may be represented by scripted, interconnected, and pipelined tasks arranged in Directed Acyclic Graphs (DAGs) such as 124. A DE task DAG example is discussed in further detail with reference to FIG. 10.

To enhance the design, external sensory data 140 may be collected, processed, and integrated into application plane 160. This process involves linking data from different sources, such as physical sensors 134 on prototype 132, physical environmental sensors 136, and other external data streams such as simulation data from model plane 180. API endpoints provide access to digital artifacts from various environments (e.g., physical twin (PTw) sensor 134 data) and integrate them into the spliced plane 170 for the DTw 122. Model splices on the splice plane 170 enable autonomous data linkages and digital thread generation, ensuring DTw 122 accurately represents the product's real-world performance and characteristics.

To validate DTw 122's accuracy, the engineering team may build or instantiate PTw 132 based on the same twin configuration (i.e., digital design). Physical prototype 132 may be equipped with numerous sensors 134, such as accelerometers and temperature sensors, to gather real-time performance data. This data may be compared with the DTw's simulations to confirm the product's performance and verify its design.

Processed sensory data 144 may be used to estimate parameters difficult to measure directly, such as aerodynamic forces or tire contact patch forces. Such processed sensory data provide additional data for DTw 122, further refining its accuracy and reliability. Processed sensory data 144 may be generated from physical environment sensors 136 with physical environment 130, and may be retrieved from other external databases 142, as discussed below.

During development, feedback from customers and market research may be collected to identify potential improvements or adjustments to the product's design. At an analysis & control plane (ACP) 150, subject matter experts (SMEs) may analyze processed sensory data 144 and external expert feedback 114, to make informed decisions on necessary design changes. Such an analysis 154 may be enhanced or entirely enabled by algorithms (i.e., static program code) or artificial intelligence (AI) modules. Linking of digital threads such as 162, physical sensors 134 and 136, processed sensory data 144, and expert feedback data 114 occurs at ACP 150, where sensor and performance data is compared, analyzed, leading to modifications of the underlying model files through digital threads.

In particular, sensory data 144 from physical environment 130 and performance data 126 from virtual environment 120 may be fed into a comparison engine 152. Comparison engine 152 may comprise tools that enable platform users to compare various design iterations with each other and with design requirements, identify performance lapses and trends, and run verification and validation (V&V) tools.

Model splicing is discussed in further detail with reference to FIGS. 7 to 9, and 11 to 33. Model splicing enables the scripting of any DE operation involving DE model files in model plane 180, where each DE model is associated with disparate and siloed DE tools. Codification of DE models and DE operations with a unified corpus of scripts enable IDEP 100 to become an aggregator where a large space of DE activities associated with a given product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) may be threaded through program code. Thus, model splicing enables the linking and manipulation of all model files (e.g., 182, 184) associated with a given product within the same interconnected DE platform or DE ecosystem 100. As a consequence, the generation and training of AI modules for the purpose of manipulating DE models (e.g., 182), digital threads (e.g., 162), and digital twins (e.g., 122) become possible over the programmable and unified IDEP 100.

Virtual and Physical Feedback Loops

FIG. 1 uses letter labels "A" to "H" to denote different stages of a product's lifecycle. At each stage, IDEP 100 enables feedback loops whereby data emanating from a PTw or a DTw is analyzed at ACP 150, leading to the generation of a new twin configuration based on design modifications. The new twin configuration may be stored in a twin configuration set and applied through the application and splice planes, yielding modified model files that are registered on the digital thread.

A virtual feedback loop 104 starts with a decision 106 to instantiate new DTw 122. A DAG of hierarchical tasks 124 allows the automated instantiation of DTw 122 within virtual environment 120, based on a twin configuration applied at a process step 108 from a twin configuration set 156. DTw 122 and/or components thereof are then tested in virtual environment 120, leading to the generation of DTw performance data 126. Concurrently, DTw 122 and/or components thereof may be tested and simulated in model plane 180 using DE software tools, giving rise to test and simulation performance data 174. Performance data 126 and 174 may be combined, compared via engine 152, and analyzed at ACP 150, potentially leading to the generation and storage of a new twin configuration. The eventual decision to instantiate a DTw from the new twin configuration completes virtual feedback loop 104.

A physical feedback loop 102 starts with a decision 106 to instantiate a new PTw 132. PTw 132 may be instantiated in a physical environment 130 from the model files of model plane 180 that are associated with an applied twin configuration from the twin configuration set 156. PTw 132 and/or components thereof are then tested in physical environment 132, leading to the generation of sensory data from PTw sensors 134 and environmental sensors 136 located in physical environment 130. This sensory data may be combined with data from external databases to yield processed sensory data 144.

Data from PTw sensors 134 may be directly added to the model files in model plane 180 by the DE software tools used in the design process of PTw 132. Alternatively, PTw sensor data may be added to digital thread 162 associated with PTw 132 directly via application plane 160. In addition, processed sensory data 144 may be integrated into IDEP 100 directly via application plane 160. For example, processed sensory data 144 may be sent to ACP 150 for analysis, potentially leading to the generation and storage of a new twin configuration. The eventual decision to instantiate a PTw from the new twin configuration completes physical feedback loop 102.

At each stage A to H of the product life cycle, the system may label one twin configuration as a current design reference, herein described as an "authoritative twin" or "authoritative reference". The authoritative twin represents the design configuration that best responds to actual conditions (i.e., the ground truth). U.S. provisional patent application No. 63/470,870 provides a more complete description of authoritative twins and their determination, and is incorporated by reference in its entirety herein.

With faster feedback loops from sensor data and expert recommendations, the system updates DTw 122 to reflect latest design changes. This update process may involve engineering teams analyzing feedback 154 and executing the changes through IDEP 100, or automated changes enabled by IDEP 100 where updates to DTw 122 are generated through programmed algorithms or AI modules. This iterative updating process continues until DTw 122 and PTw 132 are in sync and the product's performance meets desired goals. While IDEP 100 may not itself designate the authoritative reference between a DTw or a PTw, the platform provides configurable mechanisms such as policies, algorithms, voting schema, and statistical support, whereby agents may designate a new DTw as the authoritative DTw, or equivalently in what instances the PTw is the authoritative source of truth.

When significant design improvements are made, a new PTw prototype may be built based on the updated DTw. This new prototype undergoes further testing and validation, ensuring the product's performance and design align with project objectives.

Once DTw 122 and PTw 132 have been validated and optimized, the product is ready for production. A digital thread connecting all stages of development can be queried via splice plane 170 to generate documentation as needed to meet validation and verification requirements. The use of model splicing, along with the feedback architecture shown in FIG. 1, improves the efficiency of the overall product innovation process.

Interconnected DE Platform and Product Lifecycle

In FIG. 1, letter labels "A" to "H" indicate the following major steps of a product lifecycle, according to some embodiments of the current invention:

A. Digital models reside within customer environments: a product may be originally represented by model files that are accessible via software tools located within customer environments. Model plane 180 encompasses all model files (e.g., 182) associated with the product.

B. Preparatory steps for design in the digital realm: splice plane 170 encompasses model splices (e.g., 172) generated from DE model file through model splicing. Model splicing enables the integration and sharing of DE model files within a single platform, as described in detail with reference to FIGS. 7 to 9, and 11 to 33.

C. Link threads as needed among model splices: to implement a product, model splices are linked through scripts within application plane 160. A digital twin (DTw) 122 englobing as-designed product features may be generated from application plane 160 for running in virtual environment 120. The complete twin configuration of a generated DTw is saved in twin configuration set 156 located at the analysis & control plane (ACP) 150. Features or parts of DTw 122 may be simulated in model plane 180, with performance data 174 accessed through splice plane 170. In one embodiment, features or parts of PTw 132 or DTw 122 configuration may be simulated outside the platform, where performance data is received by the ACP 150 for processing, in a similar way as performance data 126 received from DTw 122.

D. Finalize "As-designed": performance data 126 from DTw 122 or simulation performance data 174 attained through model plane 180 and accessed through model splicing may be collected and sent to ACP 150 for analysis. Performance data from different iterations of DTw 122 may be compared via engine 152 to design requirements. Analysis of the differences may lead to the generation of new twin configurations that are stored at twin configuration set 156. Each twin configuration in twin configuration set 156 may be applied at application plane 160 and splice plane 170 via process step 108 to instantiate a corresponding DTw. Multiple DTws may be generated and tested, consecutively or simultaneously, against the design requirements, through comparison engine 152 and analysis module 154. Verification and validation tools may be run on the various DTw iterations.

E. Finalize "As-manufactured": once a DTw 122 satisfies the design requirements, a corresponding PTw 132 prototype may be instantiated from the spliced model files (e.g., 172). Sensor data originating from the PTw 134 or from within the physical environment 136 may be collected, combined with other external data 142 (e.g., sensor data from other physical environments). The resulting processed sensory data 144 may be sent to the analysis & control plane 150 to be compared with performance data 126 from DTws and simulations (e.g., 174), leading to further DTw 122 and PTw 132 iterations populating the twin configuration set 156. Processed sensory data 144 may also be mapped to the digital threads (e.g., 164) and model splices (e.g., 172) governing the tested PTw 132 through the application plane 160.

F. Finalize "As-assembled": once the manufacturing process is completed for the various parts, as a DTw and as a PTw, the next step is to finalize the assembled configuration. This involves creating a digital representation of the assembly to ensure it meets the specified requirements. The digital assembly takes into account the dimensions and tolerances of the "as-manufactured" parts. To verify the feasibility of the digital assembly, tests are conducted using the measured data obtained from the physical assembly and its individual components. Measurement data from the physical component parts may serve as the authoritative reference for the digital assembly, ensuring alignment with the real-world configuration. The digital assembly is compared with the actual physical assembly requirements for validation of the assembled configuration. Subsequently, the digital assembly tests and configurations serve as an authoritative reference for instructions to guide the physical assembly process and ensure accurate replication. IDEP 100 components described above may be used in the assembly process. In its authoritative iteration, DTw 122 ultimately captures the precise details of the physical assembly, enabling comprehensive analysis and control in subsequent stages of the process.

G. Finalize "As-operated": to assess the performance of the physical assembly or its individual component parts, multiple digital twins 122 may be generated as needed. These digital twins are created based on specific performance metrics and serve as virtual replicas of the physical system. Digital twins 122 are continuously updated and refined in real-time using the operational data (e.g., 144) collected from monitoring the performance of the physical assembly or its components. This data may include, but are not limited to, processed sensory data, performance indicators, and other relevant information. By incorporating this real-time operational data, digital twins 122 stay synchronized with the actual system and provide an accurate representation of its operational performance. Any changes or improvements observed via sensory data 144 during the real-world operation of the assembly are reflected in DE models within the digital twins and recorded in the twin configuration set 156. This ensures that the digital twins remain up-to-date and aligned with the current state of the physical system.

H. Predictive analytics/Future performance: The design process may continue iteratively in virtual environment 120 through new DTw 122 configurations as the product is operated. Multiple digital twins may be created to evaluate the future performance of the physical assembly or its component parts based on specific performance metrics. Simulations are conducted with various control policies to assess the impact on performance objectives and costs. The outcome of these simulations helps in deciding which specific control policies should be implemented (e.g., tail volume coefficients and sideslip angle for an airplane product). The digital twin DE models (e.g., 182) are continuously updated and refined using the latest sensor data, control policies, and performance metrics to enhance their predictive accuracy. This iterative process ensures that the digital twins (e.g., 122, 156) provide reliable predictions of future performance and assist in making informed decisions.

Figure 3:
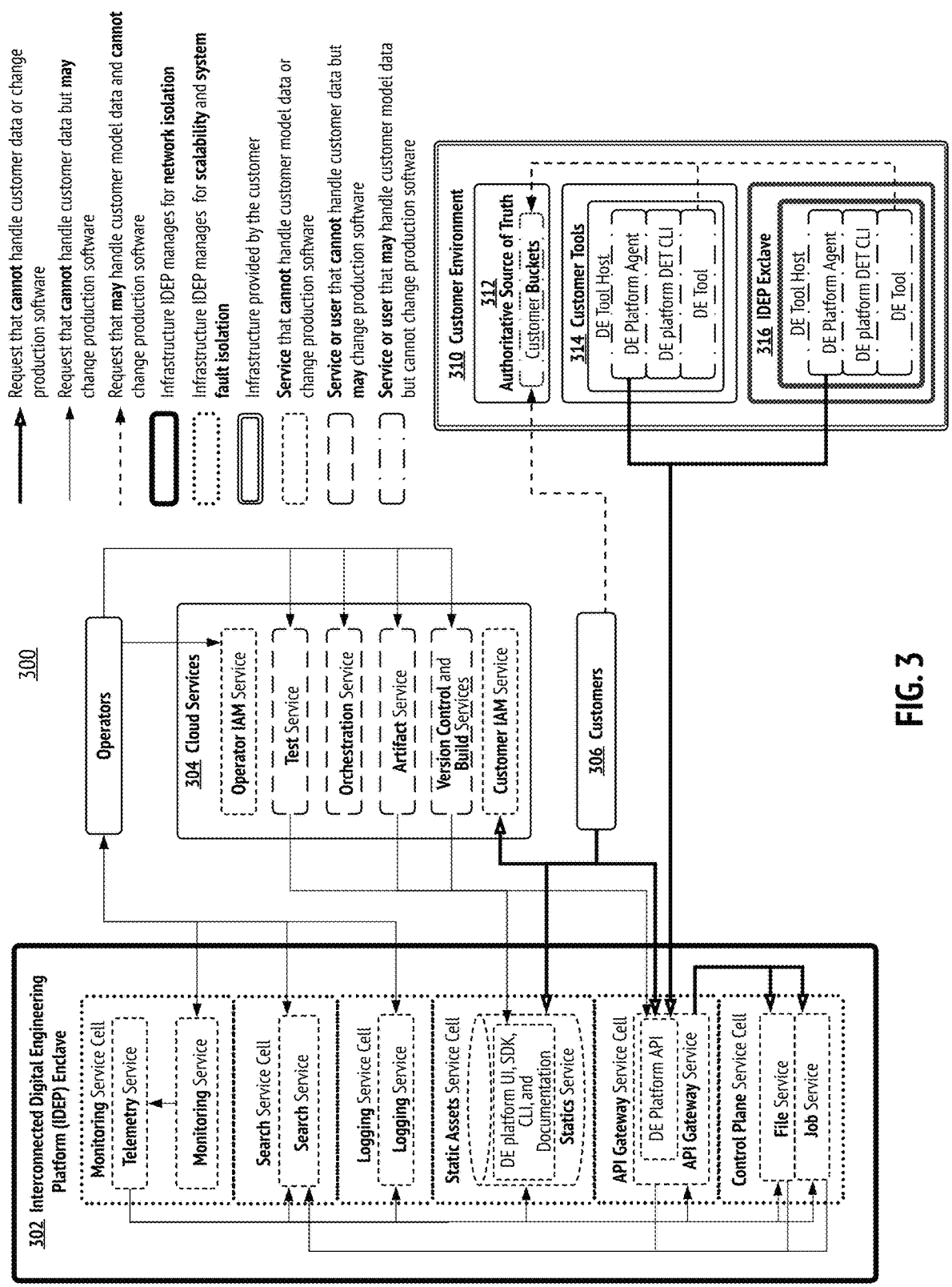
FIG. 3 shows another exemplary implementation of the IDEP illustrating its offered services and features, in accordance with some embodiments of the present invention.
Figure 4:
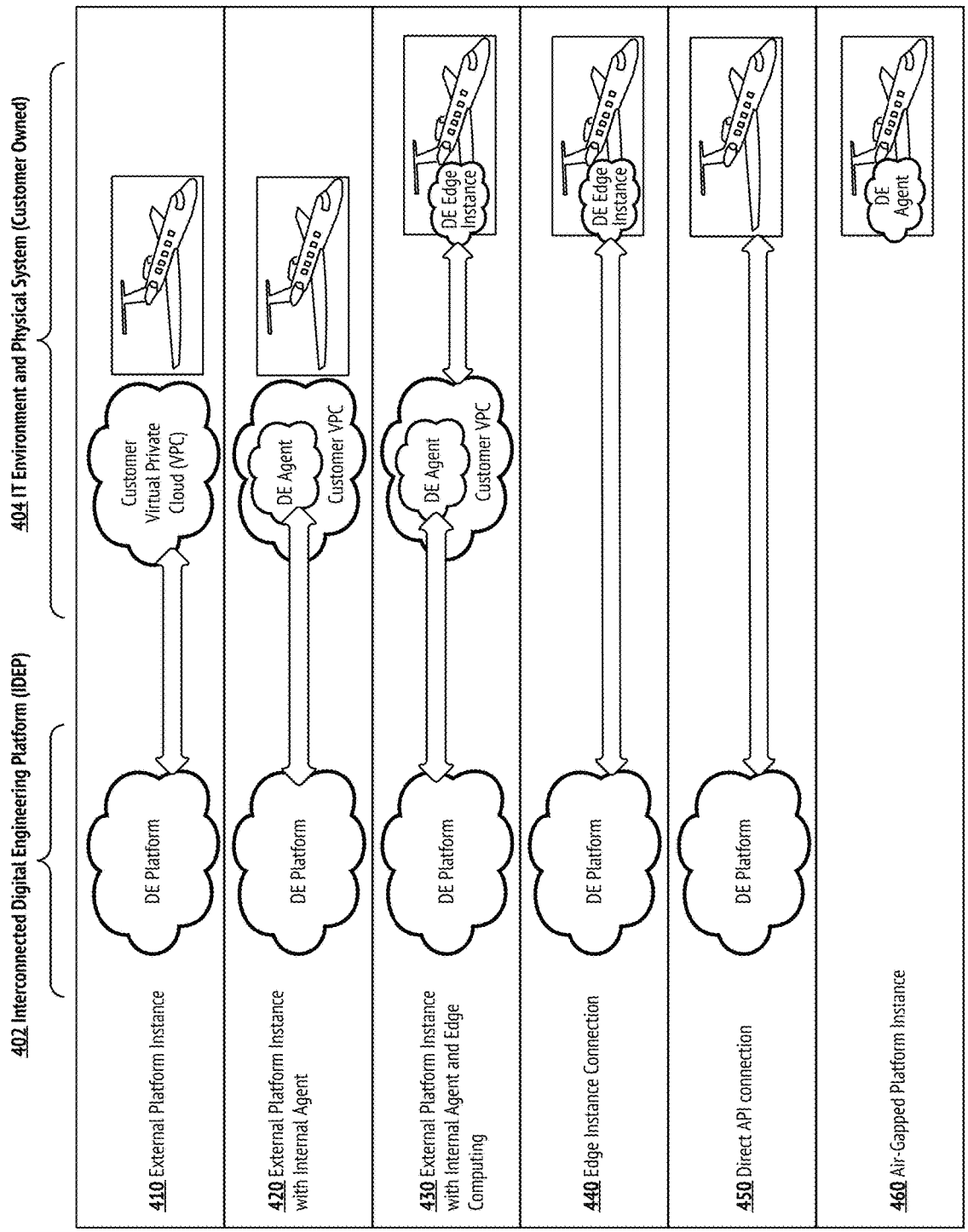
FIG. 4 shows potential scenarios for instantiating an IDEP in connection to a customer's physical system and IT environment, in accordance with some embodiments of the present invention.

The hardware components making up IDEP 100 (e.g., servers, computing devices, storage devices, network links) may be centralized or distributed among various entities, including one or more DE service providers and DE clients, as further discussed in the context of FIGS. 3 and 4. FIG. 4 shows an illustration of various potential configurations for instancing a DE platform within a customer's physical system and information technology (IT) environment, usually a virtual private cloud (VPC) protected by a firewall.

Digital Documentation Through Live Digital Objects

The methods and systems described herein enable the updating and generation of digital documents using the full functionality of the IDMP shown in FIG. 1. In FIG. 1, the IDMP virtual feedback loop 104 allows the scripting of program code within a digital thread 162 for the generation, storing, and updating of digital twins 122 and twin configurations 156. Similarly, the IDMP virtual feedback loop 104 also allows the scripting of program code within a digital thread 162 for the generation, storing, and updating of digital documents. This enables the creation and maintenance of so-called live digital objects.

Live digital objects are more akin to a digital twin than a conventional static document in that they are configured, through a digital thread, to be continuously updated to reflect the most current changes within a particular twin configuration. In particular, an authoritative/trusted live digital object is configured to reflect the latest authoritative/trusted twin configuration. Specifically, live digital objects are digital objects that (1) include a digital artifact extracted from a digital model through a model representation (e.g., a model splice), where (2) a modification of the digital artifact appears in the live digital object within a predetermined delay. In various embodiments, the updates are effectively real-time or near real-time.

Live digital objects may use a document interface, yielding live digital documents, or live documents. Live digital documents may pull data from multiple model files. Preliminary design reviews may thus take the form of a live digital document.

Live digital objects may also use a dashboard interface, yielding live digital boards, or live boards. In some embodiments, a live digital board may display one or more documents and one or more applications on a two-dimensional (2D) screen rendered on a modality of a multimodal interface such as a 2D display, a two-and-a-half-dimensional (2.5D) display, and a three-dimensional (3D) semi-immersive or fully immersive display. Live digital boards may combine multiple documents through a VR/AR and/or conversational interface, into a board/screen 2D, 2.5D format. For example, a live board may combine multiple model files from a CAD software with collaboration chat rooms over a 2D screen rendered on a 2D display (traditional display), a 2.5D display, or a 3D semi immersive or fully immersive display. In one embodiment, the live board combines multiple view screens.

Finally, a live digital object may take the form of a live digital space (or live space), a 3D virtual environment or an augmented environment. In some embodiments, a live digital space displays one or more documents and one or more other applications in a virtual space rendered through a 3D spatial display. Live digital spaces may combine multiple documents through VR/AR and/or conversational interfaces into a 3D spatial representation. For example, a live space may display multiple 3D model files from a CAD software with collaboration chat rooms over a 3D semi immersive or fully immersive display spatial display.

Live digital objects may be stored and accessed through an IDMP. Specifically, live digital objects may be used to provide the background context for a given digital thread, and may specifically be used to display and organize a digital thread's associated artifacts, as described herein.

Live digital objects may hence be known as magic objects (i.e., live documents may be denoted "magic documents", live boards may be denoted "magic boards", and live spaces may be denoted "magic spaces") as changes implemented within a twin configuration (e.g., through a modification of a model file) may appear instantaneously within the relevant data fields of the live digital objects. Similarly, authoritative/trusted live digital objects may also be known as authoritative/trusted magic objects as they continuously reflect data from the authoritative twin, thus always representing the authoritative source of truth.

Given the massive quantities of data and potential modifications that are carried out during a product's lifecycle, the scripts implementing live digital objects may be configured to allow for a predefined maximum delay between the modification of a model file (e.g., the modification of a digital artifact) and the execution of the corresponding changes within a live digital object. Moreover, for similar reasons, the scripts implementing live digital objects may be restricted to operate over a specified subset of model files within a digital twin or a system, thus reflecting changes only to key parameters and configurations of the digital twin or the system.

The "printing" of a live digital document or board corresponds to the generation of a frozen (i.e., static) time-stamped version of a live digital document or board. Therefore, "printing"—for a live digital document or board-is equivalent to "instantiation" for a digital twin. Similarly, the "printing" of a live digital space may also be envisaged, yielding a frozen 3D representation of a given system or digital thread.

In one embodiment of the present invention, an IDMP script (e.g., an IDEP application) having access to model data via one or more model splices and digital document templates to create and/or update a live digital object, may dynamically update the live digital object using software-defined digital threads over an IDMP platform. In such an embodiment, the IDMP script may receive user interactions dynamically. In response to the user updating data for a model and/or a specific parameter setting (e.g., a digital artifact), the IDMP script may dynamically propagate the user's updates into the live digital object through a corresponding digital thread.

In another embodiment of the present invention, an IDEP script may instantiate a DE document with sufficient specification to generate a physical twin. In such an embodiment, the IDEP script may receive a digital twin configuration of a physical twin, generate a live digital object associated with the digital twin configuration, receive a predetermined timestamp, and generate a printed DE document (i.e., a static, time-stamped version of the live digital object at the predetermined timestamp). Such an operation may be referred to as the "printing of a digital twin".

In yet another embodiment of the present invention, an IDEP script may instantiate (i.e., "print") a DE document specifying an updated digital twin upon detecting the update. In such an embodiment, the IDEP script may detect a modification of a DE model or an associated digital thread. In response to detecting the modification, the IDEP script may update relevant data fields and sections of the live DE document based on the detected modification, and generate an updated printed DE document with the updated relevant data fields and sections based on the always-updated live DE document.

In various embodiments, a software-defined digital thread can be associated with a companion magic document (or "magic doc") that encompasses live updates for one or more core parameters of the digital thread. In one embodiment, the magic doc includes key parameters describing the implementation of a user's intent. For example, in one embodiment, a companion magic doc for a given digital thread may include key data points and key orchestration script examples illustrating a user's intent (e.g., "increase a drone's wing span by 1%"). In one embodiment, a script-generating ML model receiving as input pseudocode or detailed user instructions derived from a user's intent is trained on prior IDEP digital threads and documents. In addition to generating a digital thread (with orchestration scripts and comments), the script-generating ML model is also configured to generate a magic doc that explains how the generated digital thread addresses the user intent.

In some embodiments, receiving user interactions with a DE model, modifications to a DE model, or modifications to an associated digital thread, may be carried out through a push configuration, where a model splicer or a script of the digital thread sends any occurring relevant updates to the IDEP script immediately or within a specified maximum time delay. In other embodiments, receiving user interactions with a DE model, modifications of a DE model, or modifications of an associated digital thread, may be carried out through a pull configuration, where a model splicer or a script of the digital thread flag recent modifications until the IDEP script queries relevant DE models (via their model splices) or associated digital threads, for flagged modification. In these embodiments, the IDEP script may extract the modified information from the modified DE models (via their model splices) or the modified digital threads, in order to update a live DE document. In yet other embodiments, receiving user interactions with a DE model, modifications of a DE model, or modifications of an associated digital thread, may be carried out through a pull configuration, where the IDEP script regularly checks relevant DE models (via their model splices) or associated digital threads, for modified data fields, by comparing the data found in the live DE document with regularly extracted model and digital thread data. In these embodiments, the IDEP script may use the modified data to update the live DE document.

Dynamic Document Updates

Some embodiments described herein center around documentation, or document preparation and update and on document management (e.g., for reviews). As discussed, some embodiments of the system allow for dynamic updates to documents, which pertain to software-defined digital threads in the IDEP platform and the accompanying documentation.

Use of an ML engine with the model data and templates to create and/or update documents almost instantaneously as a one-time action have been presented. Furthermore, the digital engineering platform interacts dynamically with the user. As the user interacts with the system and updates data for a model or a specific parameter setting, these changes may be propagated through the corresponding digital threads and to the associated documentation. The AI architectures involved include locally-instanced large language model (LLMs, for data security reasons) as well as non-LLM approaches (e.g., NLP-based), in order to create, update, or predict documentation in the form of sentences, paragraphs, and whole documents. At the same time, trying to update the entire system of digital threads for every update may be prohibitively slow and may present security risks to the system. Generating live DE documents that are updated based on a subset of a system's DE models and within a maximum time delay may therefore be more efficient.

Interconnected Digital Engineering and Certification Ecosystem

Figure 2:
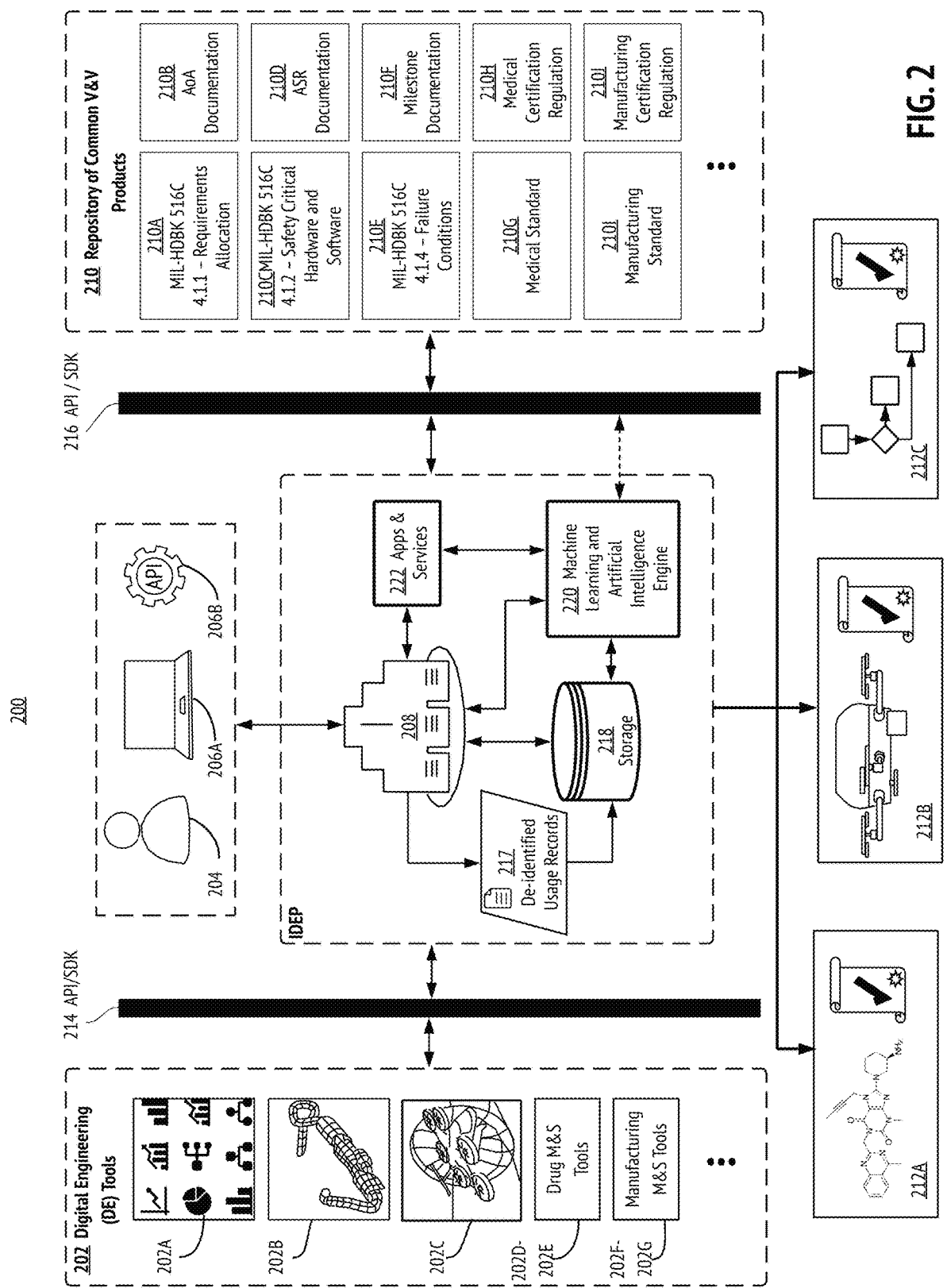
FIG. 2 shows an exemplary implementation of an IDEP as an interconnected digital engineering (DE) and certification ecosystem, and exemplary digitally certified products, in accordance with some embodiments of the present invention.

FIG. 2 shows an exemplary implementation of the IDEP as an interconnected digital engineering (DE) and certification ecosystem 200, and exemplary digitally certified products, in accordance with some embodiments of the present invention. Interconnected DE and certification ecosystem 200 may be viewed as a particular instantiation or implementation of IDEP 100 shown in FIG. 1. The IDEP may also be referred to as a "DE Metaverse."

Interconnected DE and certification ecosystem 200 is a computer-based system that links models and simulation tools with their relevant requirements in order to meet verification, validation, and certification purposes. Verification refers to methods of evaluating whether a product, service, or system meets specified requirements and is fit for its intended purpose. For example, in the aerospace industry, a verification process may include testing an aircraft component to ensure it can withstand the forces and conditions it will encounter during flight. Verification also includes checking externally against customer or stakeholder needs. Validation refers to methods of evaluating whether the overall performance of a product, service, or system is suitable for its intended use, including its compliance with regulatory requirements and its ability to meet the needs of its intended users. Validation also includes checking internally against specifications and regulations. Interconnected DE and certification ecosystem 200 as disclosed herein is designed to connect and bridge large numbers of disparate DE tools and models from multitudes of engineering domains and fields, or from separate organizations who may want to share models with each other but have no interactions otherwise. In various embodiments, the system implements a robust, scalable, and efficient DE model collaboration platform, with extensible model splices having data structures and accompanying functions for widely distributed DE model types and DE tools, an application layer that links or connects DE models via APIs, digital threads that connect live engineering model files for collaboration and sharing, digital documentation management to assist with the preparation of engineering and certification documents appropriate for verification and validation (V&V) purposes, and AI-assistance with the functionalities of the aforementioned system components.

More specifically, FIG. 2 shows an example of an interconnected DE and certification ecosystem and examples of digitally certified products 212A, 212B, and 212C (collectively referred to as digitally certified products 212). For example, in some implementations, digitally certified product 212A may be an unmanned aerial vehicle (UAV) or other aircraft, digitally certified product 212B may be a drug or other chemical or biologic compound, and the digitally certified product 212C may be a process such as a manufacturing process. In general, the digitally certified products 212 can include any product, process, or solution that can be developed, tested, or certified (partially or entirely) using DE tools such as 202. In some implementations, digitally certified products 212 may not be limited to physical products, but can include non-physical products such as methodologies, processes and software, etc. While physical and physically-interacting systems often require multiple DE tools to assess for compliance with common V&V products simply by virtue of the need for modeling and simulation (M&S), many complex non-physical systems may also require multiple DE tools for product development, testing, and/or certification. With this in mind, various other possibilities for digitally certified products will be recognized by one of ordinary skills in the art. The inclusion of regulatory and certification standards, compliances, calculations, and tests (e.g., for the development, testing, and certification of products and/or solutions) enables users to incorporate relevant regulatory and certification standards, compliances, calculations, and test data directly into their DE workflow. Regulatory and certification standards, compliances, calculations, and tests are sometimes referred to herein as "common validation and verification (V&V) products."

Digitally certified products 212 in FIG. 2 may be designed and/or certified using interconnected DE and certification ecosystem 200. Interconnected DE and certification ecosystem 200 may include a user device 206A, API 206B, or other similar human-to-machine, or machine-to-machine communication interfaces operated by a user. A user may be a human 204 of various skill levels, or artificial users such as algorithms, artificial intelligence, or other software that interface with ecosystem 200 through API 206B. Ecosystem 200 may further comprise a computing and control system 208 ("computing system 208" hereinafter) connected to and/or including a data storage unit 218, an artificial intelligence (AI) engine 220, and an application and service layer 222. In some embodiments, the artificial intelligence (AI) engine 220 is a machine learning (ML) engine. References to "machine learning engine 220" or "ML engine 220" may be extended to artificial intelligence (AI) engines 220 more generally. For the purposes of clarity, any user selected from various potential human or artificial users are referred to herein simply as the user 204. In some implementations, computing system 208 may be a centralized computing system; in some implementations, computing system 208 may be a distributed computing system. In some cases, user 204 may be considered part of ecosystem 200, while in other implementations, user 204 may be considered separately from ecosystem 200. Ecosystem 200 may include one or more DE tools 202, such as data analysis tool 202A, computer-aided design (CAD) and finite element analysis (FEA) tool 202B, simulation tool 202C, drug modeling and simulation (M&S) tools 202D-202E, manufacturing M&S tools 202F-202G, etc. Ecosystem 200 may also include a repository of common V&V products 210, such as regulatory standards 210A-210F related to the development and certification of a UAV, medical standard 210G (e.g., CE marking (Europe), FCC Declaration of Conformity (USA), IECEE CB Scheme (Europe, North America, parts of Asia & Australia), CDSCO (India), FDA (USA), etc.), medical certification regulation 210H (e.g., ISO 13485, ISO 14971, ISO 9001, ISO 62304, ISO 10993, ISO 15223, ISO 11135, ISO 11137, ISO 11607, IEC 60601, etc.), manufacturing standard 210I (e.g., ISO 9001, ISO 9013, ISO 10204, EN 1090, ISO 14004, etc.), and manufacturing certification regulation 210J (e.g., General Certification of Conformity (GCC), etc.), etc.

In FIG. 2, computing system 208 is centrally disposed within the architecture and is configured to communicate with (e.g., receive data from and transmit data to) user device 206A or API 206B such as an API associated with an artificial user, DE tools 202 via an API or software development kit (SDK) 214, and repository of common V&V products 210 via an API/SDK interface 216. For example, computing system 208 may be configured to communicate with user device 206A and/or API 206B to send or receive data corresponding to a prototype of a design, information about a user (e.g., user credentials), engineering-related inputs/outputs associated with DE tools 202, digitized common V&V products, an evaluation of a product design, user instructions (e.g., search requests, data processing instructions, etc.), and more. Computing system 208 may also be configured to communicate with one or more DE tools 202 to send engineering-related inputs for executing analyses, models, simulations, tests, etc. and to receive engineering-related outputs associated with the results. Computing system 208 may also be configured to communicate with repository of common V&V products 210 to retrieve data corresponding to one or more digitized common V&V products 210 and/or upload new common V&V products, such as those received from user 204, to repository of common V&V products 210. All communications may be transmitted and corroborated securely, for example, using methods relying on zero-trust security. In some implementations, the computing system of the ecosystem may interface with regulatory and/or certification authorities (e.g., via websites operated by the authorities) to retrieve digitized common V&V products published by the regulatory authorities that may be relevant for a product that a user is designing. In some implementations, the user may upload digitized common V&V products to the ecosystem themselves.

Computing and control system 208 may process and/or store the data that it receives to perform analysis and control functionalities, and in some implementations, may access machine learning engine 220 and/or application and service layer 222, to identify useful insights based on the data, as further described herein. The central disposition of computing system 208 within the architecture of the ecosystem has many advantages including reducing the technical complexity of integrating the various DE tools; improving the product development experience of user 204; intelligently connecting common V&V products such as standards 210A-210F to DE tools 202 most useful for satisfying requirements associated with the common V&V products; and enabling the monitoring, storing, and analysis of the various data that flows between the elements of the ecosystem throughout the product development process. In some implementations, the data flowing through and potentially stored by the computing system 208 can also be auditable to prevent a security breach, to perform data quality control, etc. Similarly, any analysis and control functions performed via computing system 208 may be tracked for auditability and traceability considerations.

Referring to one particular example shown in FIG. 2, user 204 may use the DE and certification ecosystem to produce a digitally certified UAV 212B. For example, user 204 may be primarily concerned with certifying the UAV as satisfying the requirements of a particular regulatory standard 210E relating to failure conditions of the UAV (e.g., "MIL-HDBK 516C 4.1.4-Failure Conditions"). In this usage scenario, user 204 may develop a digital prototype of the UAV on user device 206A or using API 206B and may transmit prototype data (e.g., as at least one of a CAD file, a MBSE file, etc.) to computing system 208. Along with the prototype data, user 204 can transmit, via user device 206A, additional data including an indication of the common V&V product that user 204 is interested in certifying the product for (e.g., regulatory standard 210E), user credential information for accessing one or more capabilities of computing system 208, and/or instructions for running one or more digital models, tests, and/or simulations using a subset of DE tools 202.

Referring to another example shown in FIG. 2, user 204 can use the DE and certification ecosystem to produce a digitally certified drug, chemical compound, or biologic 212A. For example, user 204 may be primarily concerned with certifying drug, chemical compound, or biologic 212A as satisfying the requirements of a particular medical standard 210G and medical certification regulation 210H. In this usage scenario, user 204 can develop a digital prototype of the drug, chemical compound, or biologic on user device 206A or using API 206B and can transmit the prototype data (e.g., as a molecular modeling file) to computing system 208. Along with the prototype data, user 204 can transmit, via user device 206A, additional data including an indication of the common V&V products that user 204 is interested in certifying the product for (e.g., medical standard 210G and medical certification regulation 210H), user credential information for accessing one or more capabilities of computing system 208, and/or instructions for running one or more digital models, tests, and/or simulations using a subset of DE tools 202 (e.g., drug M&S tools 202D-202E).

Referring to yet another example shown in FIG. 2, user 204 can use the digital engineering and certification ecosystem to produce a digitally certified manufacturing process 212C. For example, user 204 may be primarily concerned with certifying manufacturing process 212C as satisfying the requirements of a particular manufacturing standard 210I and manufacturing certification regulation 210J. In this usage scenario, user 204 can develop a digital prototype of the manufacturing process on user device 206A or using API 206B and can transmit the prototype data to computing system 208. Along with the prototype data, user 204 can transmit, via the user device 206A, additional data including an indication of the common V&V products that user 204 is interested in certifying the process for (e.g., manufacturing standard 210I and manufacturing certification regulation 210J), user credential information for accessing one or more capabilities of computing system 208, and/or instructions for running one or more digital models, tests, and/or simulations using a subset of DE tools 202 (e.g., manufacturing M&S tools 202F-202G).

In any of the aforementioned examples, computing system 208 can receive the data transmitted from user device 206A and/or API 206B and can process the data to evaluate whether the common V&V product of interest (e.g., regulatory standard 210E, medical standard 210G, medical certification regulation 210H, manufacturing standard 210I, manufacturing certification regulation 210J, etc.) is satisfied by the user's digital prototype, in the context of analysis and control plane 150 shown in FIG. 1. For example, this can involve communicating with the repository of common V&V products 210 via the API/SDK 216 to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, repository of common V&V products 210 can be hosted by a regulatory and/or certification authority (or another third party), and retrieving the regulatory and/or certification data can involve using API/SDK 216 to interface with one or more data resources maintained by the regulatory and/or certification authority (or the another third party). In some implementations, the regulatory and/or certification data can be provided directly by user 204 via user device 206A and/or API 206B (e.g., along with the prototype data).

Evaluating whether the common V&V product of interest is satisfied by the user's digital prototype can also involve processing the prototype data received from user device 206A or API 206B to determine if the one or more identified requirements are actually satisfied. In some implementations, computing system 208 can include one or more plugins, local applications, etc. to process the prototype data directly at the computing system 208. For example, model splicing and digital threading applications are discussed in detail later with reference to FIGS. 6 to 9. In some implementations, the computing system can simply pre-process the received prototype data (e.g., to derive inputs for DE tools 202) and can then transmit instructions and/or input data to a subset of DE tools 202 via API/SDK 214 for further processing.

Not all DE tools 202 are necessarily required for the satisfaction of particular regulatory and/or certification standards. Therefore, in the UAV example provided in FIG. 2, computing system 208 may determine that only a data analysis tool 202A and a finite element analysis tool 202B are required to satisfy regulatory standard 210E for failure conditions. In the drug, chemical compound, or biologic example provided in FIG. 2, computing system 208 may determine that only drug M&S tools 202D-202E are required to satisfy medical standard 210G and medical certification regulation 210H. In the manufacturing process example provided in FIG. 2, computing system 208 may determine that only manufacturing M&S tools 202F-202G are required to satisfy manufacturing standard 210I and manufacturing certification regulation 210J. In other implementations, user 204 may themselves identify the particular subset of DE tools 202 that should be used to satisfy the common V&V product of interest, provided that user 204 is a qualified subject matter expert (SME). In other implementations, user 204 may input to computing system 208 some suggested DE tools 202 to satisfy a common V&V product of interest, and computing system 208 can recommend to user 204 a modified subset of DE tools 202 for final approval by user 204, provided that user 204 is a qualified SME. After a subset of DE tools 202 has been identified, computing system 208 can then transmit instructions and/or input data to the identified subset of DE tools 202 to run one or more models, tests, and/or simulations. The results (or "engineering-related data outputs" or "digital artifacts") of these models, tests, and/or simulations can be transmitted back and received at computing system 208.

In still other implementations, user 204 may input a required DE tool such as 202F for meeting a common V&V product 210I, and the computing system 208 can determine that another DE tool such as 102G is also required to satisfy common V&V product 210I. The computing system can then transmit instructions and/or input data to both DE tools (e.g., 202F and 202G), and the outputs of these DE tools can be transmitted and received at computing system 208. In some cases, the input data submitted to one of the DE tools (e.g., 202G) can be derived (e.g., by computing system 208) from the output of another of the DE tools (e.g., 202F).

After receiving engineering-related data outputs or digital artifacts from DE tools 202, computing system 208 can then process the received engineering-related data outputs to evaluate whether or not the requirements identified in the common V&V product of interest (e.g., regulatory standard 210E, medical standard 2110G, medical certification regulation 210H, manufacturing standard 210I, manufacturing certification regulation 210J, etc.) are satisfied. For example, applications and services 222 may provide instructions for orchestrating validation or verification activities. In some implementations, computing system 208 can generate a report summarizing the results of the evaluation and can transmit the report to device 206A or API 206B for review by user 204. If all of the requirements are satisfied, then the prototype can be certified, resulting in digitally certified product 212 (e.g., digitally certified drug, chemical compound, or biologic 212A; digitally certified UAV 212B; digitally certified manufacturing process 212C, etc.). However, if some of the regulatory requirements are not satisfied, then additional steps may need to be taken by user 204 to certify the prototype of the product. In some implementations, the report that is transmitted to the user can include recommendations for these additional steps (e.g., suggesting one or more design changes, suggesting the replacement of one or more components with a previously designed solution, suggesting one or more adjustments to the inputs of the models, tests, and/or simulations, etc.). If the requirements of a common V&V product are partially met, or are beyond the collective capabilities of distributed engineering tools 202, computing systems 208 may provide user 204 with a report recommending partial certification, compliance, or fulfillment of a subset of the common V&V products (e.g., digital certification of a subsystem or a sub-process of the prototype). The process of generating recommendations for user 204 is described in further detail below.

In response to reviewing the report, user 204 can make design changes to the digital prototype locally and/or can send one or more instructions to computing system 208 via user device 206A or API 206B. These instructions can include, for example, instructions for computing system 208 to re-evaluate an updated prototype design, use one or more different DE tools 202 for the evaluation process, and/or modify the inputs to DE tools 202. Computing system 208 can, in turn, receive the user instructions, perform one or more additional data manipulations in accordance with these instructions, and provide user 204 with an updated report. Through this iterative process, user 204 can utilize the interconnected digital engineering and certification ecosystem to design and ultimately certify (e.g., by providing certification compliance information) the prototype (e.g., the UAV prototype, drug prototype, manufacturing process prototype, etc.) with respect to the common V&V product of interest. Importantly, since all of these steps occur in the digital world (e.g., with digital prototypes, digital models/tests/simulations, and digital certification), significant amount of time, cost, and materials can be saved in comparison to a process that would involve the physical prototyping, evaluation and/or certification of a similar UAV, drug, manufacturing process, etc. If the requirements associated with a common V&V product are partially met, or are beyond the collective capabilities of DE tools 202, computing system 208 may provide user 204 with a report recommending partial certification, compliance or fulfillment of a subset of the common V&V products (e.g., digital certification of a subsystem or a sub-process of the prototype).

While the examples described above focus on the use of the interconnected digital engineering and certification ecosystem by a single user, additional advantages of the ecosystem can be realized through the repeated use of the ecosystem by multiple users. As mentioned above, the central positioning of computing system 208 within the architecture of the ecosystem enables computing system 208 to monitor and store the various data flows through the ecosystem. Thus, as an increasing number of users utilize the ecosystem for digital product development, data associated with each use of the ecosystem can be stored (e.g., in storage 218), traced (e.g., with metadata), and analyzed to yield various insights, which can be used to further automate the digital product development process and to make the digital product development process easier to navigate for non-subject matter experts.

Indeed, in some implementations, user credentials for user 204 can be indicative of the skill level of user 204, and can control the amount of automated assistance the user is provided. For example, non-subject matter experts may only be allowed to utilize the ecosystem to browse pre-made designs and/or solutions, to use DE tools 202 with certain default parameters, and/or to follow a predetermined workflow with automated assistance directing user 204 through the product development process. Meanwhile, more skilled users may still be provided with automated assistance, but may be provided with more opportunities to override default or suggested workflows and settings.

In some implementations, computing system 208 can host applications and services 222 that automate or partially automate components of common V&V products; expected or common data transmissions, including components of data transmissions, from user 204; expected or common interfaces and/or data exchanges, including components of interfaces, between various DE tools 202; expected or common interfaces and/or data exchanges, including components of interfaces, with machine learning (ML) models implemented on computing system 208 (e.g., models trained and/or implemented by the ML engine 220); and expected or common interfaces and/or data exchanges between the applications and services themselves (e.g., within applications and services layer 222).

In some implementations, the data from multiple uses of the ecosystem (or a portion of said data) can be aggregated to develop a training dataset. For example, usage records 217 collected via computing system 208 may be de-identified or anonymized, before being added to the training set. Such usage records may comprise model parameters and metadata, tool configurations, common V&V product matching to specific models or tools, user interactions with the system including inputs and actions, and other user-defined or system-defined configurations or decisions in using the ecosystem for digital engineering and certification. For instance, an exemplary de-identified usage record may comprise the combination of a specific DE tool, a specific target metric, a specific quantity deviation, and a corresponding specific user update to a DE model under this configuration. Another exemplary de-identified usage record may comprise a user-identified subset of DE tools 202 that should be used to satisfy a common V&V product of interest.

This training dataset can then be used to train ML models (e.g., using ML engine 220) to learn the steps and actions for certification processes and to perform a variety of tasks including the identification of which of DE tools 202 to use to satisfy a particular common V&V product; the identification of specific models, tests, and/or simulations (including inputs to them) that should be performed using DE tools 202; the identification of the common V&V products that need to be considered for a product of a particular type; the identification of one or more recommended actions for user 204 to take in response to a failed regulatory requirement; the estimation of model/test/simulation sensitivity to particular inputs; etc. The outputs of the trained ML models can be used to implement various features of the interconnected digital engineering and certification ecosystem including automatically suggesting inputs (e.g., inputs to DE tools 202) based on previously entered inputs, forecasting time and cost requirements for developing a product, predictively estimating the results of sensitivity analyses, and even suggesting design changes, original designs or design alternatives (e.g. via assistive or generative AI) to a user's prototype to overcome one or more requirements (e.g., regulatory and/or certification requirements) associated with a common V&V product. In some implementations, with enough training data, ML engine 220 may generate new designs, models, simulations, tests, common V&V products and/or digital threads on its own based on data collected from multiple uses of the ecosystem. Furthermore, such new designs, models, simulations, tests, common V&V products and digital threads generated by ML engine 220, once approved and adjusted by a user, may be added to the training set for further fine-tuning of ML algorithms in a reinforcement learning setup.

As shall be discussed in the context of FIGS. 7 to 9 and 11 to 33, the aforementioned collection of training datasets and the training of ML and AI modules including ML engine 220 may be enabled by model splicing technologies. Model splicing, as described herein, allows the scripting of DE model operations encompassing disparate DE tools into a corpus of normative program code, and facilitates the code-defined digital threading of a large space of DE activities involving DE models across different disciplines. ML and AI techniques may be used to create scripts to carry out almost any DE task and to execute any digital thread, allowing for programmable, machine-learnable, and dynamic changes to DE model files, digital threads, and ultimately to digital or physical twins, throughout the product life cycle. For example, in the embodiment shown in FIG. 2, ML engine 220 may manage or orchestrate the interactions between spliced DE models, DE tools, and common V&V products (e.g., DE requirements), based on digital thread options specific to user's intent and input. Sample DE tasks that may be carried out by ML engine 220 include, but are not limited to, (1) aligning models/analysis to certification lifecycle requirement steps, (2) optimizing compute by determining the appropriate fidelity of each model, (3) optimizing compute resources for specific tools/models, or (4) optimizing compute resources across multiple models. ML-enabled executions of DE tasks are not limited to certification or resource optimization, but encompass the whole DE space of operations. Rather, ML engine 220 may act as an AI multiplexer for the DE platform.

In addition to storing usage data to enable the development of ML models, previous prototype designs and/or solutions (e.g., previously designed components, systems, models, simulations and/or other engineering representations thereof) can be stored within the ecosystem (e.g., in storage 218) to enable users to search for and build upon the work of others. For example, previously designed components, systems, models, simulations and/or other engineering representations thereof can be searched for by user 204 and/or suggested to user 204 by computing system 208 in order to satisfy one or more requirements associated with a common V&V product. The previously designed components, systems, models, simulations and/or other engineering representations thereof can be utilized by user 204 as is, or can be utilized as a starting point for additional modifications. This store, or repository, of previously designed components, systems, models, simulations and/or other engineering representations thereof (whether or not they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with user 204 can be checked by computing system 208 to determine which designs and/or solutions stored in the repository can be accessed by user 204. In some implementations, usage of the previously designed components, systems, models, simulations and/or other engineering representations thereof may be available only to other users who pay a fee for a usage.

Exemplary IDEP Implementation Architecture with Services and Features

FIG. 3 shows another exemplary implementation of the IDEP illustrating its offered services and features, in accordance with some embodiments of the present invention. Specifically, an exemplary implementation architecture diagram 300 is shown in FIG. 3 to include multiple illustrative components: an IDEP enclave 302, cloud services 304, and a customer environment 310 which optionally includes an IDEP exclave 316. This exemplary architecture 300 for the IDEP is designed in accordance with zero-trust security principles and is further designed to support scalability as well as robust and resilient operations. IDEP enclave 302 and IDEP exclave 316 together instantiate IDEP 100 shown in FIG. 1, with IDEP exclave 316 implementing model splicing and splice plane 170 in some embodiments of the present invention. An enclave is an independent set of cloud resources that are partitioned to be accessed by a single customer (i.e., single-tenant) or market (i.e., multi-tenant) that does not take dependencies on resources in other enclaves. An exclave is a set of cloud resources outside enclaves managed by the IDEP, to perform work for individual customers. Examples of exclaves include virtual machines (VMs) and/or servers that the IDEP maintains to run DE tools for customers who need such services.

In particular, IDEP enclave or DE platform enclave 302 may serve as a starting point for services rendered by the IDEP, and may be visualized as a central command and control hub responsible for the management and orchestration of all platform operations. For example, enclave 302 may be implemented using computer system 208 of the interconnected DE and certification ecosystem shown in FIG. 2. DE platform enclave 302 is designed to integrate both zero-trust security models and hyperscale capabilities, resulting in a secure and scalable processing environment tailored to individual customer needs. Zero-trust security features include, but are not limited to, strict access control, algorithmic impartiality, and data isolation. Enclave 302 also supports an ML engine such as 220 for real-time analytics, auto-scaling features for workload adaptability, and API-based interoperability with third-party services. Security and resource optimization are enhanced through multi-tenancy support, role-based access control, and data encryption both at rest and in transit. DE platform enclave 302 may also include one or more of the features described below.

First, IDEP enclave 302 may be designed in accordance with zero-trust security principles. In particular, DE platform enclave 302 may employ zero-trust principles to ensure that no implicit trust is assumed between any elements, such as digital models, platform agents or individual users (e.g., users 204) or their actions, within the system. That is, no agent may be inherently trusted and the system may always authenticate or authorize for specific jobs. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

IDEP enclave 302 can also be designed to maintain isolation and independence. A key aspect of the enclave's architecture is its focus on impartiality and isolation. DE enclave 302 disallows cryptographic dependencies from external enclaves and enforces strong isolation policies. The enclave's design also allows for both single-tenant and multi-tenant configurations, further strengthening data and process isolation between customers 306 (e.g., users 204). Additionally, DE enclave 302 is designed with decoupled resource sets, minimizing interdependencies and thereby promoting system efficiency and autonomy.

IDEP enclave 302 can further be designed for scalability and adaptability, aligning well with varying operational requirements. For example, the enclave 302 can incorporate hyperscale-like properties in conjunction with zero-trust principles to enable scalable growth and to handle high-performance workloads effectively.

IDEP enclave 302 can further be designed for workflow adaptability, accommodating varying customer workflows and DE models through strict access control mechanisms. This configurability allows for a modular approach to integrate different functionalities ranging from data ingestion to algorithm execution, without compromising on the zero-trust security posture. Platform 300's adaptability makes it highly versatile for a multitude of use-cases, while ensuring consistent performance and robust security.

IDEP enclave 302 can further be designed to enable analytics for robust platform operations. At the core of the enclave's operational efficiency is a machine learning engine (e.g., machine learning engine 220) capable of performing real-time analytics. This enhances decision-making and operational efficiency across platform 300. Auto-scaling mechanisms can also be included to enable dynamic resource allocation based on workload demand, further adding to the platform's responsiveness and efficiency.

In the exemplary embodiment shown in FIG. 3, IDEP enclave 302 includes several components as described in further detail herein.

A "Monitoring Service Cell. may provide "Monitoring Service" and "Telemetry Service." A cell may refer to a set of microservices, for example, a set of microservices executing within a kubernetes pod. These components focus on maintaining, tracking and analyzing the performance of platform 300 to ensure good service delivery, including advanced machine learning capabilities for real-time analytics. A "Search Service Cell" provides "Search Service" to aid in the efficient retrieval of information from DE platform 300, adding to its overall functionality. A "Logging Service Cell" and a "Control Plane Service Cell" provide "Logging Service," "File Service", and "Job Service" to record and manage operational events and information flow within platform 300, and are instrumental in the functioning of platform 300. A "Static Assets Service Cell," provides "Statics Service", and may house user interface, SDKs, command line interface (CLI), and documentation for platform 300. An "API Gateway Service Cell" provides "API Gateway Service," and may provide DE platform API(s) (e.g., APIs 214, 216) and act as a mediator for requests between the client applications (e.g., DE tools 202, the repository of common V&V products 210, etc.) and the platform services. In some embodiments, the API gateway service cell may receive and respond to requests from agents such as DE platform exclave 316 to provide splice functions for model splicing purposes.

As shown in FIG. 3, the architecture of DE platform 300 may also include a cloud services 304 that provide services which cannot interact with customer data but can modify the software for the orchestration of DE platform operations. In example implementations, several cloud resources provide support and foundational services to the platform. For example, in the embodiment of the DE platform 300 shown in FIG. 3, cloud services 304 includes a "Customer Identity and Access Management (IAM) Service" that ensures secure and controlled access to platform 300. Cloud services 304 also includes a "Test Service" that tests tools to validate platform operations. Cloud services 304 may also include an "Orchestration Service" that controls and manages the lifecycle of containers on the platform 300. Cloud services 304 may also include an "Artifact Service" and "Version Control and Build Services," which may be used to maintain the evolution of projects, codes, and instances in the system, while also managing artifacts produced during the product development process.

As shown in FIG. 3, the architecture of DE platform 300 may also include a customer environment 310 with an "Authoritative Source of Truth" 312, customer tools 314, and an optional DE platform exclave 316. Customer environment 310 is where customer data resides and is processed in a zero-trust manner by DE platform 300. As described previously, DE platform enclave 302, by focusing on both zero-trust principles and hyperscale-like properties, provides a robust and scalable environment for the secure processing of significant workloads, according to the customer's unique needs. In some examples, DE platform exclave 316 may be situated within customer environment 310 in order to assist the customer(s) 306 with their DE tasks and operations, including model splicing and digital threading.

When a customer 306 (e.g., user 204) intends to perform a DE task using DE platform 300 (e.g., IDEP 100), typical operations may include secure data ingestion and controlled data retrieval. Derivative data generated through the DE operations, such as updated digital model files or revisions to digital model parameters, may be stored only within customer environment 310, and DE platform 300 may provide tools to access the metadata of the derivative data. Here metadata refers to data that can be viewed without opening the original data, and may comprise versioning information, time stamps, access control properties, and the like. Example implementations may include secure data ingestion, which utilizes zero-trust principles to ensure customer data is securely uploaded to customer environment 310 through a pre-validated secure tunnel, such as Secure Socket Layer (SSL) tunnel. This can enable direct and secure file transfer to a designated cloud storage, such as a simple storage service (S3) bucket, within customer environment 310. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within customer environment 310 while adhering to zero-trust security protocols. Example implementations may also include tokenization utility, in which a specialized DE platform tool referred to as a "tokenizer" is deployed within customer environment 310 for secure management of derivative metadata, conforming to zero-trust guidelines.

Customer environment 310 may interact with other elements of secure DE platform 300 and includes multiple features that handle data storage and secure interactions with platform 300. For example, one element of the customer environment 310 is "Authoritative Source of Truth" 312, which is a principal repository for customer data, ensuring data integrity and accuracy. Nested within this are "Customer Buckets" where data is securely stored with strict access controls, limiting data access to authorized users or processes through pre-authenticated URL links. This setup ensures uncompromising data security within customer environment 310 while providing smooth interactions with other elements of DE platform 300.

Customer environment 310 may also include additional software tools such as customer tools 314 that can be utilized based on specific customer requirements. For example, a "DE Tool Host" component may handle necessary DE applications for working with customer data. It may include a DE Tools Command-Line Interface (DET CLI), enabling user-friendly command-line operation of DE tools (e.g., DE tools 102). A "DE platform Agent" ensures smooth communication and management between customer environment 310 and elements of DE platform 300. Furthermore, there can be another set of optional DE tools designed to assist customer-specific DE workflows. Native DE tools are typically access-restricted by proprietary licenses and end-user license agreements paid for by the customer. IDEP platform functions call upon native DE tools that are executed within customer environment 310, therefore closely adhering to the zero-trust principle of the system design. Exemplary DE tools include, but are not limited to, proprietary and open-source versions of model-based systems engineering (MBSE) tools, augmented reality (AR) tools, computer aided design (CAD) tools, data analytics tools, modeling and simulation (M&S) tools, product lifecycle management (PLM) tools, multi-attribute trade-space tools, simulation engines, requirements model tools, electronics model tools, test-plan model tools, cost-model tools, schedule model tools, supply-chain model tools, manufacturing model tools, cyber security model tools, or mission effects model tools.

In some cases, an optional "IDEP Exclave" 316 may be employed within customer environment 310 to assist with customer DE tasks and operations, supervise data processing, and rigorously adhering to zero-trust principles while delivering hyperscale-like platform performance. IDEP exclave 316 is maintained by the IDEP to run DE tools for customers who need such services. IDEP exclave 316 may contain a "DE Tool Host" that runs DE tools and a "DE Platform Agent" necessary for the operation. Again, native DE tools are typically access-restricted by proprietary licenses and end-user license agreements paid for by the customer. IDEP exclave 316 utilities and manages proprietary DE tools hosted with customer environment 310, for example, to implement model splicing and digital threading functionalities.

In some embodiments, the machine learning (ML) models and artificial intelligence (AI) assistance approaches as described herein adapt to suit different customer instances of the IDEP (see FIG. 4) and the availability of training data. In an example, a pre-trained ML or AI model (e.g. within the IDEP enclave 302) is deployed in instances where there are restrictions around sharing customer data. In another example, AI models are deployed in a federated manner adjacent to DE agents and DE tools in the customer environment (e.g., within IDEP exclave 316). In another example, an AI model deployed inside the customer environment is trained behind its firewalls. In yet another example, the customer may allow sharing of subsets of their metadata for a training database located within the IDEP enclave.

IDEP Deployment Scenarios

FIG. 4 shows potential scenarios for instantiating an IDEP in connection to a customer's physical system and IT environment, in accordance with some embodiments of the present invention. Specifically, FIG. 4 illustrates various potential configurations for instancing or instantiating an IDEP ("DE platform) 402 in connection to a customer's IT environment and physical system 404. The IT environment may be located on a virtual private cloud (VPC) protected by a firewall. The physical system may refer to a physical twin as discussed with reference to FIG. 1. In some embodiments, IDEP 402 may be instanced as an enclave such as 302 shown in FIG. 3. For example, IDEP 402 may be instanced on the cloud, possibly in a software-as-a-service (SaaS) configuration. The platform instances in these embodiments include software and algorithms, and may be described as follows:

1. External Platform Instance 410: This option showcases the IDEP as a separate platform instance. The platform interacts with the physical system through the customer's virtual environment, or a Customer Virtual Private Cloud ("Customer VPC"), which is connected to the physical system.
2. External Platform Instance with Internal Agent 420: The IDEP is instantiated as a separate platform, connected to an internal agent ("DE Agent") wholly instanced within the Customer VPC. For example, the IDEP may be instantiated as enclave 302, and the DE agent may be instantiated as exclave 316 within the Customer VPC linked to the physical system.
3. External Platform Instance with Internal Agent and Edge Computing 430: This scenario displays the IDEP as a separate instantiation, connected to an internal DE Agent wholly instanced within the Customer VPC, which is further linked to an edge instance ("DE Edge Instance") on the physical system. The DE agent is nested within the customer environment, with a smaller edge computing instance attached to the physical system.

4. Edge Instance Connection 440: This option shows the DE platform linked directly to an DE edge instance on the physical system. The DE platform and the physical system are depicted separately, connected by an edge computing instance in the middle, indicating the flow of data.
5. Direct API Connection 450: This deployment scenario shows the DE platform connecting directly to the physical system via API calls. In this depiction, an arrow extends directly from the platform sphere to the physical system sphere, signifying a direct interaction through API.
6. Air-Gapped Platform Instance 460: This scenario illustrates the IDEP being completely instanced on an air-gapped, or isolated, physical system as a DE agent. The platform operates independently from any networks or Internet connections, providing an additional layer of security by eliminating external access points and potential threats. Interaction with the platform in this context would occur directly on the physical system, with any data exchange outside the physical system being controlled following strict security protocols to maintain the air-gapped environment.

Across these deployment scenarios, the IDEP plays an important role in bridging the gap between a digital twin (DTw) established through the IDEP and its physical counterpart. Regardless of how the IDEP is instantiated, it interacts with the physical system, directly or through the customer's virtual environment. The use of edge computing instances in some scenarios demonstrates the need for localized data processing and the trade-offs between real-time analytics and more precise insights in digital-physical system management. Furthermore, the ability of the platform to connect directly to the physical system through API calls underscores the importance of interoperability in facilitating efficient data exchange between the digital and physical worlds. In all cases, the DE platform operates with robust security measures.

In some embodiments, the IDEP deployment for the same physical system can comprise a combination of the deployment scenarios described above. For example, for the same customer, some physical systems may have direct API connections to the DE platform (scenario 5), while other physical systems may have an edge instance connection (scenario 4).

Multimodal User Interfaces

Figure 5:
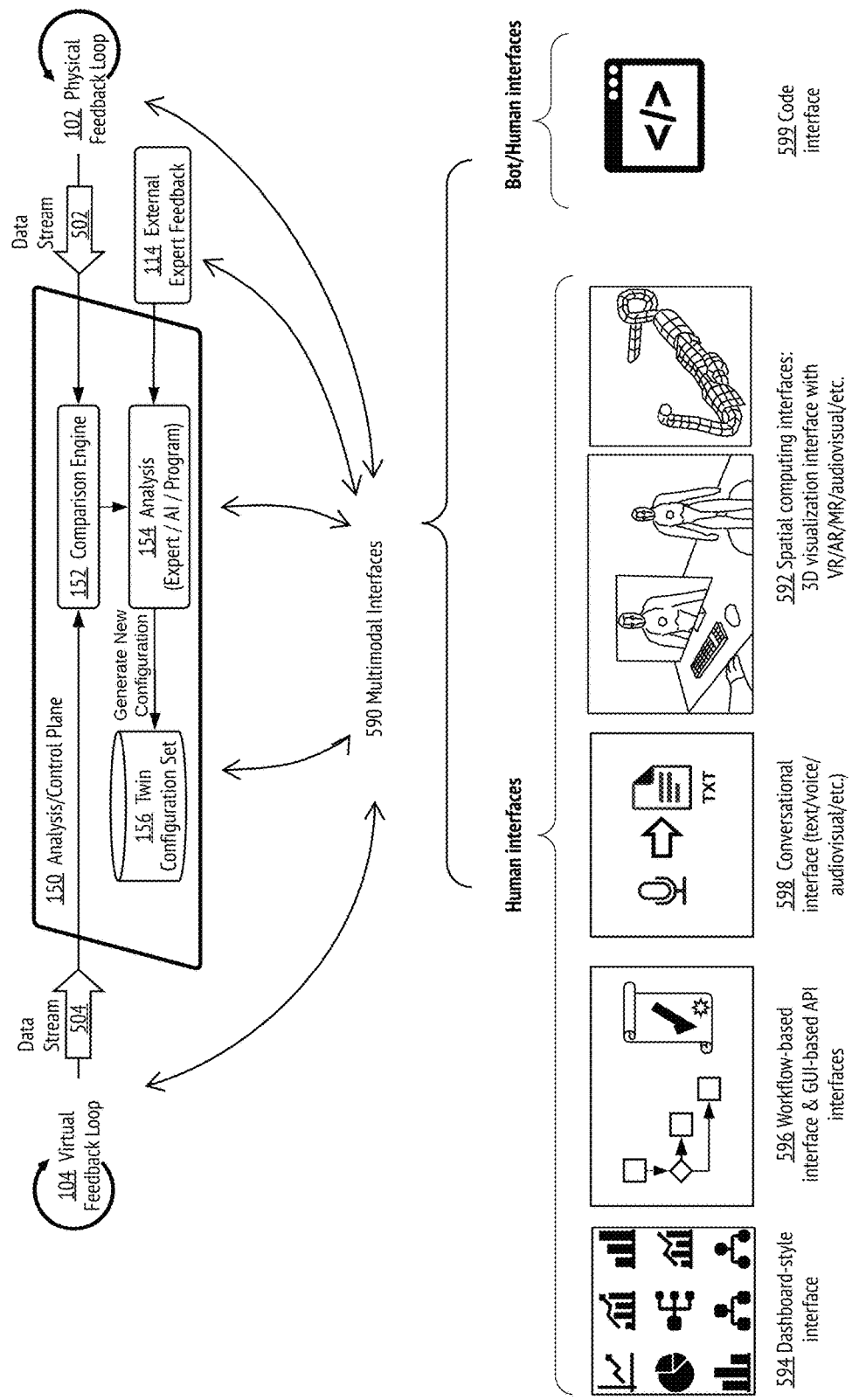
FIG. 5 shows exemplary multimodal interface designs for integration of feedback in an IDEP, in accordance with some embodiments of the present invention.

FIG. 5 illustrates the use of multimodal user interfaces 590 for the interconnected DE platform, which can handle various input and output modalities such as Virtual Reality (VR), Mixed Reality (MR), auditory, text, and code. These interfaces are designed to manage the complexity of data streams and decision-making processes, and provide decision support including option visualization, impact prediction, and specific decision invocation. Specifically, data streams 502 and 504 are processed in the Analysis & Control Plane (ACP) 150 of FIG. 1. The user interface may receive data streams from physical and virtual feedback loops 102 and 104, as well as external expert feedback 114, analysis module 154, and twin configuration set 156 of ACP 150.

The multimodal interfaces illustrated in FIG. 5 are configured to carry out all the DE tasks and actions described in the context of FIG. 1, by catering to both humans and bots/algorithms, handling the intricacies of data stream frequency and complexity, decision-making time scales, and latency impacts. In the case of human decision makers, the user interface may need to manage inputs and outputs while for algorithmic decision making, the user interface may need to present rationale and decision analysis to human users. Some examples of human interfaces include a dashboard-style interface 594, a workflow-based interface 596, conversational interfaces 598, spatial computer interfaces 592, and code interfaces 599.

Dashboard-style interface 594 offers a customizable overview of data visualizations, performance metrics, and system status indicators. It enables monitoring of relevant information, sectional review of documents, and decision-making based on dynamic data updates and external feedback. Such an interface may be accessible via web browsers and standalone applications on various devices.

Workflow-based interface 596 guides users through the decision-making process, presenting relevant data, options, and contextual information at each stage. It integrates external feedback and is designed as a progressive web app or a mobile app. In the context of alternative tool selection, workflow-based interface 596 may provide options on individual tools at each stage, or provide combinations of tool selections through various stages to achieve better accuracy or efficiency for the overall workflow.

Conversational interfaces 598 are based on the conversion of various input formats such as text, prompt, voice, audio-visual, etc. into input text, then integrating the resulting input text within the DE platform workflow. Outputs from the DE platform may undergo the reverse process. This enables interoperability with the DE platform, and specifically the manipulation of model splices. In the broad context of audio-visual inputs, the conversational interfaces may comprise data sonification, which involves using sound to represent data, information, or events, and using auditory cues or patterns to communicate important information to users, operators, or reviewers. Sonified alerts (e.g., alerts sent via sound, e.g., via a speaker) are especially useful when individuals need to process information quickly without having to visually focus on a screen. For example, sonified alerts can be used to notify security analysts of potential threats or breaches.

FIG. 5 also illustrates the use of spatial computing interfaces 592 and code interfaces 599 in the management of DTws and PTws. Spatial computing interfaces allow for more immersive and intuitive user experiences, and enable real-time synchronization between DTws and PTws. Code interfaces allow bots and digital engineers to interact with the DE platform through scripting and code. It also allows the collection of user preference, task history, and tool usage patterns for alternative tool selection purposes.

Digital Threads and Autonomous Data Linkages

As discussed previously, a "digital thread" is intended to connect two or more digital engineering (DE) models for traceability across the systems engineering lifecycle, and collaboration and sharing among individuals performing DE tasks. In a digital thread, appropriate outputs from a preceding digital model may be provided as the inputs to a subsequent digital model, allowing for information and process flow. That is, a digital thread may be viewed as a communication framework or data-driven architecture that connects traditionally siloed elements to enable the flow of information and actions between digital models.

Figure 6:
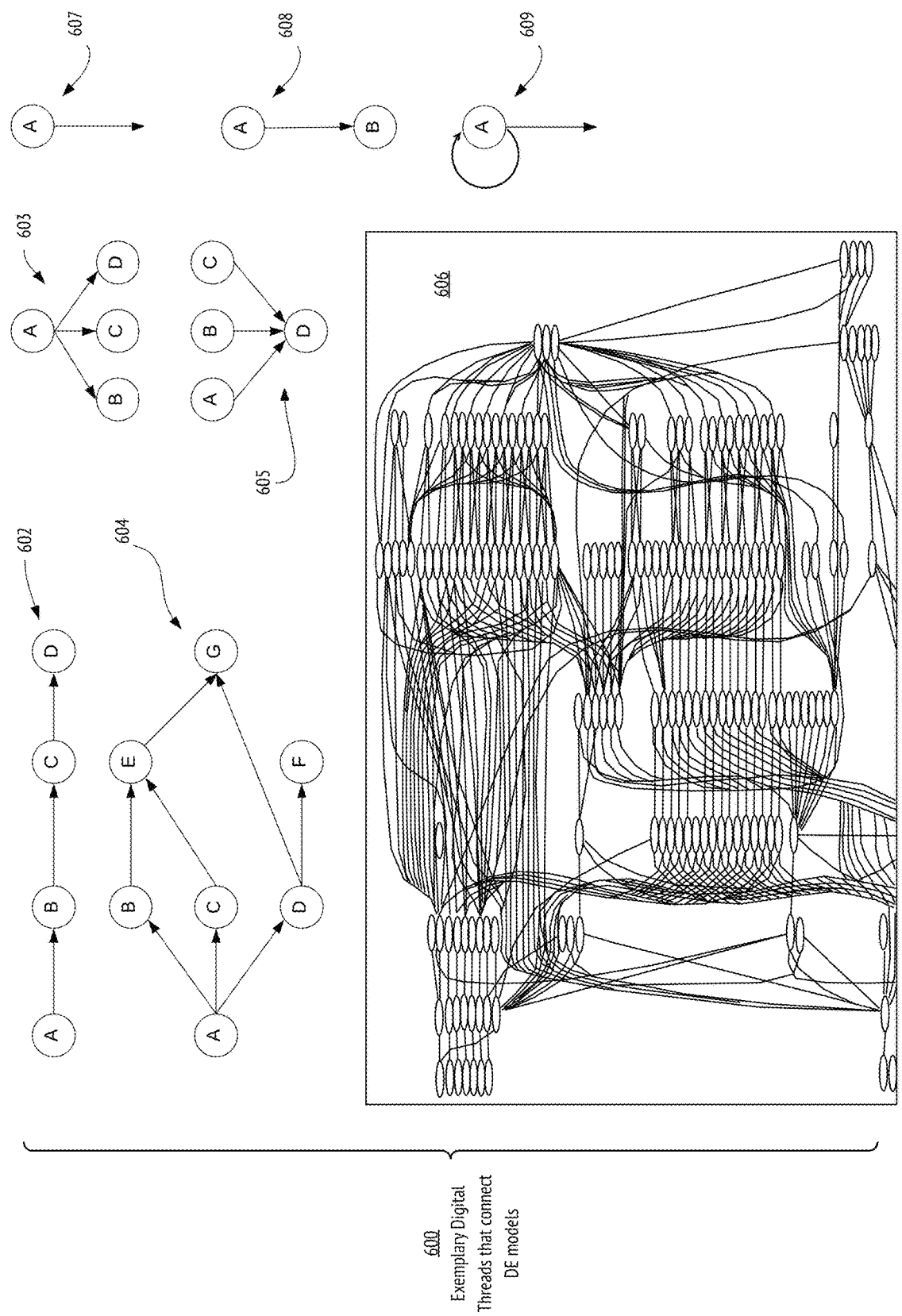
FIG. 6 is a schematic diagram comparing exemplary digital threads that connect DE models, in accordance with some embodiments of the present invention.

FIG. 6 describes the architecture and inherent complexity of digital threads, in accordance with the examples disclosed herein. Specifically, FIG. 6 is a schematic diagram comparing exemplary digital threads 600 of various complexities that manipulate and/or connect DE models, in accordance with some embodiments of the present invention. In the most basic sense, a digital thread may "thread" together DE models into a simple daisy-chain architecture 602 where modifications in any upstream DE model will affect all DE models downstream from the modified DE model. For example, a modification of any parameter or process of a DE model B will cause changes in DE model C, which in turn will cause changes in DE model D. Cause-and-effect changes will therefore cascade downstream. As another example, diagram 604 represents a more complex digital thread where a change in one DE model may affect more than one downstream model. In both 602 and 604, digital threads are represented by a directed acyclic graph (DAG).

DAGs are frequently used in many kinds of data processing and structuring tasks, such as scheduling tasks, data compression algorithms, and more. In the context of service platforms and network complexities, a DAG might be used to represent the relationships between different components or services within the platform. In digital thread 604, different models may depend on each other in different ways. Model A may affect models B, C, and D, with models B and C affecting model E, and models D and E affecting model G. Such dependencies are denoted as a DAG, where each node is associated with a component (e.g., a model), and each directed edge represents a dependency.

A major issue with dealing with interdependent DE models is that graph consistencies can be polynomial, and potentially exponential, in complexity. Hence, if a node fails (e.g., a model is unreliable), this can have a cascading effect on the rest of the digital thread, disrupting the entire design. Furthermore, adding nodes or dependencies to the graph does not yield a linear increase in complexity because of the interdependencies between models. If a new model is added that affects or depends on several existing models, the resulting increase in graph complexity is multiplicative in nature, hence potentially exponential. The multiplicative nature of digital thread consistencies is compounded by the sheer number of interconnected models, which may number in the hundreds or thousands. Diagram 606 is a partial representation of a real-world digital thread, illustrating the complexity of digital threads and its multiplicative growth.

FIG. 6 further shows special cases 603, 605, 607, 608, and 609 of exemplary simple digital threads. Diagram 607 represents a degenerate digital thread where data is shared from a single DE model. Diagram 608 represents a model-to-document digital thread where data (e.g., system attributes, performance attributes) extracted from a single DE model may be used to generate or update a text-based document (e.g., a Capability Development Document (CDD)). Diagrams 603 and 605 are generalized from 608 to represent cases where data extracted from a single model may be used to update multiple models, or vice versa. Specifically, diagram 605 may represent the dynamic updates of live or magic documents discussed in the context of FIG. 1. Here the logic to connect the DE models shown is very simple: data are extracted from multiple DE models A, B, and C to update a document model D. There are no interactions between the extracted data. Furthermore, diagram 609 shows a special case of a digital thread where data is loaded to and extracted from only a single model A. For example, as discussed in the context of FIG. 7 next, input splice functions of the model A shown in 609 may be executed to update the model, and output splice functions of model A shown in 609 may be executed to produce digital artifacts for sharing. For these special simple threads, the IDEP may provide a GUI-based interface to the user to connect the models and execute the digital threads. For complex threads such as 606, a code-based interface may be necessary.

Model Splicing for Digital Threading and Digital Twin Generation

As disclosed herein, model splicing encapsulates and compartmentalizes digital engineering (DE) model data and model data manipulation and access functionalities. As such, model splices provide access to selective model data within a DE model file without exposing the entire DE model file, with access control to the encapsulated model data based on user access permissions. Model splicing also provides the DE model with a common, externally-accessible Application Programming Interface (API) for the programmatic execution of DE models. Model splices thus generated may be shared, executed, revised, or further spliced independently of the native DE tool and development platform used to generate the input digital model. The standardization of DE model data and the generalization of API interfaces and functions allow the access of DE model type files outside of their native software environments, and enable the linking of different DE model type files that may not previously be interoperable. Model splicing further enables the scripting and codification of DE operations encompassing disparate DE tools into a corpus of normative program code, facilitating the generation and training of artificial intelligence (AI) and machine learning (ML) models for the purpose of manipulating DE models through various DE tools across different stages of a DE process, DE workflow, or a DE life cycle.

Digital threads are created through user-directed and/or autonomous linking of model splices. A digital thread is intended to connect two or more DE models for traceability across the systems engineering life cycle, and collaboration and sharing among individuals performing DE tasks. In a digital thread, appropriate outputs from a preceding digital model are provided as inputs to a subsequent digital model, allowing for information flow. That is, a digital thread may be viewed as a communication framework or data-driven architecture that connects traditionally siloed elements to enable the flow of information between digital models. The extensibility of model splicing over many different types of DE models and DE tools enables the scaling and generalization of digital threads to represent each and every stage of the DE life cycle.

A digital twin (DTw) is a real-time virtual replica of a physical object or system, with bi-directional information flow between the virtual and physical domains, allowing for monitoring, analysis, and optimization. Model splicing allows for making individual DE model files into executable splices that can be autonomously and securely linked, thus enabling the management of a large number of DE models as a unified digital thread. Such a capability extends to link previously non-interoperable DE models to create digital threads, receive external performance and sensor data streams (e.g., data that is aggregated from DE models or linked from physical sensor data), calibrate digital twins with data streams from physical sensors outside of native DTw environments, and receive expert feedback that provides opportunity to refine simulations and model parameters.

Unlike a DTw, a virtual replica, or simulation, is a mathematical model that imitates real-world behavior to predict outcomes and test strategies. Digital twins use real-time data and have bidirectional communication, while simulations focus on analyzing scenarios and predicting results. In other words, a DTw reflects the state of a physical system in time and space. A simulation is a set of operations done on digital models that reflects the potential future states or outcomes that the digital models can progress to in the future. A simulation model is a DE model within the context of the IDEP as disclosed herein.

When testing different designs, such as variations in wing length or chord dimensions, multiple DTws (sometimes numbering in 100s to 1,000s) may be created, as a bridge between design specifications and real-world implementations of a system, allowing for seamless updates and tracking of variations through vast numbers of variables, as detailed in the context of FIG. 1. As an example, if three variations of a system are made, each one would have its own DTw with specific measurements. These DTws may be accessed and updated via API function scripts, which allow for easy input of new measurements from the physical parts during the manufacturing process. By autonomous linking with appropriate data, a DTw may be updated to reflect the actual measurements of the parts, maintaining traceability and ensuring accurate data representation through hundreds or thousands of models.

Exemplary Model Splicing Setup

Figure 7:
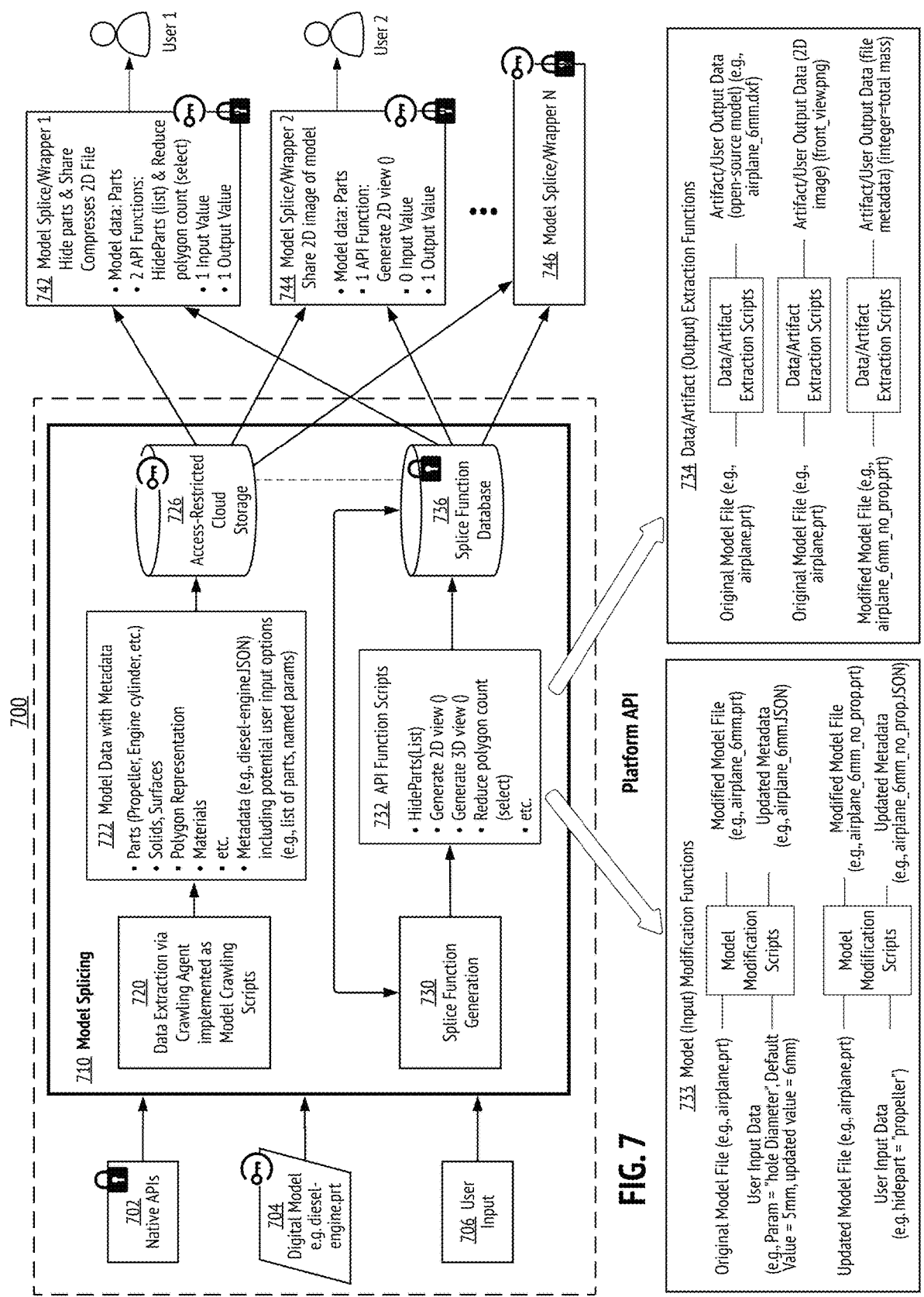
FIG. 7 is a schematic showing an exemplary DE model splicing setup, in accordance with some embodiments of the present invention.

FIG. 7 is a schematic 700 showing an exemplary model splicing setup, according to some embodiments of the present invention. Specifically, FIG. 7 is a schematic showing an embedded CAD model splicing example.

In the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. A model splice may take on the form of a digital file or a group of digital files. A locator refers to links, addresses, pointers, indexes, access keys, Uniform Resource Locators (URL) or similar references to the aforementioned DE digital artifacts and splice functions, which themselves may be stored in access-controlled databases, cloud-based storage buckets, or other types of secure storage environments. The splice functions provide unified and standardized input and output API or SDK endpoints for accessing and manipulating the DE model data. The DE model data are model-type-specific, and a model splice is associated with model-type-specific input and output schemas. One or more different model splices may be generated from the same input DE model file, based on the particular user application under consideration, and depending on data access restrictions. In some contexts, the shorter terms "splice", "wrapper", and/or "graft" are used to refer to spliced, wrapped, and/or grafted models.

Model splicing is the process of generating a model splice from a DE model file. Correspondingly, model splicers are program codes or uncompiled scripts that perform model splicing of DE models. A DE model splicer for a given DE model type, when applied to a specific DE model file of the DE model type, retrieves, extracts, and/or derives DE model data associated with the DE model file, generates and/or encapsulates splice functions, and instantiates API or SDK endpoints to the DE model according to input/output schemas. In some embodiments, a model splicer comprises a collection of API function scripts that can be used as templates to generate DE model splices. "Model splicer generation" refers to the process of setting up a model splicer, including establishing an all-encompassing framework or template, from which individual model splices may be deduced.

Thus, a DE model type-specific model splicer extracts or derives model data from a DE model file and/or stores such model data in a model type-specific data structure. A DE model splicer further generates or enumerates splice functions that may call upon native DE tools and API functions for application on DE model data. A DE model splice for a given user application contains or wraps DE model data and splice functions that are specific to the user application, allowing only access to and enabling modifications of limited portions of the original DE model file for collaboration and sharing with stakeholders of the given user application.

Additionally, a document splicer is a particular type of DE model splicer, specific to document models. A "document" is an electronic file that provides information as an official record. Documents include human-readable data that can be read by humans with or without specialized software, such as word processors and/or web services. Thus, a document is a special case of DE models, and may contain natural language-based text and/or graphics that are directly readable by a human without the need of additional machine compilation, rendering, visualization, or interpretation by a dedicated DE tool. A "document splice", "document model splice" or "document wrapper" for a given user application can be generated by wrapping document data and splice functions (e.g., API function scripts) that are specific to the user application, thus revealing text at the component or part (e.g., title, table of contents, chapter, section, paragraph) level via API or SDK endpoints, and allowing access to and enabling modifications of portions of an original document or document template for collaboration and sharing with stakeholders of the given user application, while minimizing manual referencing and human errors.

In the CAD model splicing example shown in FIG. 7, a CAD model file diesel-engine.prt 704 proceeds through a model splicing process 710 that comprises a data extraction step 720 and a splice function generation step 730. This input DE model 704 is in a file format.prt native to certain DE tools. Data extraction may be performed via a DE model crawling agent implemented as model crawling scripts within a model splicer to crawl through the input DE model file and to distill model data with metadata 722. Metadata are data that can be viewed without opening the entire input DE model file, and may include entries such as file name, file size, file version, last modified date and time, and potential user input options as identified from a user input 706. Model data are extracted and/or derived from the input DE model, and may include but are not limited to, parts (e.g., propeller, engine cylinder, engine cap, engine radiator, etc.), solids, surfaces, polygon representation, and materials, etc. When a model splicer crawls through the model file, it determines how model data may be organized and accessed, as fundamentally defined by a DE tool 702 that is being used in splicing the DE model, and establishes a model data schema. This data schema describes the structure and format of the model data, some of which are translated into, or used to create input/output API endpoints with corresponding input/output schemas. In some embodiments, model data with metadata 722 may be stored in an access-restricted storage 726, such as the "customer buckets" 312 within customer environment 310 in FIG. 3, so that model splices such as 742, 744, and 746 may be generated on-demand once an input DE model 704 has been crawled through.

The model splicer further generates splice functions (e.g., API function scripts) 732 from native APIs 702 associated with the input CAD model. In the present disclosure, "native" and "primal" refer to existing DE model files, functions, and API libraries associated with specific third-party DE tools, including both proprietary and open-source ones. Native API 702 may be provided by a proprietary or open-source DE tool. For example, the model splicer may generate API function scripts that call upon native APIs of native DE tools to perform functions such as: HideParts (parts_list), Generate2DView( ), etc. These model-type-specific splice functions may be stored in a splice function database 736, again for on-demand generation of individual model splices. A catalog or specification of splice functions provided by different model splices supported by the IDEP, and orchestration scripts that link multiple model splices, constitutes a Platform API. This platform API is a common, universal, and externally-accessible platform interface that masks native API 702 of any native DE tool integrated into the IDEP, thus enabling engineers from different disciplines to interact with unfamiliar DE tools, and previously non-interoperable DE tools to interoperate freely.

Next, based on user input or desired user application 706, one or more model splices or wrappers 742, 744, and 746 may be generated, wrapping a subset or all of the model data needed for the user application with splice functions or API function scripts that can be applied to the original input model and/or wrapped model data to perform desired operations and complete user-requested tasks. In various embodiments, a model splice may take on the form of a digital file or a group of digital files, and a model splice may comprise locators to or copies of the aforementioned DE digital artifacts and splice functions, in any combination or permutation. Any number of model splices/wrappers may be generated by combining a selective portion of the model data such as 722 and the API function scripts such as 732. As the API function scripts provide unified and standardized input and output API endpoints for accessing and manipulating the DE model and DE model data, such API handles or endpoints may be used to execute the model splice and establish links with other model splices without directly calling upon native APIs. Such API endpoints may be formatted according to an input/output scheme tailored to the DE model file and/or DE tool being used, and may be accessed by orchestration scripts or platform applications that act on multiple DE models.

In some embodiments, when executed, an API function script inputs into or outputs from a DE model or DE model splice. "Input" splice functions or "input nodes" such as 733 are model modification scripts that allow updates or modifications to an input DE model. For example, a model update may comprise changes made via an input splice function to model parameters or configurations. "Output" splice functions or "output nodes" 734 are data/artifact extraction scripts that allow data extraction or derivation from a DE model via its model splice. An API function script may invoke native API function calls of native DE tools. An artifact is an execution result from an output API function script within a model splice. Multiple artifacts may be generated from a single DE model or DE model splice. Artifacts may be stored in access-restricted cloud storage 726, or other similar access-restricted customer buckets.

One advantage of model splicing is its inherent minimal privileged access control capabilities for zero-trust implementations of the IDEP as disclosed herein. In various deployment scenarios discussed with reference to FIG. 4, and within the context of IDEP implementation architecture discussed with reference to FIG. 3, original DE input model 704 and model data storage 726 may be located within customer buckets 312 in customer environment 310 of FIG. 3. Splice functions 732 stored in database 736 call upon native APIs 702. The execution or invocation of splice functions 732 may rely on job-specific authentication or authorization via proprietary licenses of DE tools (e.g., residing within customer environment 310 of FIG. 3 and/or information security clearance levels of the requesting user. Thus, model splicing unbundles monolithic access to digital model-type files as whole files and instead provides specific access to a subset of functions that allow limited, purposeful, and auditable interactions with subsets of the model-type files built from component parts or atomic units that assemble to parts.

Digital Threading of DE Models Via Model Splicing

Figure 8:
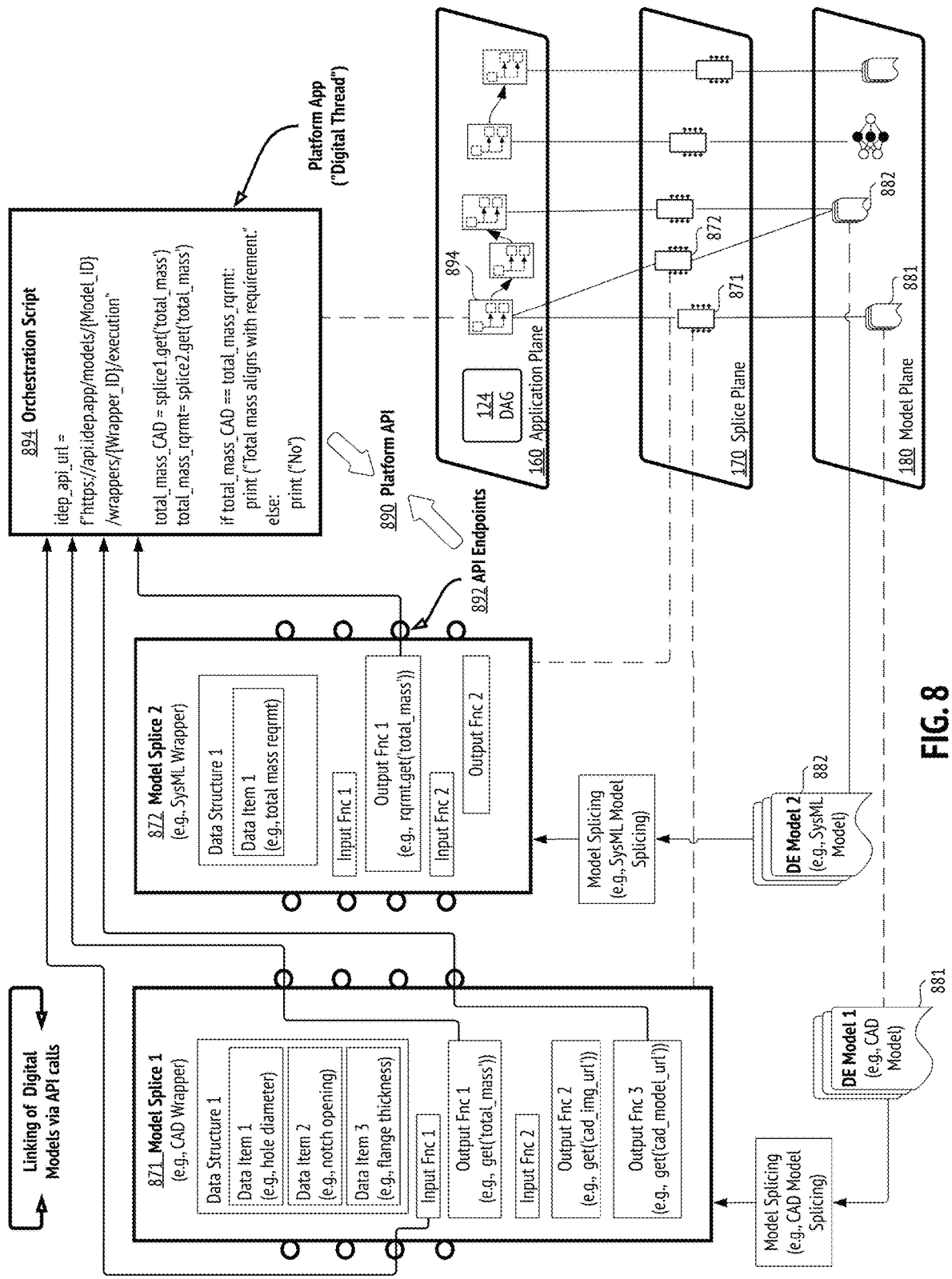
FIG. 8 is a schematic showing digital threading of DE models via model splicing, in accordance with some embodiments of the present invention.

FIG. 8 is a schematic showing digital threading of DE models via model splicing, according to some embodiments of the present invention. A digital thread is intended to connect two or more DE models for traceability across the systems engineering lifecycle, and collaboration and sharing among individuals performing DE tasks.

Linking of model splices generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first splice and a second splice (e.g., input splice functions from both model splices are called upon). In the present disclosure, "model linking" and "model splice linking" may be used interchangeably, as linked model splices map to correspondingly linked DE models. Similarly, linking of DE tools generally refers to jointly accessing two or more DE tools via model splices, where model splice functions that encapsulate disparate DE tool functions may interoperate and call each other, or be called upon jointly by an orchestration script to perform a DE task.

Thus, model splicing allows for making individual digital model files into model splices that can be autonomously and securely linked, enabling the management of a large number of digital models as a unified digital thread written in scripts. Within the IDEP as disclosed herein, a digital thread is a platform script that calls upon the platform API to facilitate, manage, or orchestrate a workflow through linked model splices. Model splice linking provides a communication framework or data-driven architecture that connects traditionally siloed elements to enable the flow of information between digital models via corresponding model splices. The extensibility of model splicing over many different types of digital models enables the scaling and generalization of digital threads to represent each and every stage of the DE lifecycle and to instantiate and update DTws as needed.

In the particular example shown in FIG. 8, an orchestration script 894 is written in Python code and designed to interact via API endpoints such as 892 to determine if a CAD model meets a total mass requirement. API endpoint 892 is an output splice function and part of a platform API 890. Platform API 890 comprises not only splice functions but also platform scripts or orchestration scripts such as 894 itself.

Orchestration script 894 is divided into three main steps:
1. Get Data From a CAD Model Splice: A POST request may be sent via the IDEP platform API to execute a computer-aided design (CAD) model splice 871. This model splice provides a uniform interface to modify and retrieve information about a CAD model 881. The parameters for the CAD model, such as hole diameter, notch opening, flange thickness, etc., may be sent in the request and set via an input splice function. The total mass of the CAD model may be derived from model parameters and retrieved via an output splice function. The response from the platform API includes the total mass of CAD model 881, and a Uniform Resource Identifier/Locator (URL) for the CAD model. The response may further comprise a URL for an image of the CAD model.

2. Get Data From a SysML Model Splice: Another POST request may be sent via the IDEP platform API to execute a Systems Modeling Language (SysML) model splice 872. SysML is a general-purpose modeling language used for systems engineering. Output function 892 of model splice 872 retrieves the total mass requirements for the system from a SysML model 882. The response from the platform API includes the total mass requirement for the system.

3. Align the Variables and Check If Requirement Met: The total mass from CAD model 881 is compared with the total mass requirement from SysML model 882. If the two values are equal, a message is printed indicating that the CAD model aligns with the requirement. Otherwise, a message is printed indicating that the CAD model does not align with the requirement.

In short, orchestration script 894, which may be implemented in application plane 160 of IDEP 100 shown in FIG. 1, links digital models 881 and 882 via model splice API calls. Orchestration script 894 is a scripted platform application that modifies a CAD model, retrieves the total mass of the modified CAD model, retrieves the total mass requirement from a SysML model, and compares the two values to check if the CAD model meets the requirement. In some embodiments, a platform application within IDEP 100 utilizes sets of functions to act upon more than one DE model.

Model Splice Plane

Figure 9:
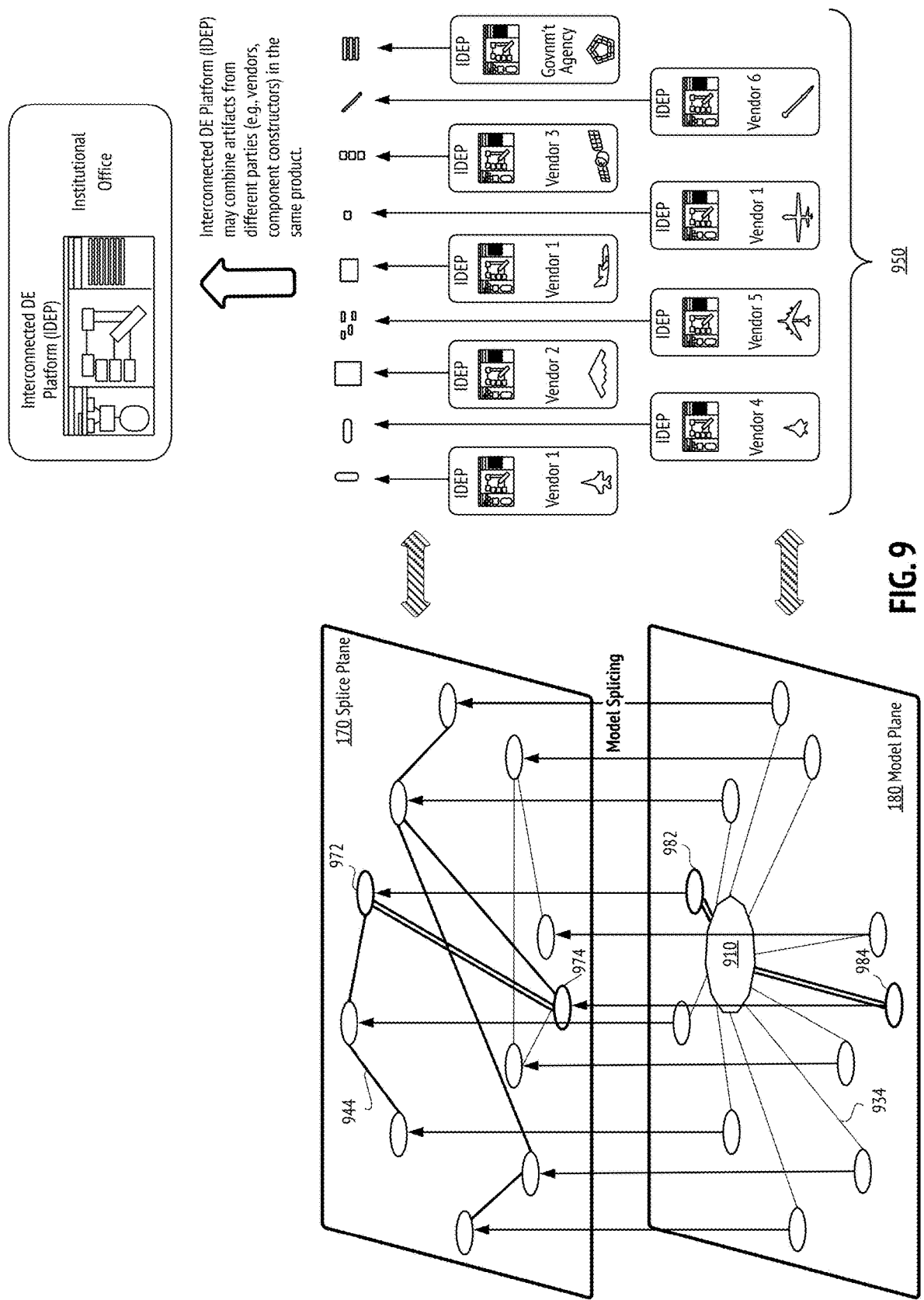
FIG. 9 is a schematic illustrating the linking of DE model splices in a splice plane and comparing digital threading with and without model splicing, in accordance with some embodiments of the present invention.

FIG. 9 is a schematic illustrating the linking of DE model splices in a splice plane and comparing digital threading with and without model splicing, according to some embodiments of the present invention. The bottom model plane 180 demonstrates current digital threading practices, where each small oval represents a DE model, and the linking between any two DE models, such as models 982 and 984, requires respective connections to a central platform 910, and potential additional linkages from every model to every other model. The central platform 910 comprises program code that is able to interpret and manipulate original DE models of distinct model types. For example, platform 910 under the control of a subject matter expert may prepare data from digital model 982 into formats that can be accessed by digital model 984 via digital model 984's native APIs, thus allowing modifications of digital model 982 to be propagated to digital model 984. Any feedback from digital model 984 to digital model 982 would require similar processing via platform 910 so that data from digital model 984 are converted into formats that can be accessed by digital model 982 via digital model 982's native APIs. This hub-and-spoke architecture 934 is not scalable to the sheer number (e.g., hundreds or thousands) of digital models involved within typical large-scale DE projects, as model updates and feedback are only possible through central platform 910.

In contrast, once the DE models are spliced, each original model is represented by a model splice comprising relevant model data, unified and standardized API endpoints for input/output, as shown in the upper splice plane 170. Splices within splice plane 170 may be connected through scripts (e.g., python scripts) that call upon API endpoints or API function scripts and may follow a DAG architecture, as described with reference to FIG. 1 and FIG. 6. Note that in FIG. 1, only the set of generated splices are shown within splice plane 170, while in FIG. 9, scripts that link model splices are also shown for illustrative purposes within the splice plane. Such scripts are referred to as orchestration scripts or platform scripts in this disclosure, as they orchestrate workflow through a digital thread built upon interconnected DE model splices. Further note that while splice plane 170 is shown in FIG. 1 as part of IDEP 100 for illustrative purposes, in some embodiments, splice plane 170 may be implemented behind a customer firewall and be part of an agent of the DE platform, as discussed in various deployment scenarios shown in FIG. 4. That is, individual API function scripts generated via model splicing by a DE platform agent may be tailored to call upon proprietary tools the customer has access to in its private environment. No centralized platform 910 with proprietary access to all native tools associated with all individual digital models shown in FIG. 9 is needed. Instead, orchestration scripts call upon universal API function scripts that may be implemented differently in different customer environments.

Hence, model splicing allows model splices such as model splice 972 from digital model 982 and model splice 974 from digital model 984 to access each other's data purposefully and directly, thus enabling the creation of a model-based "digital mesh" 944 via platform scripts and allowing autonomous linking without input from subject matter experts.

An added advantage of moving from the model plane 180 to the splice plane 170 is that the DE platform enables the creation of multiple splices per native model (e.g., see FIG. 7), each with different subsets of model data and API endpoints tailored to the splice's targeted use. For example, model splices may be used to generate multiple digital twins (DTws) that map a physical product or object design into the virtual space. Two-way data exchanges between a physical object and its digital object twin enable the testing, optimization, verification, and validation of the physical object in the virtual world, by choosing optimal digital model configuration and/or architecture combinations from parallel digital twins built upon model splices, each reacting potentially differently to the same feedback from the physical object.

Supported by model splicing, digital threading, and digital twining capabilities, the IDEP as disclosed herein connects DE models and DE tools to enable simple and secure collaboration on digital engineering data across engineering disciplines, tool vendors, networks, and model sources such as government agencies and institutions, special program offices, contractors, small businesses, Federally Funded Research and Development Centers (FFRDC), University Affiliated Research Centers (UARC), and the like. An application example 950 for the IDEP is shown on the right side of FIG. 9, illustrating how data from many different organizations may be integrated to enable cross-domain collaboration while maintaining data security, traceability, and auditability. Here DE models from multiple vendors or component constructors are spliced or wrapped by IDEP agents, and data artifacts are extracted with data protection. Turning DE models into data artifacts enables cross-domain data transfer and allows for the protection of critical information, so that model owners retain complete control over their DE models using their existing security and IT stack, continue to use DE tools that best fit their purposes, and also preserve the same modeling schema/ontology/profile that best fit their purposes. The IDEP turns DE models into micro-services to provide minimally privileged data bits that traverse to relevant stakeholders without the DE models ever leaving their home servers or being duplicated or surrogate.

The IDEP also provides simple data access and digital threading options via secure web applications or secure APIs.

DAG Representation of Threaded Tasks

Figure 10:
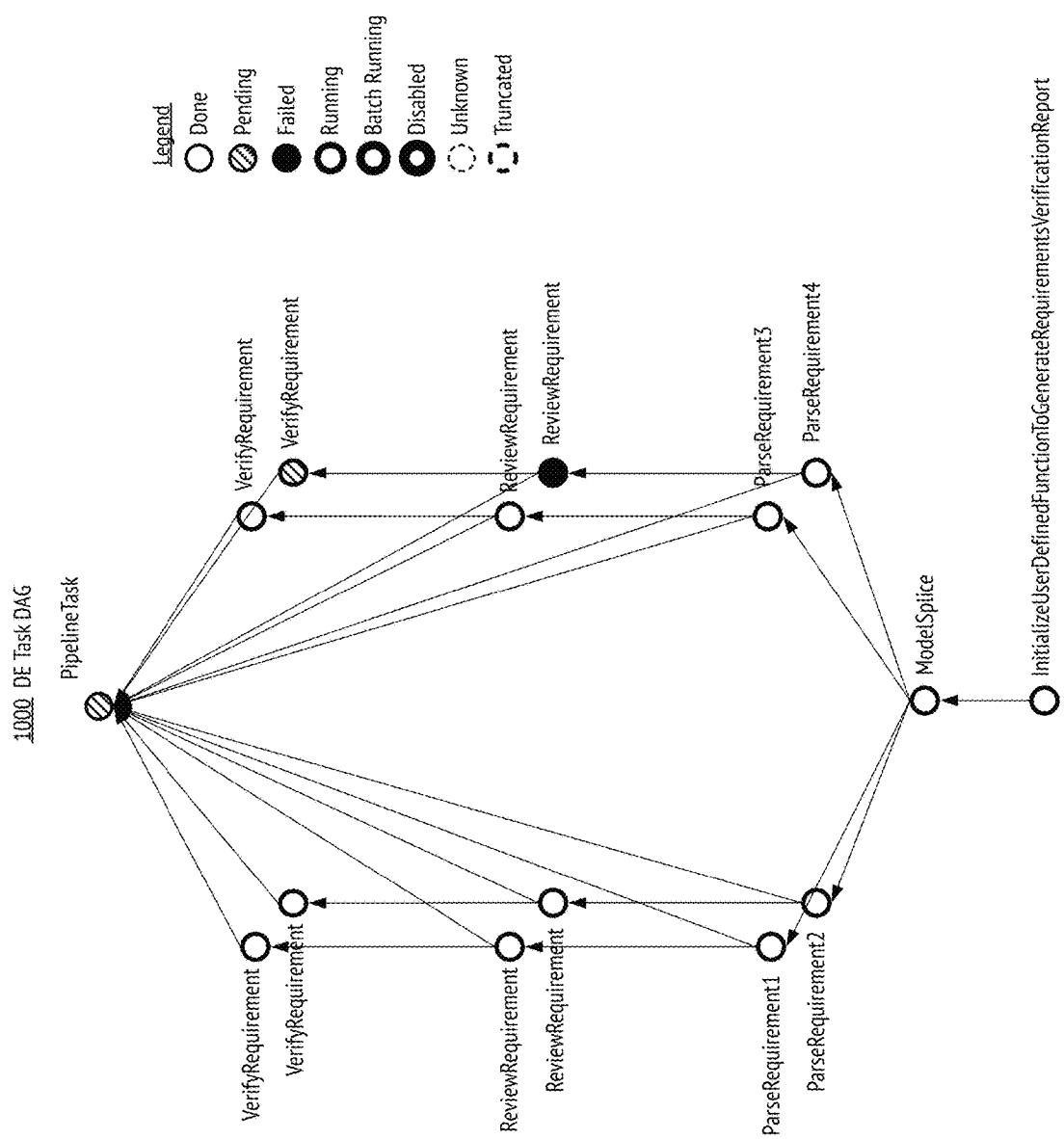
FIG. 10 shows an exemplary directed acyclic graph (DAG) representation of pipelined DE tasks related to digital threads, in accordance with some embodiments of the present invention.

Model splicing provides a unified interface among DE models, allowing model and system updates to be represented by interconnected and pipelined DE tasks. FIG. 10 shows an exemplary directed acyclic graph (DAG) representation 1000 of pipelined DE tasks related to digital threads, in accordance with some embodiments of the present invention. In diagram 1000, tasks performed through a digital thread orchestration script (e.g., 894) are structured as nodes within a DAG. Actions are therefore interconnected and carried out in a pipeline linking the DE model splices with a range of corresponding parameter values. Therefore, a digital thread can be created by establishing, via interpretable DE platform scripts, the right connections between any model splices for their corresponding models at the relevant endpoints.

Referring to FIGS. 1 and 8, DAGs of threaded tasks are built from digital threads and are part of the DE platform's application plane 160. Different DAGs may target different DE actions. For example, in FIG. 1, building or updating a DTw 122 in the virtual environment 120 has its own DAG 124. Model splicing turns DE models into data structures that can be accessed via API, thus enabling the use of software development tools, from simple python scripts to complex DAGs, in order to execute DE actions. A digital thread of model splices eliminates the scalability issue of digital thread management, and speeds up the digital design process, including design updates based on external feedback.

Following the above descriptions of the basic elements and core aspects of the IDMP as disclosed herein, the document interfaces and backend processes that enhance the IDMP's functionality with respect to document review is described in detail next.

Overview of Multimodal Interface for Dynamic and Collaborative Document Reviews

The present invention relates to methods and systems for addressing digital model and document processing techniques, multimodal user interface designs, and secure collaboration channels. These elements converge to create a comprehensive document interface or dashboard for efficient and secure review of human-readable documents, with data dynamically updated in response to changes within an interconnected digital model platform (IDMP).

Embodiments of the present invention integrate digital model splicing, document splicing, model-to-model and model-to-document linking, AI-assisted generation and update of human-readable documents, resource primitives, and tiered commenting on data resources or entities associated with different digital tools across different organizational structures. This integration ensures compatibility across multiple digital model types and review processes, streamlines dynamic data updates, and provides an intuitive user experience while maintaining security, auditability, and traceability. For example, in the context of digital engineering (DE) certification reviews, the system's ability to handle multiple DE models and simulations, linking them seamlessly with relevant certification or standards documents, allows for coherent distillation of complex data interactions. This makes information both comprehensible and actionable, potentially reducing cognitive load on users, especially when faced with high-bandwidth series of DE data updates requiring decisions. The system further implements zero-trust security access policies, and in the context of security audit or compliance reviews, real-time monitoring. By leveraging artificial intelligence (AI) models for proactive threat detection, system log data scanning, identification of potential threats, and report generation, embodiments of present invention again make complex security information more comprehensive and actionable for human reviewers.

While DE documents and DE models are used as examples of documents and data sources in the present disclosure, other types of documents and data sources are considered as within the scope of the invention and can be used analogously. For example, digital models from healthcare, medicine, sports, finance, business, and many other fields may be model spliced to provide data updates in documents such as medical records, treatment plans, clinical notes, pharmaceutical manufacturing documentation, personalized sports training plans, patent applications, financial reports, business plans and contracts, compliance documents, and the like. In another example, regulations and standard documents may be spliced and function as data sources to provide updated information for DE documentation during product validation and verification.

The IDMP is designed to support a robust commenting system, with a data architecture design centered around the concept of a Resource Primitive, a foundational entity uniquely identified by a Universally Unique Identifier (UUID). This structure facilitates the systematic association and management of comments across various resources, such as files and folders, within the platform.

The tiered commenting system expands the scope of collaboration and facilitates discussions among stakeholders, reviewers, and counterparties over previously non-interoperable digital models. Users can add comments to various data entities, for example, digital model files, documents, folders, and organizational structures at different levels of a digital workflow. Properties or attributes such as author, timestamp, status, urgency level, and deadline for resolution may be further assigned to comments. This clear bookkeeping of comments may be particularly useful when multiple rounds of reviews are conducted by different reviewers and it ensures user inputs are transparent, accountable, auditable and traceable. The system's ability to monitor comments and analyze their patterns also becomes especially helpful in managing extensive reviews across numerous digital data models within a digital workflow. For example, analytics may be generated via AI-assistance to summarize comments, identify issues that arise more frequently than others, or pinpoint a root comment with all related discussions that have stemmed from it. Furthermore, selective-access options enable users to selectively access digital entities and comments based on their authorization levels with respect to the underlying digital model data, or based on a user's priority level during a sequential review process.

A multimodal user interface may be implemented to enhance communication efficiency, enrich user experience, and reduce cognitive load. Beyond text comments, voice, video, and spatial computing comments can be supported. With AI-generated transcripts, they allow for natural, conversation and gesture-based communications while preserving emotional nuances and context. The multimodal user interface may also provide user notification functions, selective-access viewing and editing options, and facilitate AI-supported comment analysis that allows users to efficiently manage, monitor, and analyze comments across multiple rounds of collaborative reviews.

Prior to deployment, the ML and AI modules mentioned above may be trained on sample input and output datasets, which may be generated from historical document reviews or synthetically created by subject matter experts. Fine-tuning can be customized within customer environments with enterprise documents and data to capture specific language and document dependencies within client databases. These training and fine-tuning processes ensure that the system can efficiently synthesize digital workflow and document data as well as user requests and feedback, providing a coherent context for complex data interactions, and making information accessible, comprehensible, and actionable for both technical and non-technical stakeholders.

In short, by developing and unifying various features as disclosed herein, embodiments of the present invention facilitate comprehensive digital document review, security compliance, and collaboration, to address the challenges of managing complex, dynamic content in digital workflows while promoting effective communication and decision-making among diverse stakeholders and users of the IDMP.

In what follows, user interface and document output options as provided by the IDMP are first discussed in the context of two use cases, certification review and security review, before processes and systems for collaborative document review are discussed in further detail within the context of the IDMP.

Exemplary Use Cases

Figure 11:
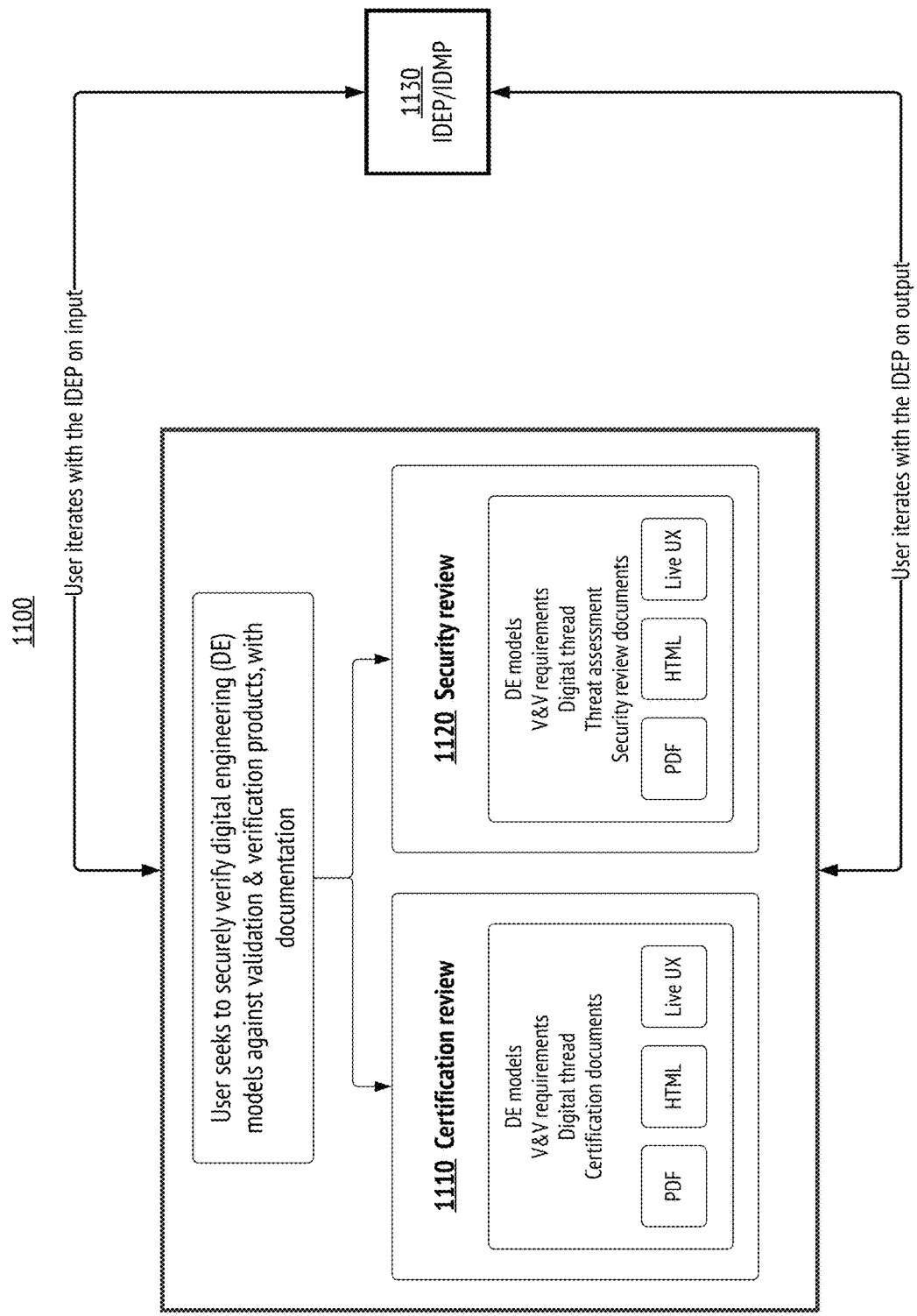
FIG. 11 shows a schematic of exemplary user interface and document output options provided by the IDMP for dynamic and collaborative document reviews, in accordance with example embodiments of the present invention.

FIG. 11 shows a schematic 1100 of exemplary user interface and document output options provided by the IDMP for dynamic and collaborative document reviews, in accordance with example embodiments of the present invention. Specifically, digital engineering certification review and security review are considered as two instances of document reviews, for illustrative purposes only, and are not meant to be limiting.

Certification review in digital engineering is a critical process that involves the systematic evaluation and verification of digital modes, simulations, and associated documentation to ensure they meet specified standards, requirements, and/or regulations. This process is essential for validating the integrity, accuracy, and compliance of digital engineering artifacts or products before they are approved for use in further development, production, or deployment. Certification reviews often involve multiple stakeholders, including engineers, subject matter experts, regulatory authorities, and project managers. The process often requires iterative reviews and updates to address any identified issues or discrepancies.

Within FIG. 11, for an exemplary certification review 1110, a user of the IDEP/IDMP 1130 seeks to securely verify DE models against validation and verification (V&V) products with documentation. At a certification review discussion, V&V experts receive documentation of the process steps up to that point. IDEP/IDMP 1130 may first utilize digital model splicing, document splicing, and model-to-document linking to generate certification review documents from V&V requirements, and subsequently provide dynamic data updates to such documents, all through the use of a digital thread in the form of an orchestration script. An exemplary process is illustrated by FIG. 8. Reviewing human-readable documents such as reports written in natural language with frequent updates can be challenging for human experts, as these documents often contain a mix of static and dynamic content. While some content, such as the overall template, layout, and summary messaging, may change infrequently, other parts within these documents linked to specific DE models or simulations under review may be updated more often. The IDEP/IDMP tracks these frequent updates to specific document portions or subunits, and presents them to the user or the human experts in a comprehensible manner, ensuring that the human experts have the latest and accurate information at their disposal, plus the option to trace back to the source digital models, standard documents, and individual document subunits. Furthermore, the human experts may have options to view and/or edit documents in various formats, including but not limited to, PDF, HTML, and a live dashboard view through a user interface provided by the IDEP/IDMP. Thus, the user can interact with IDEP/IDMP on the input side of a certification review, requesting specific certification tasks and selecting specific input models and document templates; the user can also interact with the IDEP/IDMP on the output side of the certification review, viewing specific certification document subunits and providing comments or approval. Furthermore, as multiple stakeholders are typically involved in certification reviews, the IDEP/IDMP may implement user authorization and selective access when presenting DE model-linked certification documents to different users, and enable sequential approval by different reviewers.

It is important to note that the task of tracking frequent updates to specific document portions can be daunting for human experts, as the cognitive capacity of humans is limited, and the ability to retain and process multiple pieces of information simultaneously is constrained. This limitation becomes particularly challenging when human experts are faced with a high-bandwidth series of alerts or updates that they have to make decisions on. Given these cognitive limitations, the task of identifying, understanding, and ultimately deciding on certification based on the updated documents becomes increasingly difficult, as the experts may face an information overload. This situation underscores the importance of the DE model and document processing capabilities and the user interfaces as provided by embodiments of the present invention, which can adeptly manage dynamic contents, mitigating the risk of confusion or oversight in the certification process, while enable traceability to data sources and transaction logs that assist human users make review decision more efficiently.

Another use case for embodiments of the present invention is in security audit reviews, such as 1120 shown in FIG. 11. A security audit review or security compliance review in digital engineering is a comprehensive assessment process that evaluates the security measures, vulnerabilities, and potential threats associated with digital models, systems, and workflows, and that assesses and verifies the adherence to security protocols, data protection regulations, and government standards. In a security audit review process, an organization demonstrates compliance with specified standards by providing evidence, which is attested by an authorized individual, such as the information technology (IT) or cybersecurity head. This evidence is then reviewed by a third-party auditor to verify its authenticity and ensure compliance with the required standards. A security audit review process often involves two roles: the IT or cybersecurity head, who compiles and submits the security report with platform performance and operational metrics, and the auditor, who reviews the submission to confirm compliance. The IDMP enables both parties to access and review the same document simultaneously or in sequence, streamlining the process, improving accuracy, and reducing the need for paper-based documentation, thereby facilitating more efficient and collaborative compliance verification.

In FIG. 11, due to the sensitive nature of digital engineering data, IDEP/IDMP 1130 may implement zero-trust security access policies to help protect against both external threats and insider risks. Under zero-trust, IDEP/IDMP 1130 assumes no implicit trust based on network location or asset ownership, instead requiring continuous verification for every user, device, and connection for every transaction or presentation involving the DE models, threads, documents, and other modular digital data entities within the IDEP/IDMP. To perform security review 1120, IDEP/IDMP 1130 monitors access and transaction logs, efficiently processes frequent threat assessment messages, and presents them to security experts in a manner that ensures human experts receive the appropriate information in the correct context. Again, this is particularly challenging given the high-bandwidth series of alerts that the experts may have to make decisions on under zero-trust security access policies. The IDEP/IDMP is designed to manage such dynamic content adeptly, by performing digital threat scanning and detection, while utilizing digital threads to automatically update and present security documents to experts, thus mitigating the risk of confusion or oversight in the audit process.

In some embodiments, different user interfaces may enable specific user operations and interactions with the IDEP/IDMP during collaborative document reviews. For example, based on user authorization results, a user may be allowed to review detected potential security threats, security assessment reports, subcomponents of the security compliance review document, and provide feedback through the user interface to approve the security compliance review document. Furthermore, conversational interfaces and spatial computing interfaces may be implemented to provide different capabilities for users. A conversational interface may include an interactive voice response (IVR) and/or a chatbot submodule. A user can upload a DE model and use a conversational interface to iterate on a particular use case. A spatial computing interface can further include direct interactions, contextual input, and/or shared tactile mechanism(s).

Exemplary Processes for Dynamic and Collaborative Document Reviews

Figure 12:
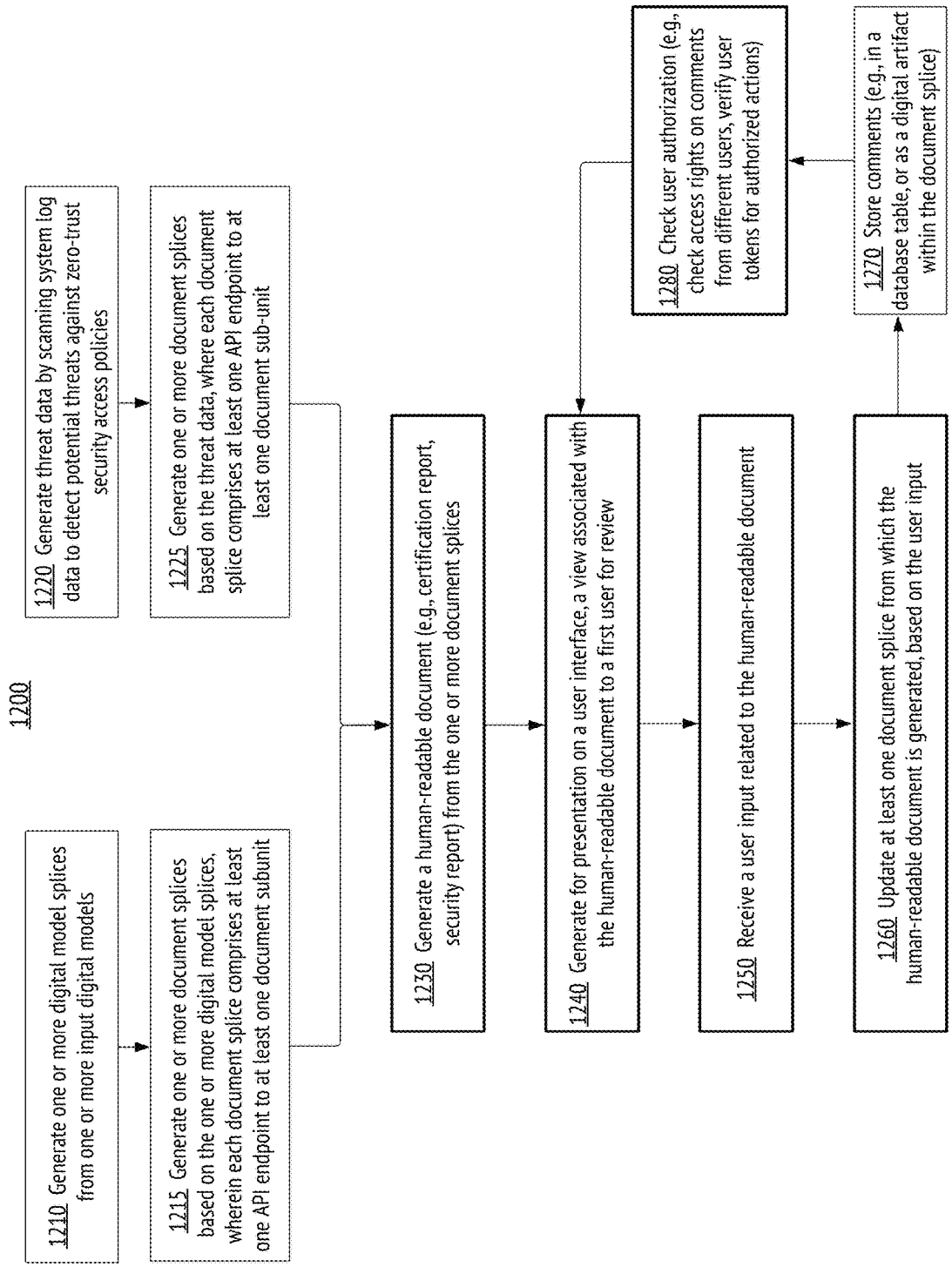
FIG. 12 is an exemplary flowchart showing a process for dynamic and collaborative document reviews, in accordance with some embodiments of the present invention.

FIG. 12 is an exemplary flowchart 1200 showing a process for dynamic and collaborative document reviews, in accordance with some embodiments of the present invention. Dynamic and collaborative document reviews on the IDMP encompass several features as described below, combining advanced document generation techniques with interactive user interfaces and robust security measures, facilitating efficient and secure collaborative document management on the IDMP.

Document Generation: The IDMP may create digital model splices from input digital models, which may then be used to generate document splices. A model splice of an input digital model contains at least one API endpoint or externally-accessible model endpoint for generating a digital artifact from the input digital model. A document splice contains at least one API endpoint or externally-accessible document endpoint to a document subunit. Such document subunits may contain natural language written by an AI module, incorporating one or more digital artifacts from the digital model splices. Externally-accessible document endpoints enable granular access to individual document components. A document splice may then be transformed into a human-readable document for review. Through model splicing, digital artifacts from non-interoperable digital models (i.e., digital models that are accessed through two digital tools that are non-interoperable) may be accessed jointly and aggregated for certification or other similar compliance review purposes. When the underlying digital models are updated, such updates may be propagated to the generated document automatically. In other words, the generated document may be viewed as a live or dynamic document. Furthermore, collections of security threats identified on the IDMP under zero-trust access policies may be viewed as a security threat digital model, model spliced, and used to generate a security compliance review report.

User Interface and Interaction: The human-readable document may be presented on a user interface for review. The interface can be multimodal, supporting various display formats and different user input types including text, voice, video, and gestures. It may also include conversational or spatial computing capabilities.

Document View and Presentation: A view associated with the digital document on the user interface may include access options to various resources such as linked digital model files, API function schemas, digital threads, digital thread execution data, parsed data or digital artifacts, parts or subunits of the digital document, and the digital document itself. A reviewer can trace any presented digital entity to its source for more efficient and accurate reviews. Such a document view may be presented in different formats, including but not limited to static views, live-linked views, and dynamic webpages, with options for summary or expanded modes.

User Input and Document Updates: The user interface allows for user input related to the document. Based on user input, updates to relevant underlying document splices or digital models may be performed. The view can also present changes made by other users and allow for approval of these changes.

Security and Authorization: User authorization with selective access rights may be incorporated, such that there is always "authorization before presentation," where a view presented to a user only contains elements or comments that the user is authorized to see.

Notification System: A notification system may alert users of document updates, digital model updates even if such updates do not directly change the document, or new input such as comments or approval decisions from other reviewers.

Collaborative Features: Multiple users may review a document, in parallel or sequentially. Comments from one reviewer may be saved separately from the document, and presented to another reviewer. Comments can be structured across various resources, such as files and folders. Additional collaborative features include change tracking, change summaries, comment analysis, and sequential user access based on pre-set orders.

More specifically, FIG. 12 shows a flowchart 1200 that details exemplary processes for collaborative certification review and zero-trust security compliance review.

For a certification review, at a step 1210, one or more digital model splices may be generated from one or more input digital models to enable access to specific digital artifacts while masking from the user direct interactions with different digital tools that may not be interoperable. Within the present disclosure, a digital model splice may be considered a "digital morel representation." A digital model representation of a given digital model includes any embodiment of the digital model in the form of digital model file(s), model splices, or collections of digital artifacts retrieved or derived from the digital model. In some embodiments, a digital model representation comprises model-type-specific locators to digital model data and metadata, potentially including standardized input and output API endpoints for accessing and manipulating the digital model data. Discussions related to the usage of model splices in the present disclosure are applicable to any other forms of model representation as well.

At a step 1215, one or more document splices may be generated based on the one or more digital model splices. Model splicing and document splicing are discussed in detail in the context of FIGS. 7, 16 and 17, while model-to-model or model-to-document linking via a digital thread are discussed in detail in the context of FIG. 8. A document splice comprises locators to or copies of document subunits, segments, or components, each addressable via an externally-accessible API or SDK endpoint, or "document endpoint." For example, a subunit may be a title, a table of contents, an index, a chapter, a subsection, a paragraph, a sentence, a word, a sheet, a page, a table, a chart, a graph, an image, a hypertext link, sub-parts thereof, and the like. At least one document subunit may be written in a natural language. A document splice may be generated from a template and linked digital models, where the template is parsed into template subunits, with certain portions or fields having placeholder values. Digital artifacts extracted from the linked digital models may be inserted into the template splice using a parameter substitution process, possibly with AI-assistance. For example, a large language model-based AI module may be prompted to substitute a digital artifact into a given document template splice, or be prompted to write a document subunit (e.g., a paragraph or a section) that incorporates the digital artifact. In some embodiments, such digital artifacts may be mapped and compared to corresponding fields or components of a regulatory standard during this document splice generation step 1215 or the next document generation step 1230 to determine if compliance has been achieved. In some embodiments, Retrieval-Augmented Generation may be employed where the system automatically looks for appropriate templates or standard documents from a database to provide context for document splice generation. In some implementations, the IDMP may interface with regulatory and/or certification authorities (e.g., via websites operated by the authorities) to retrieve digitized Validation and Verification (V&V) products (e.g., regulatory standards, certification regulation, certification of conformity, etc.) published by the regulatory authorities for generating the document splice.

At a step 1230, a human-readable digital document such as a certification report or a security report may be generated from the one or more document splices. Illustrative implementation examples of steps 1210, 1215 and 1230 are discussed in the context of FIGS. 18 and 19. For example, the human-readable digital document may be generated by concatenating or combining individual document subunits such as titles, section headings, paragraphs, tables, figures, and glossaries. In some embodiments, the digital document may contain IDMP-generated components in addition to the document subunits provided via the document splices. For example, the IDMP may generate a table of contents, an index, a summary of the document, or a summary of all past user comments using AI-assistance.

At a step 1240, a view associated with the human-readable document is generated for presentation on a user interface of the IDMP to a user for review. This user or reviewer may be a human user of the IDMP. In some embodiments, the user interface may be provided by an IDMP agent located within an IDMP exclave such as 316 shown in FIG. 3. In some embodiments, the reviewer is authorized at a step 1280, and the view is generated step 1240 based on the authorization result. For example, the user may not be authorized to see certain parts of the digital document that contains confidential information, and these document parts may be redacted or a message may be shown to indicate that the user is not authorized to access. In some embodiments, user authorization is determined by comparing an information security ("infosec") level of a digital resource (e.g., document subunit, digital artifact, digital model presentation) with an infosec level of the user.

Figure 20:
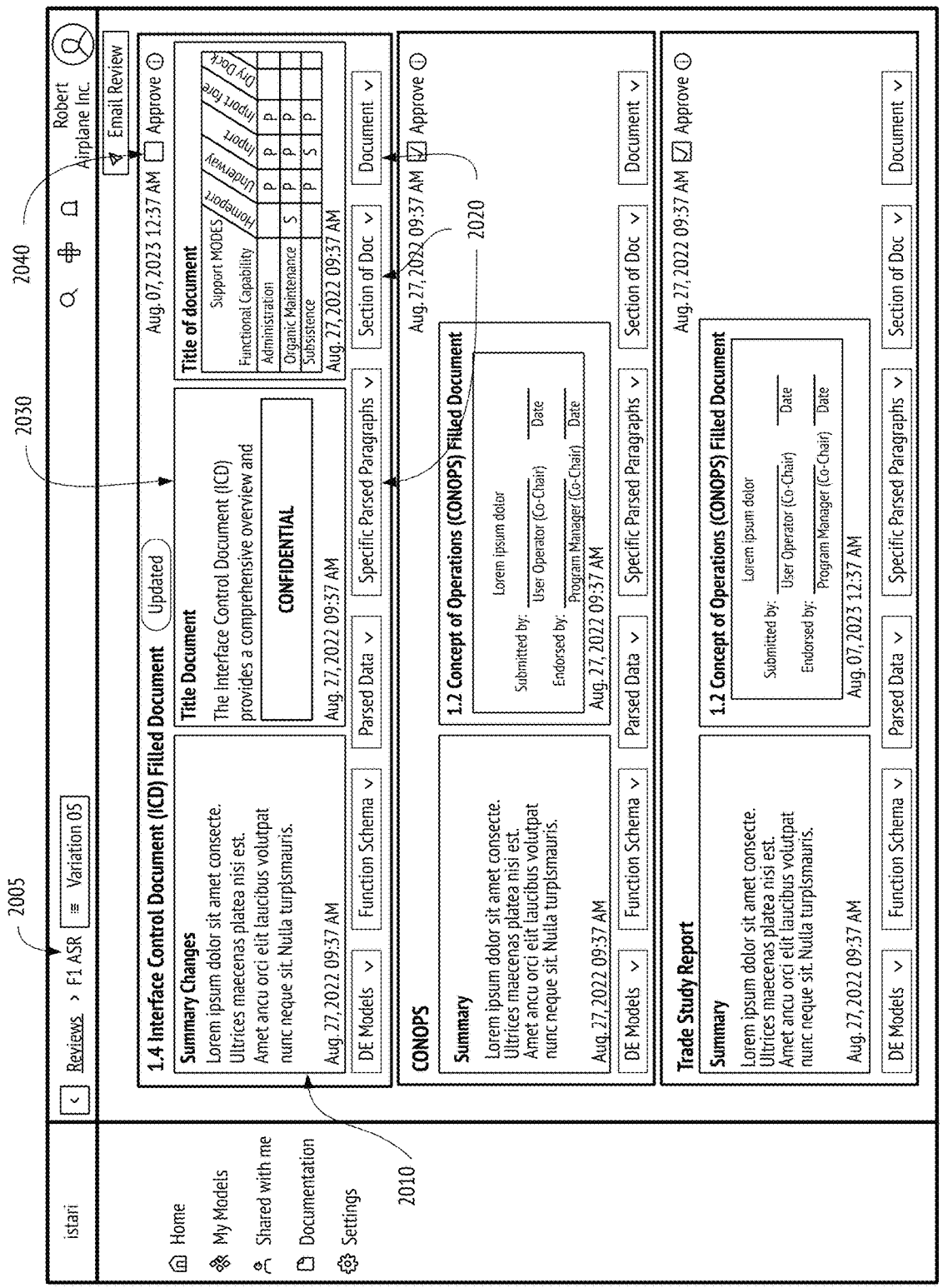
FIG. 20 shows an illustrative dashboard-summary view of multiple documents involved in an ASR, in accordance with example embodiments of the present invention.
Figure 21:
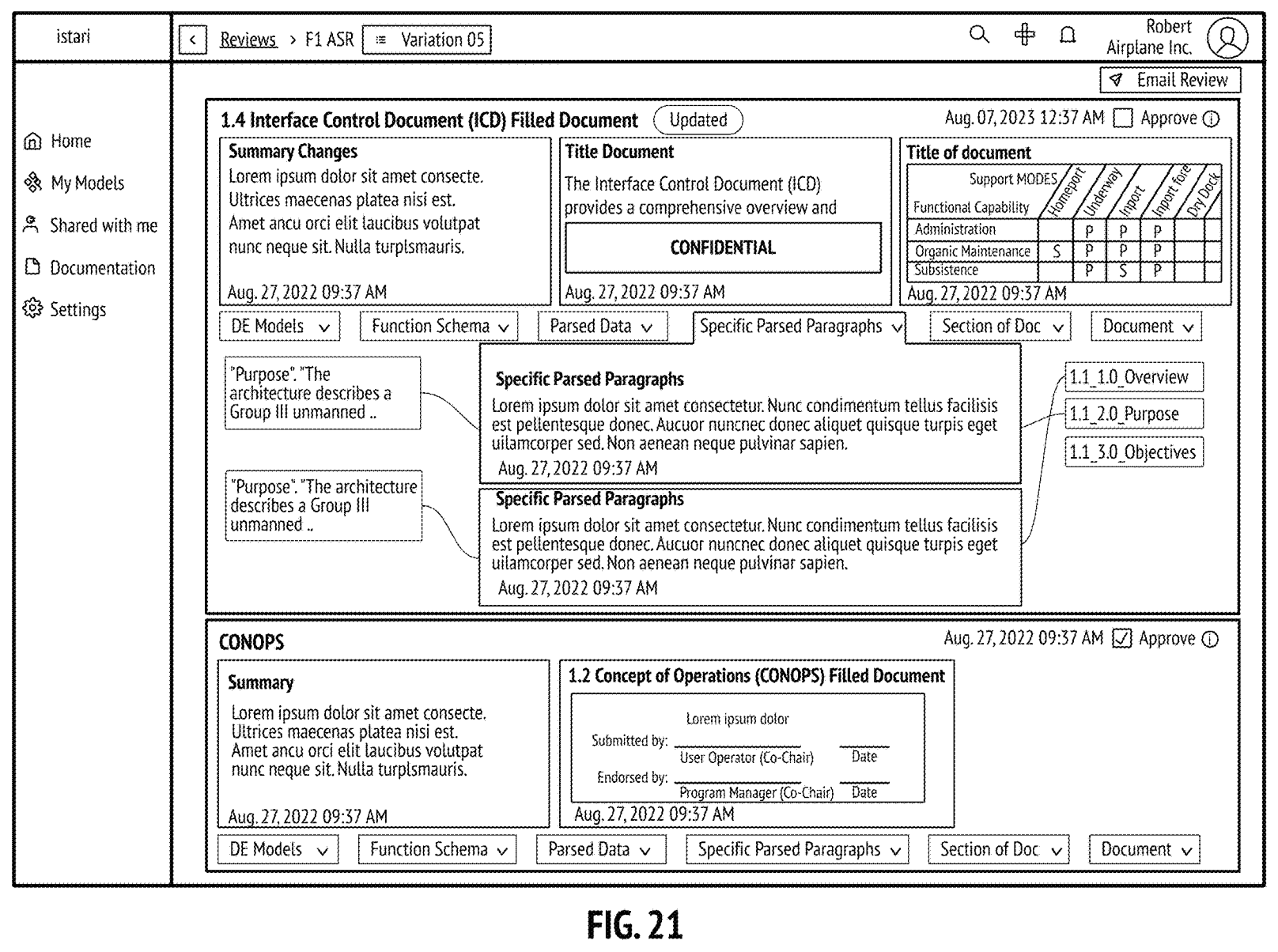
Figure 22:
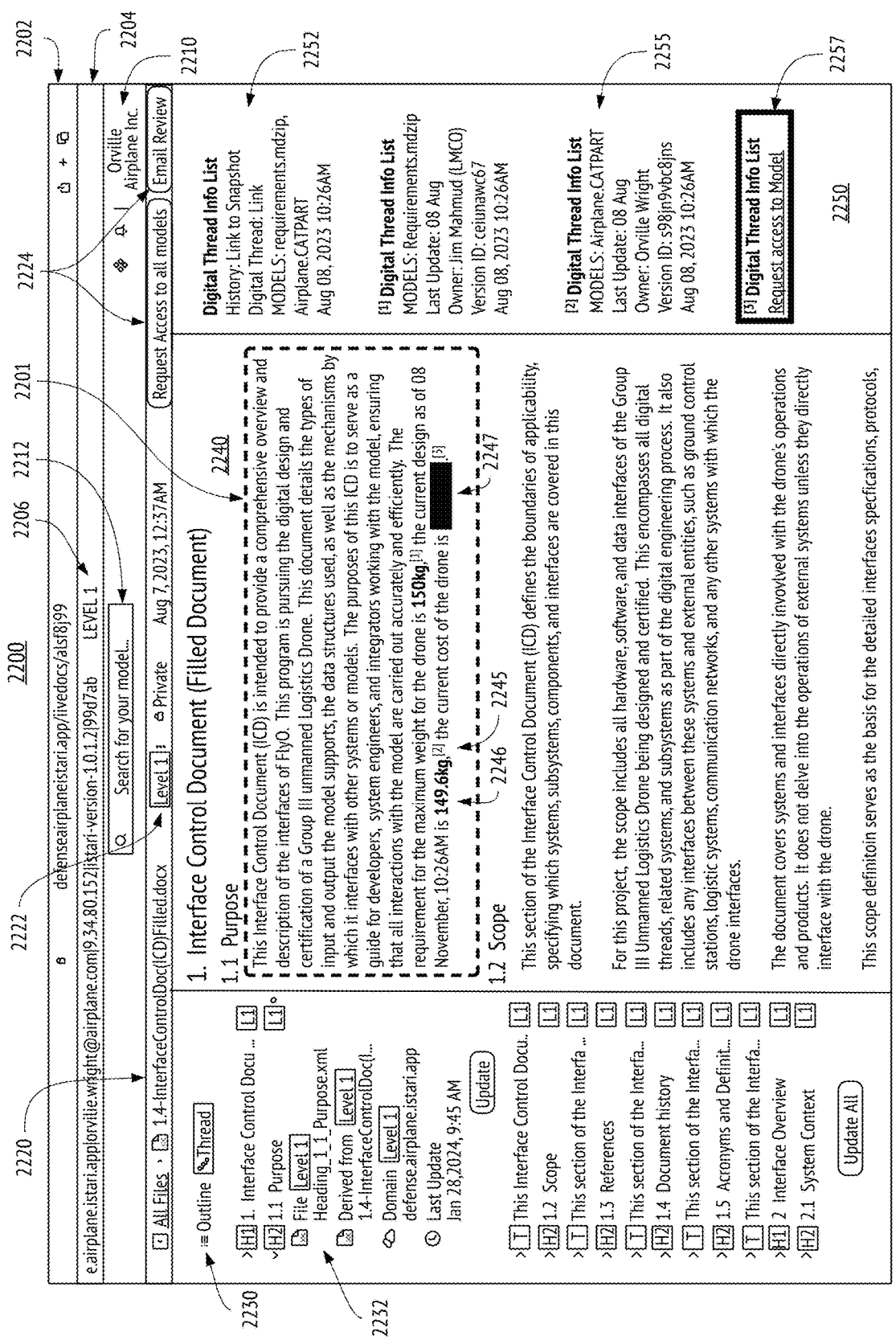
FIG. 22 shows a screenshot of an exemplary graphical user interface (GUI) for viewing and interacting with a generated document, in accordance with some embodiments of the present invention.

The view thus generated facilitates the user's review of the generated digital document. FIGS. 20, 21, and 22 show illustrative summary, expanded, and detailed views of an exemplary generated document. To enable accurate and efficient review, the view generated at step 1240 may contain access to underlying, linked data entities used in generating the digital document, or authoritative sources of truth. For example, hyperlinks may be provided for the digital model representation from step 1210, the digital artifact and the document subunits in step 1215, the generated digital document in step 1230, and any template or standard documents as discussed in the context of steps 1215 and 1230. In some embodiments, the digital document may be presented within the view. In some embodiments, a summary of the digital document may be presented within the view.

At a step 1250, a user input related to the human-readable document may be received from the reviewer via the user interface. Such a user input may be a comment on the document or any of the underlying data entities, an edit or change request to the document or any of the underlying data entities (e.g., redlines, highlights, update of model parameter values etc.), or an approval decision. This user interface may be multimodal, offering immersive and interactive data visualizations and conversational interactions, enhancing the user's understanding of the document content. That is, the multimodal user interface may intake text-based, voice-based, video-based, and/or gestural input. The multimodal interface may include a conversational interface or a spatial computing interface. The spatial computing interface may include a video input module, an audio input module, and a gesture input module. The spatial computing module may also receive contextual information associated with the video-based input.

Specifically, conversational interfaces mimic human conversation. Conversational interfaces can be text-based, such as chatbots, or voice-based, such as virtual assistants. For commenting, a conversational interface may be used to capture user dictation to a voice-based input module. The voice comment may then be transcribed and linked to the relevant data entity. This allows for a more natural and intuitive way of adding comments, particularly for users who may find typing difficult, inconvenient, or inefficient.

Similarly, voice recognition technology may be used at step 1250 to allow voice input of comments. This would be particularly useful for users who are visually impaired or who find typing difficult or inconvenient. It could also increase efficiency, as speaking is often faster than typing and carries emotional nuances typically absent in written text. Thus, voice recognition could enhance the accessibility of the system, catering to a wider range of user preferences and capabilities.

Furthermore, support for comments in the form of videos or images would allow users to leave comments that include visual or audiovisual content, thus providing more expressive and detailed feedback. For instance, a user could record a video explaining a particular issue or suggestion, or could upload an annotated image or data plot to illustrate an argument or suggestion. This commenting mode is particularly useful for complex digital models, where visual or audiovisual feedback could provide a clearer and in-context explanation than text alone.

Yet another possible commenting mode is with spatial computing interfaces, which allow for interaction with digital objects in a three-dimensional (3D) space. Spatial computing interfaces are particularly useful for digital models involving complex 3D designs and visualizations. For example, a spatial computing interface may be used to display comments as augmented reality (AR) overlays over physical objects. That is, a user may view a physical prototype of a DE model through a spatial computing interface, and see the associated comments displayed as AR overlays on corresponding parts of the prototype. This provides a more immersive and intuitive way of viewing and understanding comments, particularly in-context for complex DE models.

Integrations with conversational interfaces and spatial computing interfaces enhance the functionality and usability of the document review system. They provide more natural and intuitive ways of adding and viewing comments, catering to a wider range of user preferences and capabilities. Furthermore, they allow for comprehensive comment management, as the system may capture and display comments in various formats and contexts. Moreover, these integrations may enhance the system's capabilities for user tracking and interaction analysis. By capturing user input through conversational interfaces and displaying comments through spatial computing interfaces, the system may track a wider range of user interactions. For instance, the system may track the frequency and timing of comments dictated through a conversational interface, or analyze the viewing patterns of comments displayed as AR overlays. This detailed tracking and analysis of user interactions may provide valuable insights into the collaborative process, helping to identify trends, issues, and opportunities for improvement.

At a step 1260, at least one document splice from which the human-readable document is generated is updated based on the user input. In one example, if the user input is a comment, such a comment may be saved as a record in a comment table at a step 1270, and a link to the comment may be added to the document splice, so when a second user reviews the document, the comment can be presented to the second user. In some embodiments, such comments may be saved within the document splice as metadata or document artifacts, within its own unique ID. In another example, the user input may be an edit or change request to the document itself. Such a change (e.g., highlighting a portion of the document) may be displayed to the next user, or when the document is reviewed on the IDMP next time. In another example, the user input may be an edit or change request to an underlying digital model representation (e.g., update of a model parameter value), the document and the view may be updated accordingly. For example, if a design with a parameter value of A is found to meet certain requirements and the design is therefore listed as "compliant" in the generated certification report, an update by the user to change the parameter value to B may cause the design to be non-compliant, the document subunit containing the compliance decision may be updated accordingly, and the view of the certification report may be updated as well. In yet another example, if the comment is an approval decision, such a decision may be saved within the document splice as metadata, and may be presented to the next reviewer.

As discussed previously, one feature of digital model splicing is that the standardization of digital model data and the generalization of API interfaces/endpoints and functions allow the access of digital model type files outside of their native software environments, and enable the linking of different digital model type files that may not previously be interoperable. In the context of document generation, digital artifacts from non-interoperable digital models can be pulled into the same digital document through the use of splice functions as part of the universal IDMP API (e.g., see FIG. 8). Specifically, at step 1215, the document splice may be generated from multiple digital model splices, where another document subunit contains a digital artifact from a second digital model splice, and where the multiple digital model splices are generated with respective digital tools that are not directly interoperable with each other.

In some embodiments, the document review process implemented via process 1200 shown in FIG. 12 is collaborative. After process steps 1240, 1250, 1260 and 1270 are carried out for a first reviewer, the same steps can be carried out for a second reviewer. In some embodiments, selective access rights on document subunits are inherited by associated comments. For example, if a first reviewer commented on a section that the second reviewer is not authorized to access, the view generated for the second reviewer at step 1240 may redact both the section and the associated comments. In some embodiments, the second reviewer may be notified within the view that the first reviewer has commented on a redacted section. For a security compliance review, security analytics data or threat data may be considered as digital model files, and the aforementioned process steps can be executed on such digital models. More specifically, as shown in FIG. 12, at a step 1220, threat data may be generated by scanning system log data to detect potential threats against zero-trust security access policies, and such threat data may be considered as a security data digital model file. At a step 1225, one or more document splices may be generated based on the threat data, and a security compliance report may be generated and reviewed using steps 1230 to 1280.

In some embodiments, the IDMP's system log contains access and transaction information on digital entities, assets, or resources within the IDMP. Exemplary digital entities include but are not limited to, digital artifacts, digital models, digital documents, digital thread scripts, and digital workflows on the IDMP. The IDMP's use of access and transaction log enables its zero-trust security approach. Engineering processes critically depend on provenance to meet legal, regulatory, and other compliance requirements and ensure the correctness and completeness of digital engineering process outputs. For example, it is not enough to know that a design was approved as meeting a requirement; but what is to be known is who approved the design and when they approved the design. Full and complete access and transaction logs provide this vital provenance data. These logs enable precise reconstructions of every modification, change, approval, evaluation, and other action taken on a design, allowing for full tracing of who was responsible for what aspects of the result and when they did their work. Similarly, full and complete logs of failed access are a vital tool for investigating possible malfeasance, detecting security breaches, and otherwise ensuring that information protection and dissemination policies are being correctly adhered to and enforced. For example, reviewing the access logs can determine whether a user has "gone rogue" or attempted to sabotage a project, determine whether a compromised account is making many unusual or unexpected requests, or determine whether policies related to the use of the digital models are being followed appropriately. The IDMP may log all transactions, and in some implementations, implement threat detection using a machine learning or artificial intelligence model trained on past access logs of user transactions.

Additional Exemplary Processes for Certification Reviews

Figure 13:
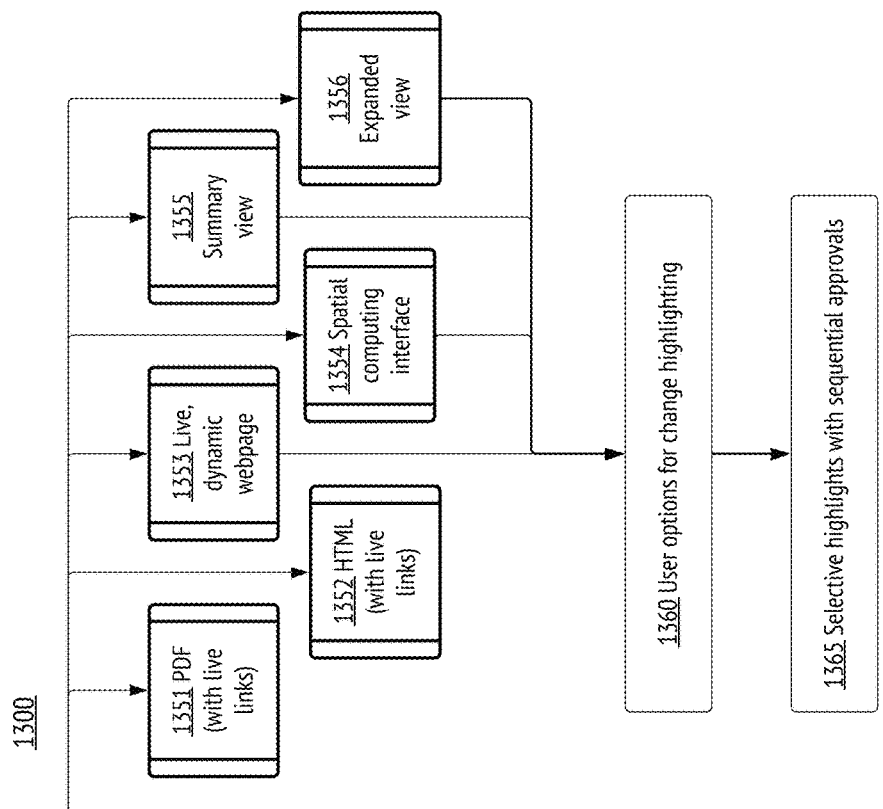
FIG. 13 illustrates another exemplary process for certification reviews, in accordance with example embodiments of the present invention.
Figure 13:
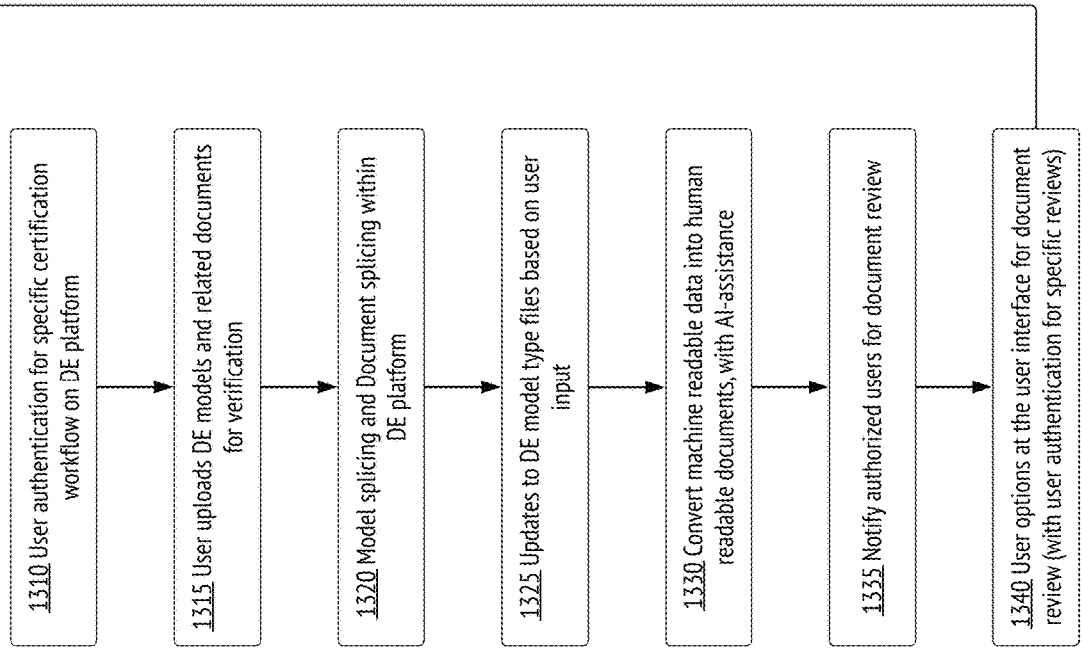

FIG. 13 illustrates another exemplary process 1300 for certification reviews, in accordance with example embodiments of the present invention. In the context of digital engineering (DE), certification may be performed in several stages to ensure thorough examination by appropriate experts in a structured manner to enhance the overall reliability of the process. Exemplary stages include technical review by subject matter experts, compliance check against relevant standards and regulations, security assessment, quality assurance, management approval, and final certification by an authorized body or individual. Embodiments of the present invention may be utilized in any stage of the certification process. The exemplary implementation shown next is built upon model and document splicing, AI-assisted documentation, and multimodal user interface presentations, and incorporates several functions, including but not limited to, user notification, document viewing options, change highlighting for updated documents, and selective highlights for sequential review of changes.

Specifically, at a step 1310, a user is authenticated for a specific certification workflow on the IDMP. Again, authentication is the process of verifying the identity of a user, device, or system entity, and ensures that the entity claiming a particular identity is indeed telling the truth. Exemplary authentication methods include, but are not limited to, usernames and passwords, biometric authentication (fingerprint, facial recognition), and multi-factor authentication (MFA). An authenticated user may have different levels of authorization rights. Authorization is the process of determining what actions or resources an authenticated user, device, or system entity is allowed to access. Authorization may be based on user attributes, such as the user's role, permissions, and privileges or information security level within the review process. Once a user is authenticated, the system may check the user's authorization level to determine what access rights the user has. An authenticated user may not have authorization to view certain sensitive portions of a document or underlying data entities. For example, a user may not be authorized for specific model splices, digital artifacts and/or subunits of document splices. Attributed-based authorization of users to specific splices is an important aspect of zero-trust security for DE models.

At a step 1315, the user uploads DE models and related documents for verification into the IDMP. In response, the IDMP platform performs model splicing and document splicing at a step 1320, as described with reference to FIGS. 7, 16, and 17. The DE models uploaded at step 1315 may refer to design models, requirement models, and the like. A related document for verification may be a V&V product, a requirement file, or a regulatory standard document, as discussed in the context of FIG. 2. In DE, verification refers to evaluating whether a product, service, or system meets specified requirements and is fit for its intended purpose, checking externally against customer or stakeholder needs, and confirms that a system element meets design-to or build-to specifications. For example, in the aerospace industry, a verification process may include testing an aircraft component to ensure it can withstand the forces and conditions it will encounter during flight.

At a step 1325, the user may optionally provide inputs to update the DE model type files, the model splices, the document splices, or the related documents. That is, as the input DE models and related documents are decomposed into model parts/components or document subunits, the user may manually examine their values and provide inputs to update the data before a report written in natural language is generated at a step 1330 next. For example, an extracted requirement on a particular digital model artifact may be considered too stringent and the user may update the requirement model splice manually. Such changes may be propagated back to the input requirements model when a splice function is executed to generate the updated input requirement model. In another example, the user may adjust model parameters in a model splice, so that the updated model splice corresponds to a new variant of the input digital model. Again, this new variant may be created by calling a model modification function as discussed in the context of FIG. 7.

At a step 1330, machine-readable data from the model and document splices are converted into human-readable documents, via model-to-model linking and model-to-document linking, possibly with the use of template documents and/or AI-assistance, as described with reference to FIGS. 8, 18 and 19. For example, a digital artifact extracted from an input computer-aided design (CAD) model may be compared to a requirement extracted from a requirements model, and the comparison result may be inserted into a report drafted using a Large Language Model (LLM). One or more human-readable documents may be generated in this step.

At a step 1335, once a human-readable document is generated, the IDMP may notify relevant users or stakeholders for document review, automatically or upon user request. For example, the IDMP may dispatch a notification to every authorized user involved in the review process. Such notifications may be delivered via diverse channels, including email and messaging services specific to the IDMP. Notifications ensure prompt dissemination of information about new content that is ready for review, enabling the users to stay updated with the latest changes in the documents. In some embodiments, the IDMP may further offer, with the notification, various document viewing options to cater to a range of users. Reviewers may access the documents in formats such as PDFs or HTMLs, both of which may come with live links that facilitate instant access to referenced materials or authoritative sources of truths. Another format offered by the IDMP may be a dynamic dashboard or web page that updates in real time, providing the users with the latest information as soon as it becomes available. In some implementations, a conversational or a spatial computing interface may be used that offers immersive and interactive data visualization, enhancing the user's understanding of the document content.

At a step 1340, the generated DE review document is presented at a user interface, with user authentication and authorization for specific reviews. Exemplary viewing options and modes include PDF with live links 1351, HTML with live links 1352, Live, dynamic webpages 1353, spatial computing interface 1354, summary view 1355, and expanded view 1356. In some embodiments, links to underlying DE model splices, DE threads, and requirements documents or document templates may be provided within the document interface, for example, as hyperlinks or comments to specific sections of the presented document. In some embodiments, user authorization may be checked at either step 1330 or 1340. In an exemplary scenario, the user may have access rights to only one of two document splices needed to generate a full review document. Call these two document splices "allowed splice" and "forbidden splice." The system may generate the human-readable document based on both splices at step 1330, but hide any part of the resulting human-readable document that depends on the forbidden splice at step 1340, based on user authorization result. This is applicable when the document has been generated by a user with full access to both model splices, but is being reviewed by another user who can only access the allowed splice. Alternatively, the system may generate, at step 1330, only parts of the human-readable document that are independent of the forbidden splice, based on user authorization results. That is, the generated human-readable document may be missing certain parts for its intended purpose, as a result of user authorization, but any generated portions may be presented to the user at step 1340 without restrictions.

Furthermore, regardless of the document format chosen by the user, a view of the document presented at the user interface may contain access to or live links that facilitate instant access to digital entities or authoritative sources of truths used to generate the review document. For example, the user may click on hyperlinks to see the input digital models (e.g., actual model file and/or model metadata), related documents (e.g., actual document and/or document metadata), model splices, document splices, digital artifacts, document subunits, the document, digital thread scripts that link the input digital models and documents to generate the document, and additionally, comments, transaction history, and execution metadata on any of the aforementioned digital entities.

At a step 1360, change highlighting options such as color-coded highlights, side-by-side comparison, and track changes with annotations may be provided. That is, in a collaborative setting, feedback from one reviewer may be presented to a concurrent or subsequent, authorized reviewer. For example, if a first reviewer has tweaked digital model parameters to create a new variant of an input digital model, a side-by-side comparison of the original model (e.g., a 3D model of an airplane) and the variant (e.g., a 3D model of the airplane with a different wing length) may be presented to the current reviewer as well as the next reviewer.

Similarly, at a step 1365, selective highlights with sequential approvals may be provided. Sequential approval refers to a structured approach to reviewing where multiple stakeholders or experts evaluate the subject matter in a predefined or pre-set order, especially when later stages of review depend on the completion and/or approval of earlier stages. This approach ensures a thorough, step-by-step review where each reviewer's input builds upon or considers previous assessments. With a specific sequence of reviewers established based on expertise, authority, or process requirements, each reviewer can examine the document at a designated stage to focus on their area of expertise or responsibility. Reviewers can therefore see cumulative feedback from previous review rounds, allowing for a more comprehensive and collaborative assessment, while a clear audit trail of the review process and decision-making can be recorded. Additionally, an escalation mechanism may be implemented such that issues identified at any stage of the review may be escalated or returned to previous reviewers if necessary. The overall review process may conclude with a final review or sign-off by a designated authority.

In short, methods and systems for facilitating a digital document review are provided. This method involves first generating a document splice from an input digital model representation, the input digital model representation comprising at least one externally-accessible model endpoint for generating a digital artifact. The document splice comprises access to multiple document subunits, with at least one document subunit written in a natural language and comprising the digital artifact from the input digital model representation. The access to each document subunit is provided through an externally-accessible document endpoint for the document subunit. A human-readable document is then created from the document splice, by compiling, combining, or concatenating the document subunits. Next, a view is generated for presentation to a user on a user interface of the IDMP. The view is associated with the human-readable document. The generation of the view is based on an user authorization result for the user, and the user authorization result contains selective access rights to the document subunits, such that the user is only allowed to see document subunits that he or she is authorized to access. The view also contains access links to data resources that were used for its creation, including the digital model representation, the digital artifact, each document subunit, and the human-readable document itself. Lastly, a user input is received from the user via the user interface, and the document splice is updated based on the user input, via an externally accessible document endpoint.

Additional Exemplary Processes for Security Compliance Reviews

Figure 14:
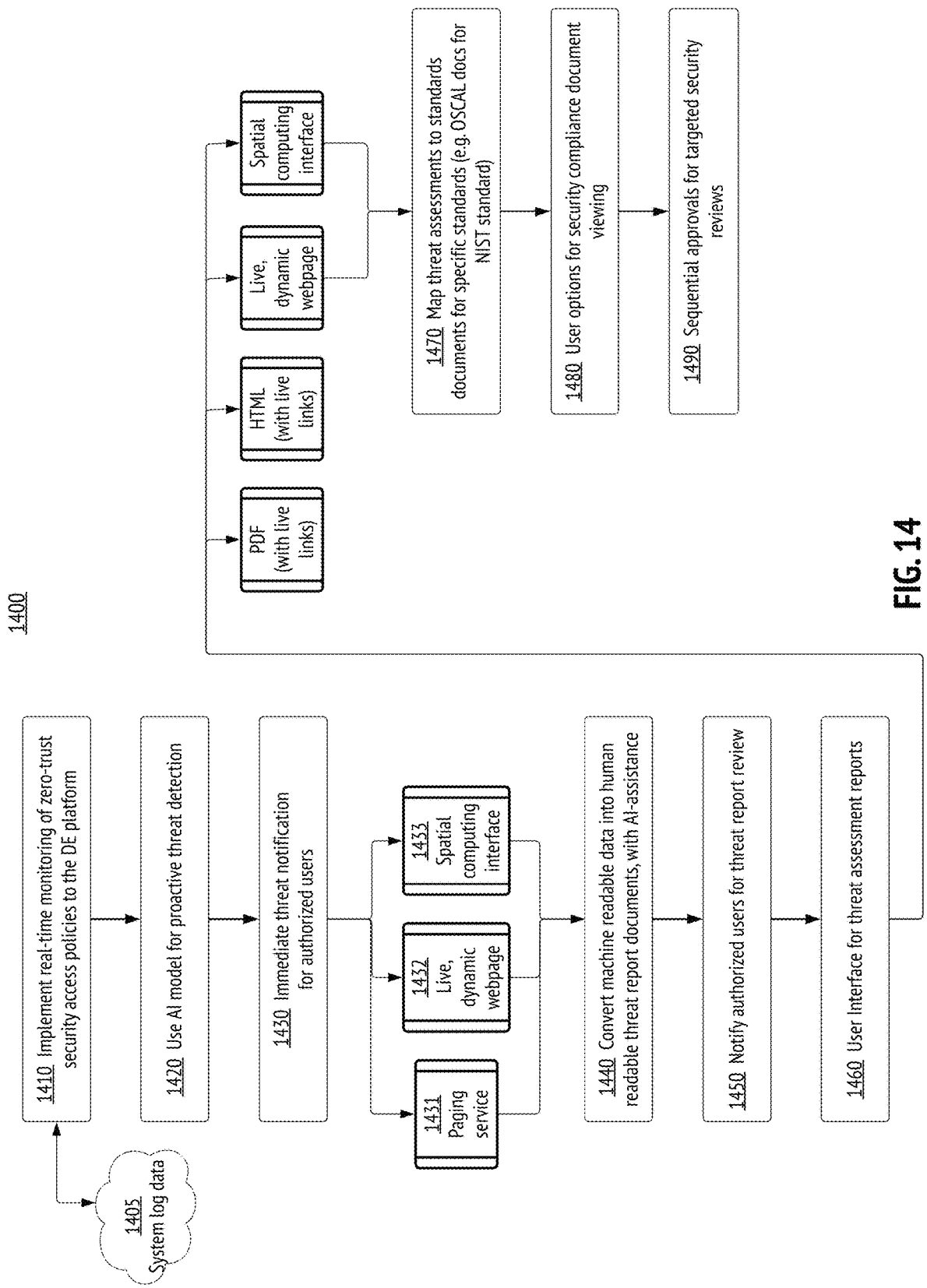
FIG. 14 illustrates a security compliance review process, in accordance with example embodiments of the present invention.

Similar to FIG. 13, FIG. 14 illustrates a security compliance review process 1400, in accordance with example embodiments of the present invention. This exemplary implementation is built upon model and document splicing, AI-assisted documentation, zero-trust security architecture, AI models for threat analysis, and multimodal user interface presentations. It leverages an AI model for proactive threat detection and AI-assisted document conversion to convert machine-readable threat data into human-readable security assessment or threat report documents. Sequential approvals may also be set up for targeted security reviews, ensuring a comprehensive review from the relevant stakeholders of identified security issues.

At a step 1410, the IDMP may implement zero-trust security access policies and real-time monitoring. Traditional zero-trust security is a framework that relies on the core concept of "never trust, always verify." In a zero-trust security model, trust is based on the identity of the user or device and the context in which they are attempting to access resources. The zero-trust security architecture as established in the IDMP applies to not only users, devices, and networks, but also to digital artifacts, digital models, digital threads, digital documents, model splices, document splices, and other modular data entities or data resources integrated into the IDMP. Again, it is not enough to know that a design was approved as meeting a requirement; but what is to be known is who approved the design and when they approved the design. Full and complete access and transaction logs collected as system log data 1405 can provide this vital provenance. These logs enable precise reconstructions of every modification, change, approval, evaluation, and other action taken on a design, allowing for full tracing of who was responsible for what aspects of the result and when they did their work. Similarly, full and complete logs of failed access are a vital tool for investigating possible malfeasance, detecting security breaches, and otherwise ensuring that information protection and dissemination policies are being correctly adhered to and enforced. Table 1 below shows illustrative entries in an exemplary access and transaction log.

TABLE 1

Exemplary Access and Transaction Log

| Timestamp | User ID | Task ID | Action Taken By | Action |
|---|---|---|---|---|
| 2024-06-04 09:15:30:000 | 1234 | 72823 | User Action | Entered model uw2233 and system check DET Access |
| 2024-06-04 09:16:30:123 | 1234 | 72823 | IDMP Action | Clicked Extract on model uw2233 |
| 2024-06-04 09:20:10:456 | 1234 | 72823 | Tool Action | Put in job-service queue |
| 2024-06-04 10:05:30:789 |  | 72823 | IDMP Action | Picked up by agent 3, vm3 |

The zero-trust security architecture and security-related processes implemented on the IDMP ensure the right authenticated users are able to access the right authenticated models and/or documents (and only the right authenticated parts of models or documents) for specific types of data, models/documents are credibly authentic because access to read and write must be explicitly granted, and complex computations involving multiple models can be executed securely because access must be explicitly granted for each step at the user, network, model, model splice, digital artifact, and user comment levels. In this zero-trust security architecture, continuous monitoring is a key principle, where ongoing monitoring and analysis of system operations, user activities and behaviors, and performance metrics are analyzed to detect anomalies and potential threats in real-time. Zero-trust security for DE models is described in more detail in related U.S. provisional patent application Nos. 63/489,401 and 63/530,863, incorporated by reference in their entireties herein.

At a step 1420, an Artificial Intelligence (AI) model may be leveraged for proactive threat detection. The AI model may continuously scan the system log data and identify potential threats based on pre-set algorithms. For example, the AI model may identify patterns of failed access attempts and flag certain patterns as an indication of foul play. In some implementations, pre-set algorithms are implemented through deep learning models like convolutional neural networks (CNNs) or recurrent neural networks (RNNs) that analyze network traffic patterns and time-series data, detecting anomalies that may indicate security threats. In other implementations, Support Vector Machines (SVMs) may be employed to classify network traffic by distinguishing between normal and malicious activities based on specific features. Both approaches play a different but important role in early threat detection, aiding in the identification and mitigation of potential security incidents.

Upon threat detection, the system may promptly inform authorized users at a step 1430 through various notification channels, such as a paging service 1431, live webpage 1432, a conversational interface, or a spatial computing interface 1433. In some embodiments, the notification system employs the use of spatial computing interfaces with 3D spatial audio or sonification to represent threat alerts. This real-time threat detection and notification mechanism contributes to a swift response to potential security threats, hence minimizing potential damage. The use of sonification or 3D audio are means to reduce human expert fatigue or cognitive overload when responding to frequent, seemingly similar threat alerts.

At a step 1440, the IDMP may employ AI-assisted document conversion to convert machine-readable threat data into human-readable security assessment report documents. This automated process enables the translation of technical language and complex data patterns into easily comprehensible reports.

Following the preparation of these reports, at a step 1450, the IDMP notifies authorized users for review of the security assessment report documents, similar to step 1335 in FIG. 13.

At a step 1460, a user may review the security assessment reports in a select format (e.g., PDF, HTML, dynamic webpage, through a spatial computing interface, etc.), and provide a user feedback. Such a user feedback may be a comment, a change edit, an approval decision, or the like. For example, the user may identify a potential security threat as a false positive and remove it from the report, or the user may flag a portion of the document for another reviewer.

At a step 1470, the security assessment reports may be mapped to standard security documents to align the threat assessments to established security benchmarks and determine compliance results. Exemplary standard documents include Open Security Controls Assessment Language (OSCAL) docs for the National Institute of Standards and Technology (NIST) standard. Mapping refers to finding corresponding fields to compare. In one implementation, digital artifacts from the security assessment report may be compared to corresponding fields in standard security document splices, and the comparison result used to generate a security compliance report. In some implementations, the security assessment reports may be updated with compliance results and become a security compliance report.

At a step 1480, users may choose options for viewing the security compliance documents, again in a preferred format, such as PDF, HTML, a Live Webpage, or through a Spatial Computing Interface.

Lastly, at a step 1490, the platform may set up Sequential Approvals for Targeted Security Reviews. A step-by-step approval process ensures a comprehensive review from the relevant stakeholders of identified security issues. Each identified issue may be targeted individually, requiring approval from the relevant stakeholders in a set sequence. This approach ensures a thorough review process for every identified issue, affirming the accuracy and pertinence of every security measure. In one example, a security review may involve two users: an information security or cybersecurity head, who provides and refines the security report, and a separate auditor or regulatory person who reviews the report for compliance. This two-stage process ensures the report meets regulatory requirements and compliance standards. The two users may view the same security report through the IDMP, allowing them to confirm compliance together.

In short, methods and systems for facilitating a security compliance review are provided. This method involves first monitoring a system log for transaction data related to transactions on one or more digital artifacts, digital models, digital documents, digital thread scripts, and digital workflows on an IDMP. A digital workflow refers to a sequence of actions taken by the system and/or a user. Next, one or more potential security threats are detected from the transaction data under a zero-trust security access policy implemented on the IDMP. From the detected potential security threats, a security assessment report is generated. The security assessment report is then mapped to the document splice of an input standard document to check compliance and generate a security compliance review document. To map the security assessment report to the input standard document, digital artifacts may be retrieved or parsed from the security assessment report, and a document splice of the input standard document may be generated, where the document splice comprises access to multiple document subunits, and where the access to each document subunit is provided through an externally-accessible endpoint for the document subunit. Each digital artifact may be mapped to corresponding fields in corresponding document subunits. A compliance result for the digital artifact may be generated and used to draft the security compliance review document, possibly with AI-assistance.

Next, a first view of the security compliance review document is generated for presentation on a user interface, based on an authorization result for a first user, where the authorization result comprises selective access rights to the document subunits. The first view may further provide access to underlying digital resources, including the transaction logs, the detected potential security threats, the security assessment report, each of the document subunits, and the security compliance review document itself. The first user may provide an input through the user interface. Similarly, a second view may be generated, based on an authorization result for a second user, and a second user input may be received via the user interface. The first user input and the second user input may be used to jointly generate a security compliance review approval. Again, the user input may comprise comments, change edits, decisions/approvals. In one example, the two users are tasked with reviewing different sections of the security compliance document, and each may have access to only the sections he or she is reviewing. The security compliance document is only approved if both users approve their respective sections. In another example, the two users may both be tasked to review the same sections, and approval from both is required for the document to be signed-off. In yet another example, the second user may be granted access to certain sections of the security compliance document only after the first user has approved these sections. Alternatively, the second view comprises an option to approve the document only if the first user as already approved the document.

Exemplary System Implementation

Figure 15:
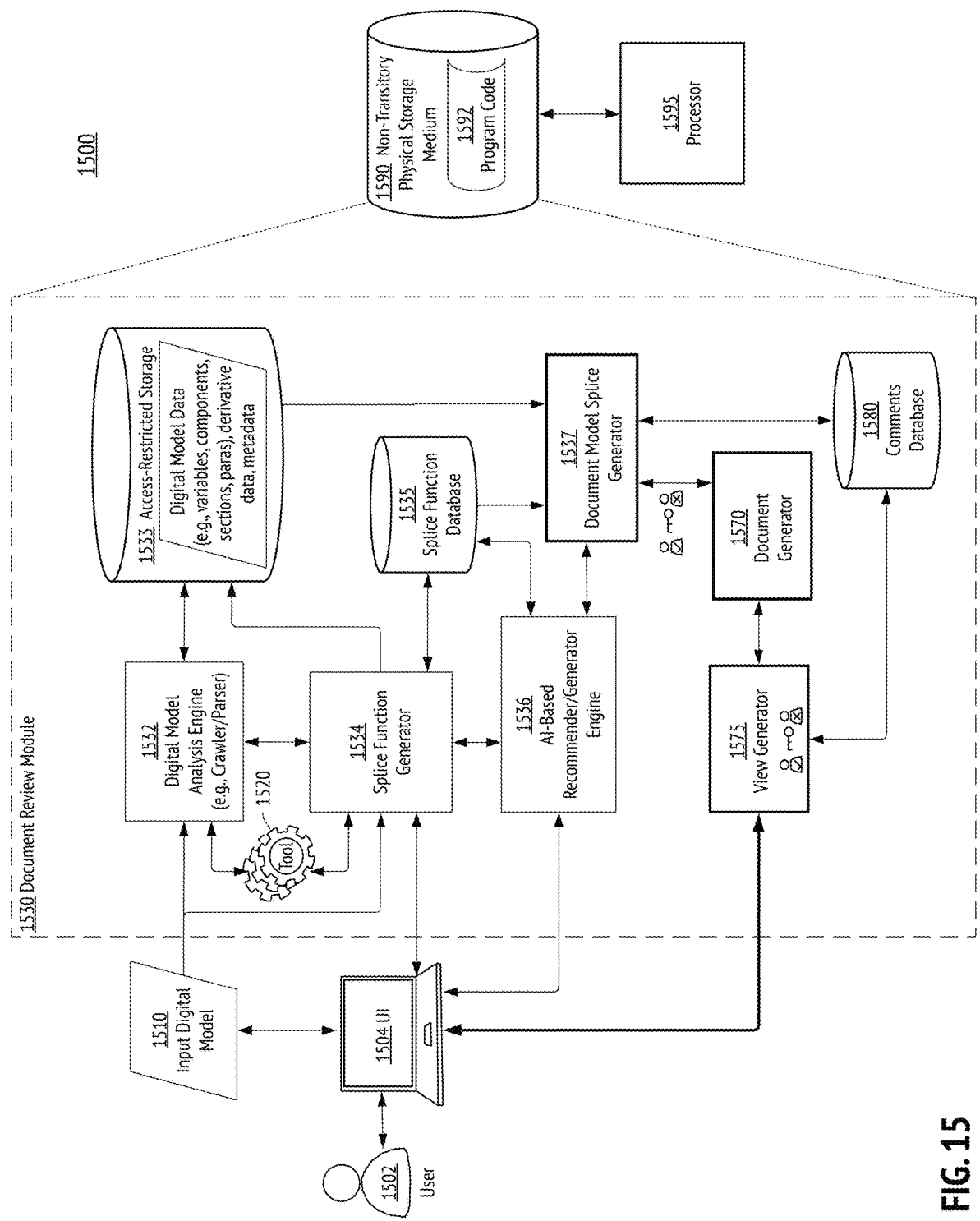
FIG. 15 shows an exemplary system for implementing collaborative document reviews, in accordance with some embodiments of the present invention.

FIG. 15 shows an exemplary system 1500 for implementing collaborative document reviews, in accordance with some embodiments of the present invention. In this illustrative example, a non-transitory physical storage medium 1590 is provided to store program code 1592, the program code executable by a hardware processor 1595 to cause the hardware processor to execute computer-implemented processes, including document generation via a document generator module 1570, and view generation via a view generator module 1575.

In some embodiments, program code 1592 comprises code to receive an input digital model file 1510 in a source file format (e.g., in a native document file format such as .dwg or .doc). In some embodiments, input digital model file 1510 may be received from a user 1502 through a user interface (UI) 1504. User 1502 may be a human or a computing entity, and UI 1504 may be a graphical UI (GUI), a code interface such as an API/SDK interface, or a multimodal interface as discussed with reference to FIG. 5. For example, user 1502 may represent an artificial intelligence (AI) module that intends to link a generated document as part of a digital thread, or to embed a document view in a multi-program overview. The digital document generated by generator 1570 may be implemented as a document model splice combined with digital thread execution metadata. In some embodiments, user 1502 may provide additional inputs for input model splicing, document splice generation, or document/view generation. Exemplary user input includes, but is not limited to, desired document view modes or formats, requests for specific digital artifacts, intents for document usage, access restriction requirements on the generated document model splice and/or document, authentication and/or authorization credentials, specific software tools or programming language to be used for crawling or parsing through the input digital model file and/or for generating a document model splice, request for proprietary or open-source tools, proprietary licenses or access codes for using proprietary tools during model splicing, and the like. In some embodiments, input digital model file 1510 may be received directly from a data source, for example, retrieved from an internal database, a cloud-based storage service, or the world wide web. In some embodiments, input digital model file 1510 may comprise physical artifacts collected from physical twins and organized in a pre-defined source file format.

A digital model analysis engine 1532 analyzes input digital model file 1510 to extract model data that are in turn stored in a data storage area 1533, which may be access-restricted, cloud-based, or may be located in customer buckets within customer environments for a zero-trust implementation. In some embodiments, digital model analysis engine 1532 may comprise a crawler script that calls upon native functions of native digital tools 1520 associated with input file 1510 to parse the input digital model in detail to determine the model type, extract component data, identify metadata associated with the model file and/or component data, and generate a list of variables. In some embodiments, digital model analysis engine 1532 may generate derivative data from extracted model data, with or without the assistance of a splice function generator 1534 and/or AI-assistance. When a derivative datum is generated and stored in storage 1533, associated metadata may be stored as well, for example, to identify a time of the derivation, code used for the derivation, user authorizing the derivation, and/or a version of the input model file at the time of the derivation. Such metadata may be crucial in applications that require near-instantaneous auditability and clear traceability to original sources of truth. In some embodiments, digital model analysis engine 1532 may be operated as part of a digital thread, and the aforementioned metadata associated with the derivation of digital artifacts may be viewed as digital thread execution metadata.

Splice function generator 1534 generates one or more external, commonly-accessible splice functions that enable external access to one or more digital artifacts derived from the digital model data stored in storage 1533. In the present disclosure, digital artifacts are functional outputs. Any model data, derivative data, metadata, or combinations and functions thereof may be viewed as a digital artifact, accessed or generated via digital model splice output functions. Both model analysis engine 1532 and splice function generator 1534 may call upon native functions of native digital tools 1520 associated with the input digital model's model type or as requested by the user. For example, splice function generator 1534 may generate API function scripts that call upon native digital tool functions to derive the digital artifacts, or to provide functionalities based on user input. The user may specify which digital tool to use or is preferred. In some embodiments, splice function generator 1534 may interact with user 1502 through UI 1504 to receive user-defined splice functions, to receive user selection from a list of existing splice functions previously defined by other users or previously generated and stored in splice function database 1535, and/to receive user approval or revision to proposed splice functions. In some embodiment, the user may match between the model data and existing splice functions in splice function database 1535 to identify a selected number of splice functions that may be included in a model splice.

In some embodiments, an artificial intelligence (AI)-based recommender/generator engine 1536 may assist splice function generation. For example, AI-based recommender/generator engine 1536 may have been trained on existing splice functions associated with existing model splices for the same digital model types, analogous digital model types, and/or analogous digital models, and may have been further fine-tuned based on user inputs. In some embodiments, AI-based recommender/generator engine 1536 may utilize a large language model (LLM) to write function scripts that call upon APIs of native digital tools 1520. In some embodiments, AI-based recommender/generator engine 1536 may retrieve a list of splice functions from splice function database 1535, based on user input and other data inferred from the input digital model, such as file format, DE model type, intended purposes/use/audience, etc. In some embodiments, AI-based recommender/generator engine 1536 may autonomously match model type with existing splice functions to recommend a list of potential splice functions for the user to select from. In the present disclosure, analogous digital models or digital model types refer to digital models that are similar in some aspects, such as structure or behavior, but are not identical. Analogous digital models may be identified by analyzing the characteristics of different digital models and determining shared common features, attributes, or components that are relevant for model splicing. Analogous digital models may be used as reference, baseline, or starting point for model splicing, leveraging the similarities to improve efficiency and to capitalize on validated splice functions. Analogous models are particularly useful when they follow the same standard guidelines or reuse the same components or modules. For example, different variants of an aircraft may share a common propeller design but have different avionics. Splice functions generated for one variant of the aircraft may be used as training data for AI-based recommender/generator engine 1536, for generating splice functions of other variants of the aircraft.

The splice functions thus generated provide addressable API or SDK endpoints or "model endpoints" that are accessible by third-party applications and users. Such model endpoints enable access to the digital artifacts without access to the entirety of the digital model file and without requiring direct engagement by the third-party applications or the users with native digital tools 1520 associated with the digital model type or the native digital file format. That is, splice functions mask native digital tool functions and digital tools. A user of a generated model splice is no longer required to have deep knowledge of the associated native digital tool. Furthermore, different users may access the same model endpoints that deploy different underlying native digital tools during model splicing. For example, a first user having a first input CAD model file and access to a proprietary CAD tool, and a second user having a second input CAD model file and access to an open-source CAD tool, can both obtain CAD model splice having the same splice functions that are implemented with the proprietary CAD tool and the open-source CAD tool respectively.

Next, a document model splice generator 1537 may utilize model splice functions from database 1535 to derive or access one or more digital artifacts to construct a document splice.

From one perspective, a given digital document can be viewed as a specific type of digital model, and the methods and systems for digital model splicing are equally applicable to digital documents. That is, modules 1532, 1534, 1536 discussed above can be analogously applied to an input digital document to generate a document splice with externally-accessible API handles or "document endpoints" to individual document subunits. Document model splice generator 1537 may then bundle spliced document parts and splice functions into a sharable document splice, in the form of locators (e.g., links, addresses, pointers, indexes, URLs, etc.) and/or copies of data. Splice data may be a selective portion of document artifacts obtained from the input document model file. An illustrative example of this setup is when a template report with placeholder fields is used to generate the desired document for review. The template may first be spliced and decomposed into subunits (e.g., sections, paragraphs, sentences), then parameter substitution may be performed to insert digital artifacts derived from the input digital model 1510 into the placeholder fields. That is, digital artifacts derived from an input digital model may be mapped to document subunits (e.g., paragraphs) that make up sections of a review document. Later discussion in the context of FIG. 19 provides an example for this process. Additional splice functions associated with the template document splice may be executed to update certain fields within the template document splice, based on the inserted digital artifacts. In some embodiments, Retrieval-Augmented Generation (RAG) may be employed where the system automatically looks for appropriate templates from a database.

From another perspective, a document splice may be generated constructively by document model splice generator 1537. For example, a transformer-based or Large Language Model (LLM)-based AI module (not shown) may be prompted with digital artifacts extracted from input digital model 1510 and instructions for writing a specific subunit of the desired document. Later discussion in the context of FIG. 18 provides an example for this process. Each subunit may therefore be developed as a self-contained piece of content, possibly written in natural language, and focusing on a specific aspect of the overall document. In some embodiments, the extraction of the digital artifacts and the generation of individual document subunits are achieved by executing a digital thread script.

Once a document splice containing document subunits are generated by module 1537, a document generator 1570 may combine or assemble the document subunits to generate a human-readable document for review by a reviewer. The document subunits may be arranged according to a predefined structure such as a desired outline or table of contents to create a cohesive document. In some embodiments, additional adjustments may be made to ensure smooth transitions between subunits and consistent use of terminologies throughout the document.

Figure 17:
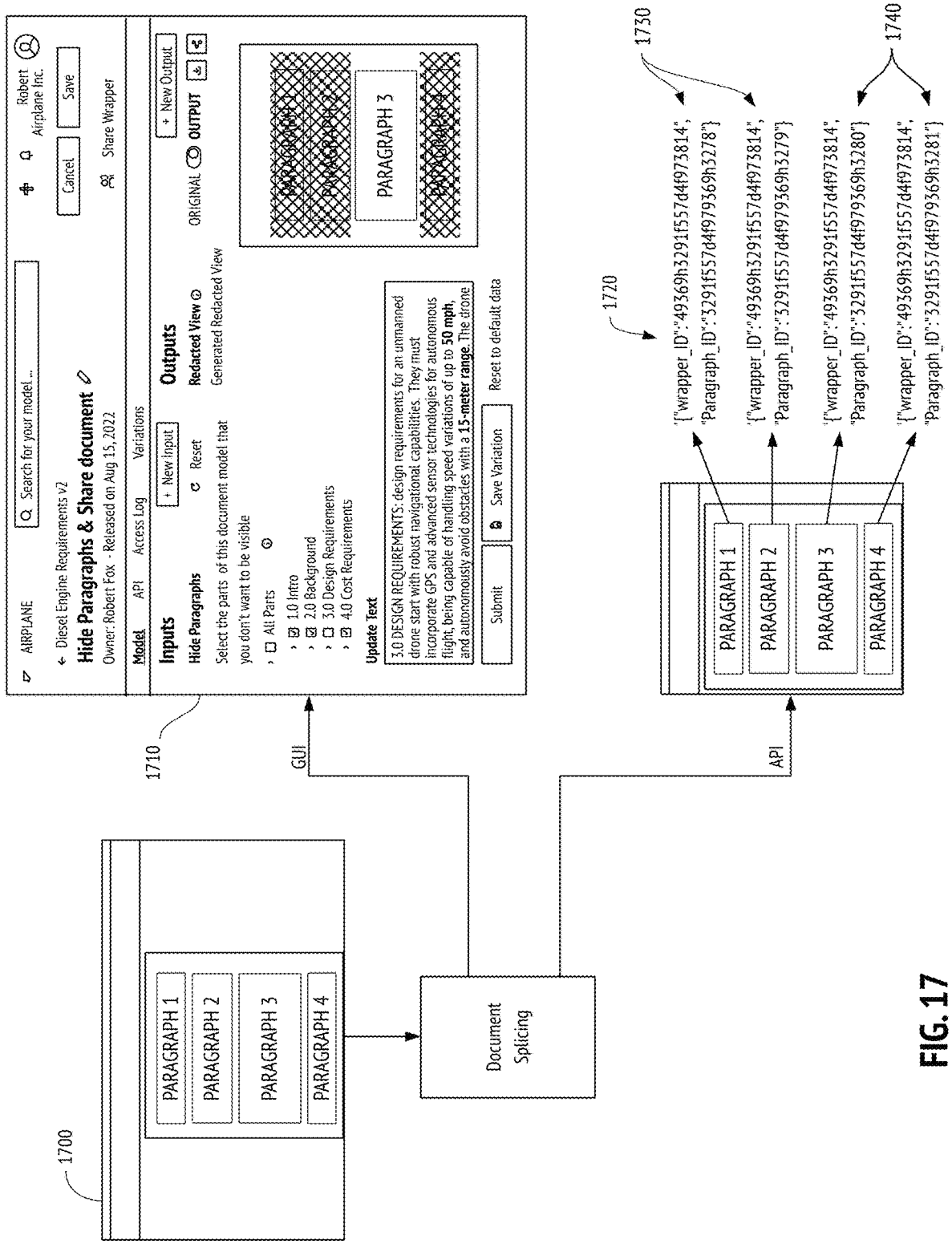
FIG. 17 shows an illustrative example of document splicing or document model splicing within the IDMP, in accordance with some embodiments of the present invention.
Figure 29:
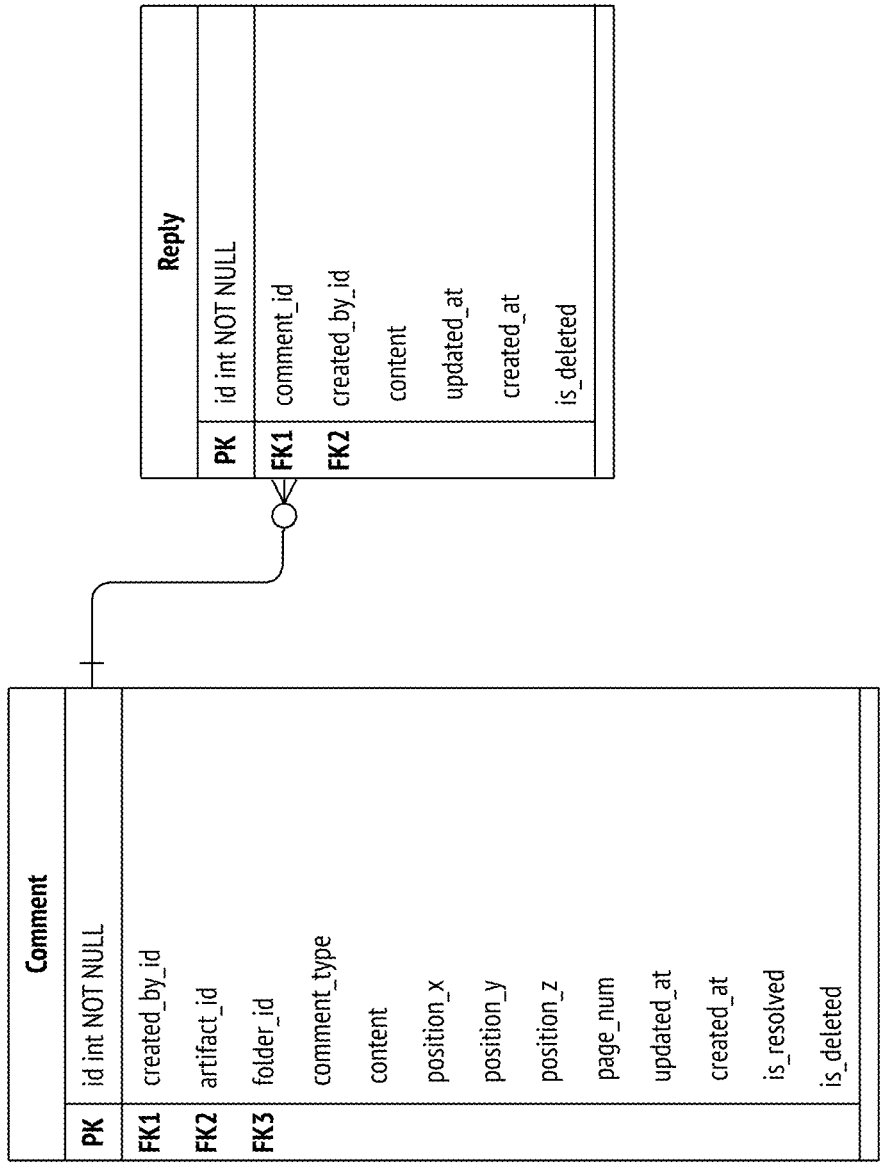
FIG. 29 shows an illustrative relationship diagram comprising a comment record and a reply record in a relational database, in accordance with some embodiments of the present invention.

In some embodiments, during document generation, an intended reviewer is verified for authorized access. If there are certain document subunits that the reviewer is not authorized to see, document generator 1570 may omit these document subunits during document generation. A view generator 1575 may subsequently generate a view of the entire generated document for presentation to the reviewer, as the reviewer is authorized to review all parts of the generated document. In some embodiments, reviewer authorization is performed during view generation by view generator module 1575. An exemplary redacted view of a generated document is shown in FIG. 17 to illustrate a "Hide Paragraphs & Share Document" document splice function. The generated view may be presented to a reviewer such as user 1502 on UI 1504. The view may contain one or more of subunit outlines, links to individual subunits, digital thread execution metadata, links to dynamic digital artifacts that are synchronized with input digital model 1510, and interactivity enabled for document review, including commenting and approval. Additional user inputs such as comments received from a reviewer may be stored in a comments database 1580. An exemplary comment record is shown in FIG. 29. In some embodiments, the originating document splice may be updated by document model splice generator 1537 with a link to the comment record. When an UUID is assigned to a comment, the UUID may be saved into the originating document splice.

While digital documents are discussed in the context of digital engineering certification review and security compliance reviews within the present disclosure, the systems and methods as disclosed herein are equally applicable to digital documents not traditionally used in digital engineering. For example, such documents may be scientific reports, peer-reviewed academic papers, news articles, legal briefs, business contracts, real estate deeds, living wills, affidavits, or even books, each with specific layouts and formats, and may be viewed as a different document model type. Analogous document models or document model types refer to document models that are similar in some aspects, such as structure or format, but are not identical. For example, peer-reviewed academic papers and news articles can both include citations to external sources of data, but peer-reviewed academic papers typically have specific individual sections such as introductions, methods, results, each with respective section titles. Analogous document models may be identified by analyzing their characteristics and determining shared common features, attributes, components, or fields that are relevant for document model splice generation. Analogous document models may be used as reference, baseline, or starting point for document splice generation, leveraging the similarities to improve efficiency and to capitalize on validated splice functions. Analogous document models are particularly useful when they follow the same standard guidelines or reuse the same components or document parts. For example, peer-reviewed papers have similar sectional structures, but a literature review paper differs from a multi-experiment paper. Splice functions generated for one type of document may be used as training data for AI-based recommender/generator engine 1536, for generating splice functions of other analogous document types.

While digital model analysis engine 1532, splice function generator 1534, AI-based recommender engine 1536, document model splice generator 1537, document generator 1570 and view generator 1575 are shown as separate modules within FIG. 15, in various embodiments of the present invention, these modules may be integrated in any combination to facilitate seamless data exchange and functional collaboration to optimize the overall performance of the digital model splicing, document splice generation, document generation, and view generation processes. In some embodiments, parts of document review module 1530 may be implemented within a customer environment behind a customer firewall and be managed by an IDEP agent, so that customer data within storage 1533 is fully protected under a zero-trust setting. Splice function database 1535, which could be independent from specific model data, may be provided by the IDEP and accessed via the IDEP agent.

Digital Model Splicing and Document Model Splicing Examples

Figure 16:
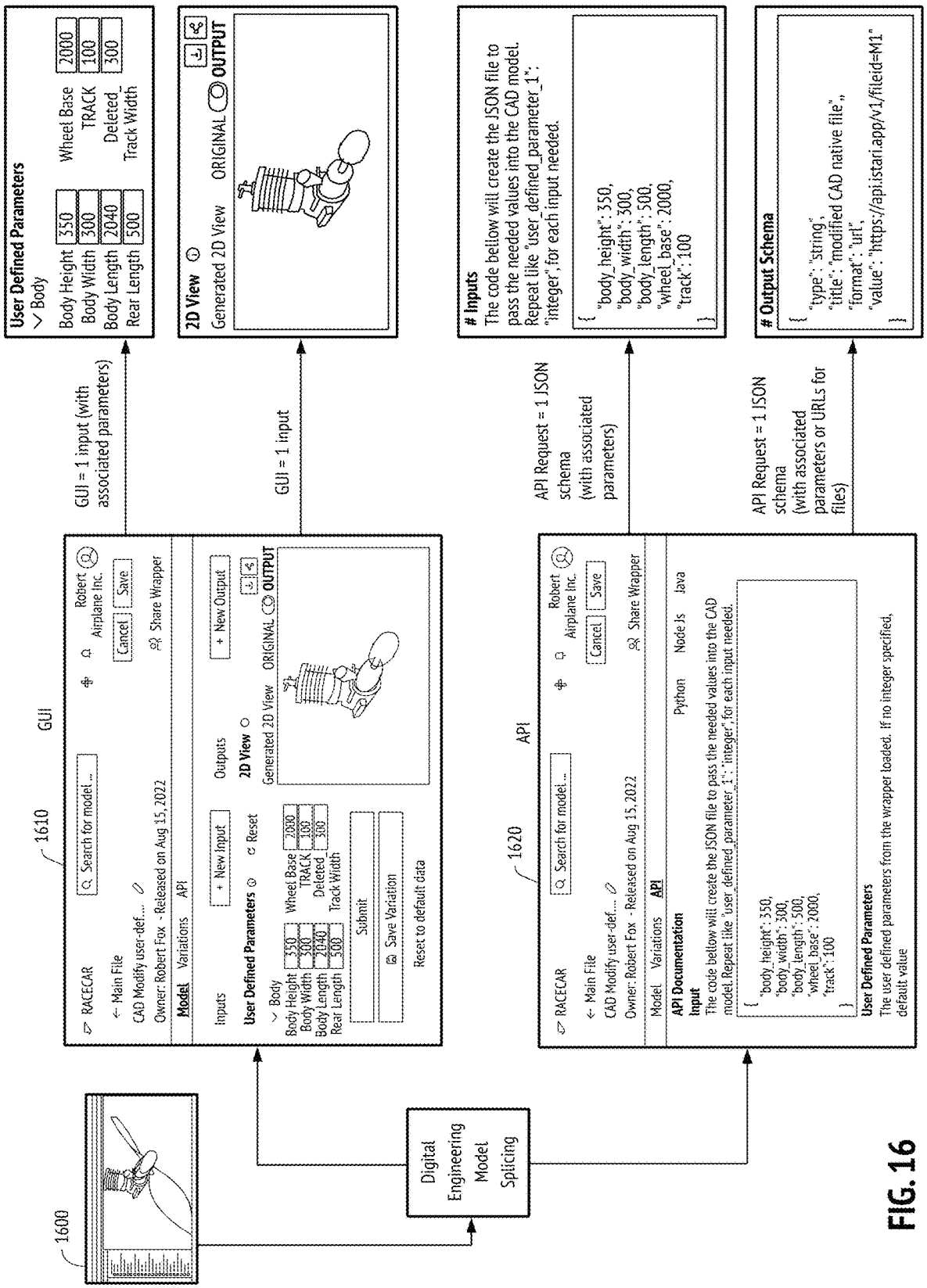
FIG. 16 shows an illustrative example of computer aided design (CAD) model splicing result within the IDMP, in accordance with some embodiments of the present invention.

To illustrate the similarities between digital model splicing and document splicing, FIG. 16 shows an illustrative example of CAD model splicing result within the IDMP, in accordance with some embodiments of the present invention. In this example, an input CAD file 1600 for a propeller engine is spliced into model data and splice functions written as scripts that call upon native digital tool APIs. Exemplary model data are shown in an GUI interface 1610 with input parameter fields on the left, and an output visualization on the right. Data schemas and/or API scripts may be accessed via a separate tab 1620 in the GUI, listing input schemas and output schemas for API endpoints to pass needed values into the CAD model, or for providing output locations of modified native files.

By comparison, FIG. 17 shows an illustrative example of document splicing or document model splicing within the IDMP, in accordance with some embodiments of the present invention. FIG. 17 is structured similarly to FIG. 17. During document splicing, an input document file is first parsed into chunks, parts, subunits, or components, with or without hierarchy, and each with at least one API endpoint for access and handling. In this illustrative example shown in FIG. 17, an input document 1700 is written in paragraph form, in text only, and parsed, divided, or segmented into individual paragraphs as delineated by carriage returns and paragraph spacing. In various embodiments, document parts or subunits may be classified according to type, structural form, formatting, spacing, syntax, sectioning, content, theme, or any other predefined or user-defined rules. For example, a subunit may be a structural component such as a title, a chapter, a section, a subsection, a paragraph, a sentence, a word, a sheet, a page, a line, a comment, a hyperlink, a table, a graph, an image, an equation, and sub-parts thereof. In some embodiments, parts or subunits of the same structural form may be of different types, for example, title, version number line, author line and publisher line; table of contents, table of numerical parameters; sections, subsections; header, footers; front cover, back cover; stakeholder name field, signature field, and the like. In some embodiments, an LLM may be deployed to understand user-defined rules for splicing a document. In some embodiments, subunits are non-overlapping; in some embodiments, subunits may overlap (e.g., a word subunit being a part of a paragraph subunit).

In FIG. 17, exemplary document model data are shown in an GUI 1710 with input parameter fields on the left, and an output visualization on the right. Parts of input document 1700 are organized by sections (e.g., 1.0 Intro, 2.0 Background, 3.0 Design Requirements, 4.0 Cost requirements). For illustrative purposes, each section is shown as containing a single paragraph. In practice, each section may contain multiple individual paragraphs as sub-parts, and each paragraph may be identified by a unique paragraph identifier (ID). API 1720 is shown below for the document splice, with a single splice or wrapper ID 1730 and individual paragraph IDs 1740 for document parts in paragraph form. The combination of the wrapper ID and paragraph ID may be viewed as an API endpoint for each paragraph. Alternatively, the paragraph ID alone may be viewed as an API endpoint. A splice function provided by the IDEP platform API or contained in the identified wrapper may be used to access the identified paragraph from the identified wrapper.

Further in GUI 1710, an API wrapper/script or splice function titled "Hide Paragraphs & Share document" is displayed. The splice function's input parameter fields are listed on the GUI's left side, where each document part or sub-part is represented by a label and arranged in a tree-shaped hierarchy similar to a CAD model with components and subcomponents. A creator of the document splice has the option to choose which part(s) to hide or conceal from viewing by users with whom the document splice is shared, and the result of this action is visualized on the right side of the GUI, with selected paragraphs "hidden" or blurred from view. In this particular example, "hidden text" appears as crossed-out. Conversely, users of the document splice can propose changes or suggest modifications only to the parts or sections they have access to. Alternatively, in some embodiments, the selected paragraphs may be redacted in black or white; in some embodiments, the redaction may be indicated by an in-line symbol. In some embodiments, an additional editor window may be used, and non-hidden paragraphs may be displayed to and edited directed by a user. In some embodiments, the redacted paragraphs may not be shown in the document view. For example, the recipient may only see document data that they are authorized to view, with no additional context for other document data they are not authorized to view.

While FIG. 17 illustrates how a document splice may be generated by decomposing an input document, it would be understood that a document splice may be created constructively as well, where document subunits (e.g., sections, paragraphs) are created individually, for example, using generative AI, or by modifying excerpts from template documents. An exemplary process for document subunit and document splice generation, and subsequent concatenation for document splice generation is discussed next in the context of FIG. 18, while an illustrative use case of this exemplary process is shown in FIG. 19.

New Document Generation Based on Digital Model-to-Document Linking

Figure 18:
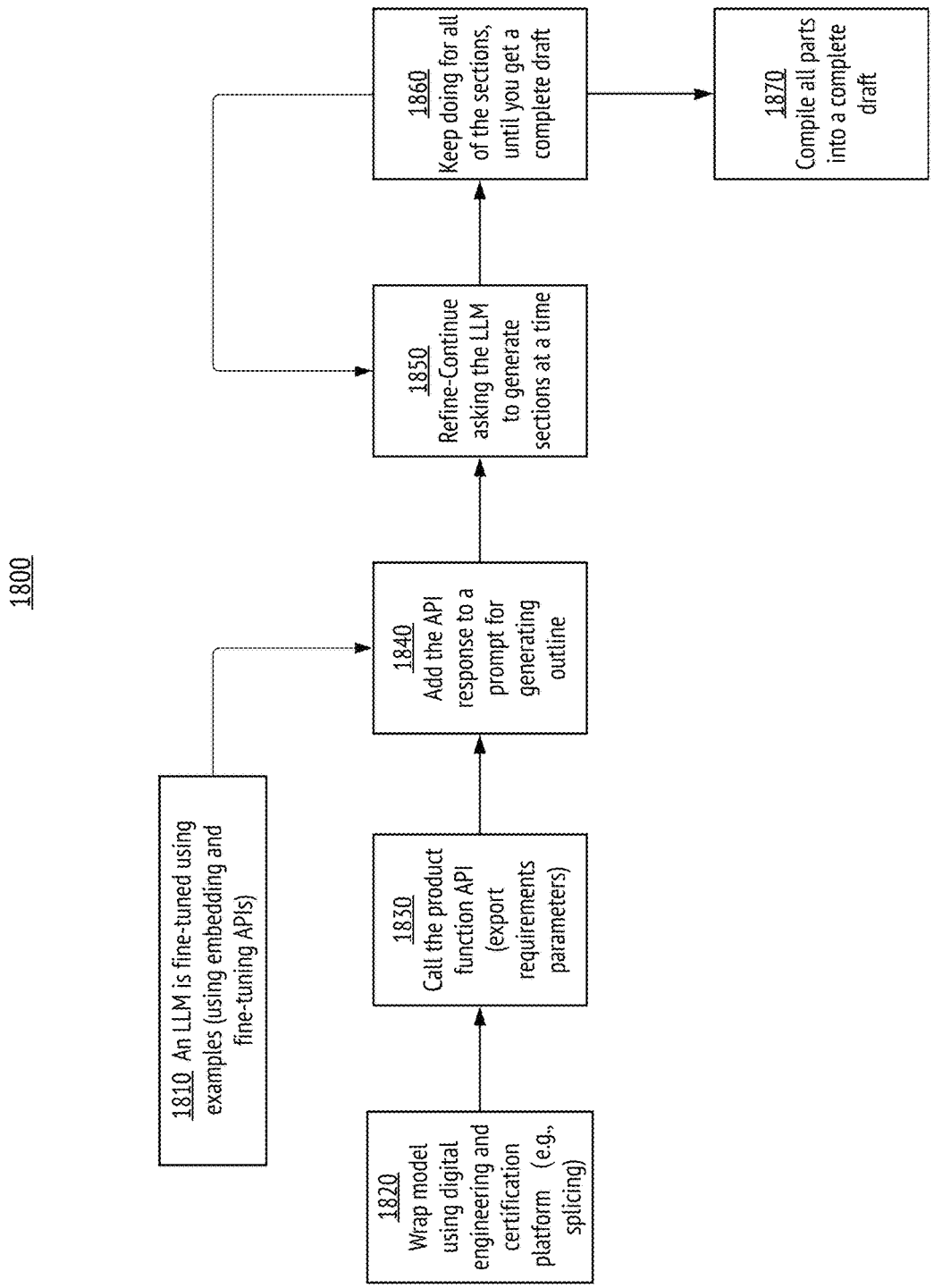
FIG. 18 shows an illustrative flowchart for AI-assisted document generation via model-to-document linking within the IDMP, in accordance with some embodiments of the present invention.

FIG. 18 shows an illustrative flowchart 1800 for AI-assisted document generation via model-to-document linking within the IDMP, in accordance with some embodiments of the present invention. In this illustrative process, a human-readable document (e.g., a certification report written in a natural language) may be generated from one or more machine-readable digital models via model-to-document linking, with the assistance of a natural-language-processing AI module. For example, a Computer Aided Design (CAD) file of an aircraft design may be verified against a regulatory standard with requirements on different aspects of the design. This allows a human to easily understand whether and why the design is compliant without needing to interpret the CAD file directly, a significant advantage over the typical scenario where SMEs manually generate or type up documents from model files. Once the new document is created, it may be updated automatically and dynamically based on revisions to the linked DE model.

Specifically, one or more of the following process steps may be carried out to generate a DE document using AI-assistance:

Large Language Model (LLM) Training/Fine-Tuning (1810): an AI model such as a Systems Reference Documents (SRD) LLM (or LLM-SRD) may be trained based on few-shot learning of a generic LLM such as GPT4, LLama2, and/or MISTRAL, and fine-tuned on examples of Systems Reference Documents (SRDs). The following is an exemplary process for training and fine-tuning a LLaMa model (LLaMa-SRD) for document generation from Systems Reference Documents (SRDs).

1. Model and Tokenizer Initialization:

In this exemplary implementation, the LLaMa model and tokenizer are initialized using the HUGGING FACE transformers library, which is an important step for both text generation and embedding extraction:

```
from transformers import LlamaForCausalLM, LlamaTokenizer
import torch
BASE_MODEL = "decapoda-research/llama-7b-hf"
model = LlamaForCausalLM.from_pretrained(
    BASE_MODEL,
    load_in_8bit=True,
    torch_dtype=torch.float16,
    device_map="auto",
)
tokenizer = LlamaTokenizer.from_pretrained(BASE_MODEL)
tokenizer.pad_token_id = 0 # Set to unk. Different from the eos token
tokenizer.padding_side = "left"
```

2. Embedding Generation:

For embedding generation, the document is prepared using the hidden states of the LLaMa model. This process converts the text into a suitable format and extracts meaningful numerical representations:

```
document = "The system shall have a user-friendly interface that allows ..."
# Tokenize the document
inputs = tokenizer(document, return_tensors="pt", truncation=True, max_length=512)
# Disable gradient calculations
with torch.no_grad( ):
    # Get model outputs, including hidden states
    outputs = model(**inputs, output_hidden_states=True)
    hidden_states = outputs.hidden_states
# Select a specific layer for embeddings (e.g., the last layer)
embeddings = hidden_states[-1].mean(dim=1)
print(embeddings)
```

3. Fine-Tuning the LLaMa Model:

In this example implementation, for fine-tuning, the model is adapted to better align with SRD language and structure. This is an iterative process that involves adjusting the model's parameters based on a set of training examples:

Simplified illustrative fine-tuning code
Assume a fine-tuning function exists for illustration purposes fine_tune_llama(model, training_data)

Here fine_tune_llama may represent a custom function tailored for LLaMa's architecture. The function could adjust the model's weights based on training examples that mirror the style and content of SRDs.

Model Splicing (1820, 1830): an input DE model (e.g., SysML model) is spliced, and resulting API endpoints may be accessed via product function API calls (e.g., export requirement parameters in the SysML model). The following are an exemplary JSON file and an exemplary API call:

Example JSON File:

{"name": "Small Unmanned Drone", "requirements":
{
"functional": [{"id": "F1", "text": "The drone must be able to fly autonomously."}, {"id": "F2", "text": "The drone must be able to communicate with a remote control or ground station."}, {"id": "F3", "text": "The drone must be able to take high resolution photographs and videos."}, {"id": "F4", "text": "The drone must be able to detect and avoid obstacles during flight."}, {"id": "F5", "text": "The drone must be able to return to its takeoff point in case of emergency or loss of communication."}],
"non-functional": [{"id": "NF1", "text": "The drone must have a flight time of at least 30 minutes."}, {"id": "NF2", "text": "The drone must have a maximum takeoff weight of less than 2 kg."}, {"id":

"NF3", "text": "The drone must be able to operate in temperatures between −10° C. and 40° C."}, {"id": "NF4", "text": "The drone must be able to withstand winds of up to 15 m/s."}]}}

Example API Call:

GET https://api.istari.ai/export/uas-requirements Headers: Content-Type: application/json Authorization: Bearer YOUR_API_TOKEN Body: {"sysml_file": "Cameo_SYSML.xml", "requirements": ["flight stability", "communication range", "battery life"], "export_format": "json"}

Outline Generation via LLM (1840): the API response may be added to a prompt for generating an outline of a System Requirements Document. In the example shown below, functional and non-functional requirements are separated into different sections by the LLM. The following are an exemplary LLM prompt and an exemplary response:

Example LLM Prompt:

draft the outline of a System Requirements Document, using the following information about the requirements for a small unmanned drone: {"name": "Small Unmanned Drone", "requirements": {"functional": [{"id": "F1", "text": "The drone must be able to fly autonomously."}, {"id": "F2", "text": "The drone must be able to communicate with a remote control or ground station."}, {"id": "F3", "text": "The drone must be able to take high resolution photographs and videos."}, {"id": "F4", "text": "The drone must be able to detect and avoid obstacles during flight."}, {"id": "F5", "text": "The drone must be able to return to its takeoff point in case of emergency or loss of communication."}], "non-functional": [{"id": "NF1", "text": "The drone must have a flight time of at least 30 minutes."}, {"id": "NF2", "text": "The drone must have a maximum takeoff weight of less than 2 kg."}, {"id": "NF3", "text": "The drone must be able to operate in temperatures between −10° C. and 40° C."}, {"id": "NF4", "text": "The drone must be able to withstand winds of up to 15 m/s."}]}}

Example LLM Response:

Introduction Purpose of the document Overview of the Small Unmanned Drone project Functional Requirements F1: The drone must be able to fly autonomously F2: The drone must be able to communicate with a remote control or ground station F3: The drone must be able to take high resolution photographs and videos F4: The drone must be able to detect and avoid obstacles during flight F5: The drone must be able to return to its takeoff point in case of emergency or loss of communication Non-Functional Requirements NF1: The drone must have a flight time of at least 30 minutes NF2: The drone must have a maximum takeoff weight of less than 2 kg NF3: The drone must be able to operate in temperatures between −10° C. and 40° C. NF4: The drone must be able to withstand winds of up to 15 m/s Assumptions and Constraints Any assumptions and constraints related to the requirements Appendices Any additional information or documentation related to the requirements (e.g. technical specifications, diagrams, etc.)

Document Part Generation via LLM (1850, 1860): the LLM-SRC fine-tuned in 1810 may be prompted on a per-document-part basis, one section of the outline at a time, until all parts of the document have been drafted. A motivation behind this progressive approach is that LLMs typically have token limits on their input sequences, and prompt generation needs to take this limitation into account, but aggregating only subsets of digital model data that are relevant to a single document part. The following is an exemplary pair of LLM prompt and response:

Example LLM Prompt:

Write 300 words for the first part of section 2.

Example LLM Response:

Functional Requirements Section 2:

Functional Requirements

The Small Unmanned Drone must meet a set of functional requirements in order to successfully perform its intended purpose. The following is a detailed description of each functional requirement.

F1: The drone must be able to fly autonomously. This requirement is crucial for the drone to be able to perform its intended tasks without the need for constant human supervision. The drone must be able to navigate, maintain altitude, and make decisions based on pre-programmed instructions or real-time data. This functionality allows the drone to perform tasks such as surveying, monitoring, and mapping.

F2: The drone must be able to communicate with a remote control or ground station. This requirement is necessary for the drone to receive commands, upload data, and transmit status updates. The communication must be reliable, secure, and have a wide range to ensure that the drone can operate at a safe distance from the ground station. This functionality allows the operator to control the drone's movements, change its mission, and receive real-time data from the drone.

F3: The drone must be able to take high-resolution photographs and videos. This requirement is necessary for the drone to capture valuable data and images for various applications such as reconnaissance, surveying, and monitoring. The camera must be able to capture images and videos in different lighting conditions and have a high resolution to ensure that the data is accurate and detailed.

F4: The drone must be able to detect and avoid obstacles during flight. This requirement is necessary for the drone to operate safely and avoid collisions. The drone must be able to detect obstacles using sensors such as cameras, LIDAR, or Ultrasonic sensors and then make decisions to avoid them. This functionality ensures that the drone can fly in complex environments and perform its tasks without interruption.

F5: The drone must be able to return to its takeoff point in case of emergency or loss of communication. This requirement is necessary for the drone to ensure the safety of its operation. The drone must have a built-in fail-safe mechanism that enables it to return to its takeoff point or a predetermined location in case of an emergency or loss of communication. This functionality ensures that the drone can be recovered even in the event of a failure.

Additional Example LLM Prompts:

PROMPT: Write 300 words for the second part of section 2.

PROMPT: Write 300 words for the third part of section 2.

PROMPT: Write 300 words for the first part of section 3.

Document Compilation (1870): all parts are compiled or combined into a complete draft.

Exemplary Use Case for Document Generation

Figure 19:
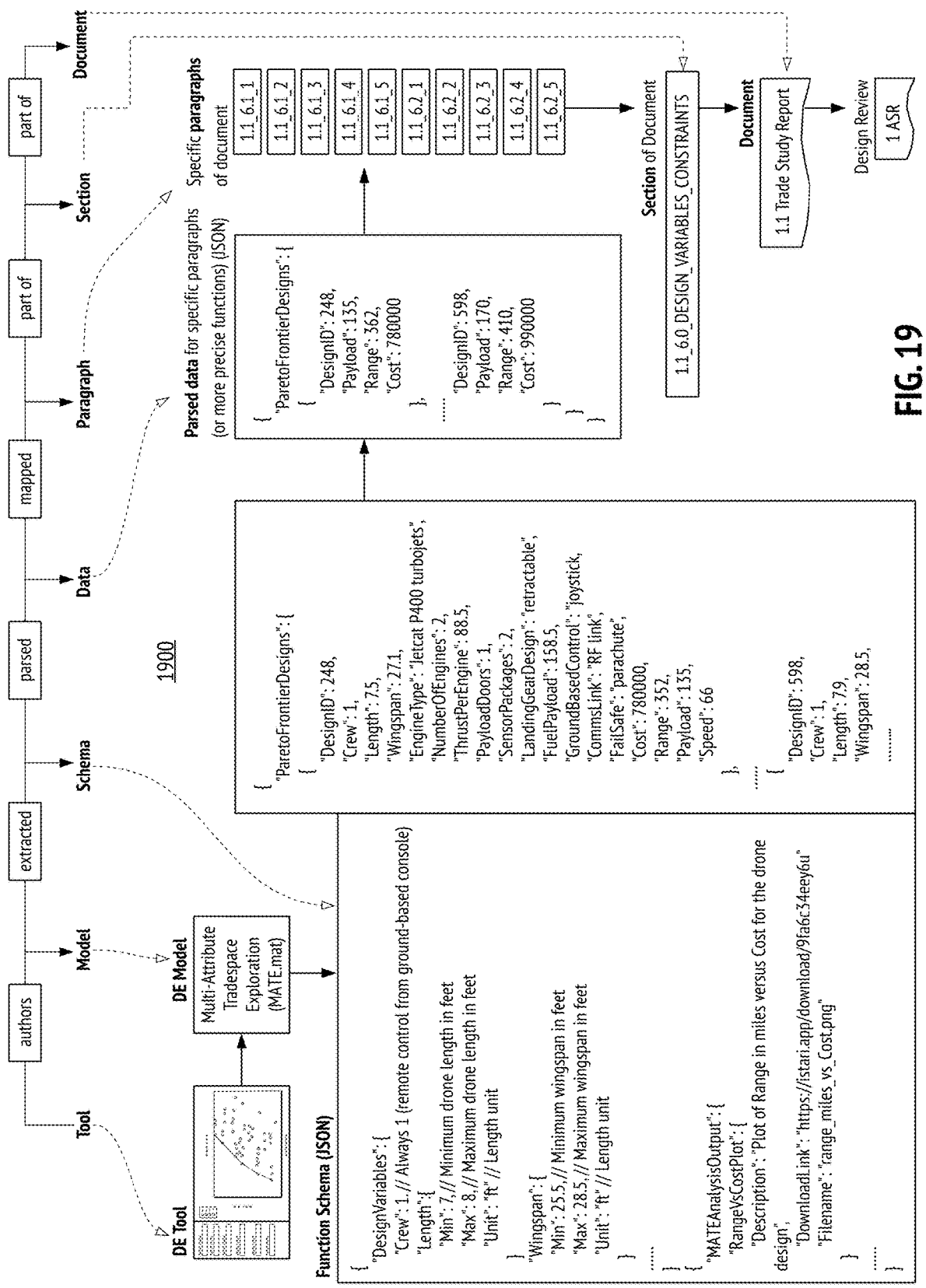
FIG. 19 is an illustrative schematic for document generation in an Alternative Systems Review (ASR), in accordance with example embodiments of the present invention.

As an illustrative implementation of the exemplary document generation process, FIG. 19 is an illustrative schematic

1900 for document generation in an Alternative Systems Review (ASR), in accordance with example embodiments of the present invention. Recall the IDMP is designed to facilitate user interfaces that aid in decision-making based on dynamic data updates. This platform is particularly useful in contexts where users are tasked with making decisions based on rapidly changing data, for example, in multidisciplinary technical reviews.

In particular, the top portion of FIG. 19 illustrates an overall process beginning with various digital tools and digital model-type files. Each file may have its own related schema and contain data specific to a process under review. These files are then evaluated and properly connected to the specific paragraphs, sections, and documents that are requisite for technical review. That is, digital tools are used to author digital models, which may be spliced to extract input and output schemas. Digital artifacts derived from the digital models according to the schemas may be mapped to paragraphs that make up sections of a review document.

The bottom portion of FIG. 19 zooms into the top portion, showing exemplary data generated in each step of the document generation process. The ASR produces a draft performance specification for the preferred material solution, and typically takes place during a Materiel Solution Analysis phase of the digital engineering (DE) lifecycle. The ASR aims to evaluate the technical maturity, feasibility, and risk of the preferred material solution, ensuring it meets the operational capability requirements outlined in an Initial Capabilities Document (ICD).

In FIG. 19, a digital tool is used to generate a digital model file, for example, a multi-attribute tradespace exploration (MATE) file (MATE.mat) that evaluates and compares different options or alternatives based on multiple attributes or criteria to identify the best possible solution that balances various factors or objectives. Model splicing the digital model file provides specific model data in a standardized function schema, from which digital artifacts may be derived, for use in specific paragraph(s) or in more precise functions in a trade study report. Such digital artifacts are then linked to a trade study report document splice to either parameter substitute in specific paragraphs of the document, or to generate such paragraphs or parts of paragraphs with AI-assistance, for example, using a generative LLM. This can be done for more than direct variable/parameter substitution, but can also be done for more qualitative aspects. For example, while sections and paragraphs of a document may inherently form a hierarchical structure within a document splice, certain paragraphs may be grouped together based on specific contexts and/or their dependencies on the same or related digital models, such that paragraph updates in response to model data changes may occur for paragraphs within a group, in parallel, sequentially, or in any appropriate combination thereof.

Paragraphs are in turn combined into sections of the trade study report document, to be used in the ASR review. In this specific example, the final MATE report document comprises multiple sections, with section 6 being "Design Variables & Constraints", subsection 6.1 being "Design Variables", and subsection 6.2 being "Constraints." Note even well-written individual paragraphs may not necessarily form coherent sections or documents when combined. It is also inefficient to make API calls to the digital model for each single paragraph, when the same data has already been retrieved for other paragraphs. Therefore, when a digital model undergoes changes, all associated elements within the same document, such as titles, subtitles, paragraphs, sections, and subsections, may be updated to reflect those changes. An iterative approach can be employed to update from the bottom-up, starting with a specific target paragraph, then its related sections, and finally the entire document. In the subsequent iteration, updates to paragraphs, sections, and the whole document may be carried out in sequence. For a generated document to be easily comprehensible, at least two iterations may be necessary.

Exemplary Document Viewing Options: Dashboards

Once a digital document (e.g., a digital certification review document) is generated, a notification message may be presented to a user. For example, the system may dispatch a notification to every authorized user involved in the review process. These notifications can be delivered via diverse channels, including email and messaging services specific to the IDMP. This ensures prompt dissemination of information about new content that is ready for review, enabling the users to stay updated with the latest changes in the documents.

The IDMP may also offer various document viewing options to cater to a range of users. Users can access the documents in formats such as PDFs or HTMLs, both of which may come with live links that facilitate instant access to referenced materials. Another format offered by the IDMP may be a dynamic web page that updates in real time, providing the users with the latest information as soon as it becomes available. In some implementations, a conversational or a spatial computing interface may be used that offers immersive and interactive data visualization, enhancing the user's understanding of the document content.

As a first example, FIG. 20 shows an illustrative dashboard-summary view of multiple documents involved in an ASR, in accordance with example embodiments of the present invention, including an Interface Control Document (ICD) Filled document, Concept of Operations (CONOPS) document, and trade study report. FIG. 21 shows an expanded view corresponding to FIG. 20, in accordance with example embodiments of the present invention.

Such summary or expanded views may be generated by the IDMP and presented to the user via a web portal. Under each document container, individual panels such as 2010 and 2030 in FIG. 20 may be provided for accessing individual parts or subunits of the document, including but not limited to, title, contents, sections, subsections, appendices, signature lines, paragraphs, graphs, tables, and the like. Metadata such as summary of changes generated from the review process (e.g., changes made by other reviews so far) may be provided for listing in a similar fashion.

The summary view or the digital document dashboard as shown in FIG. 20 provides a quick overview of the document(s) within a digital thread for digital certification. In addition to document summaries, a collection of tabs or links such as 2020 may be provided to trace back to associated digital data entities or resources, including but not limited to, input digital models, function schema, digital artifacts, parsed data, specific parsed paragraphs, sections of documents, and the document itself. In some embodiments, links may be provided to the overall digital thread, as well as a roster of approval choices 2040 available to an authorized user.

By comparison, the Expanded View in FIG. 21 presents a detailed section-level breakdown of the digital certification. It provides links for tracing back to associated digital resources and incorporates approval choices for an authorized user at a section-level, in addition to the summary-level options.

In some embodiments, the dashboard view in FIG. 20 or 21 is a project-dependent design that remains consistent for all stakeholders. For example, for a specific engineering review type for a review 2005 (e.g., PDR, ASR, CDR, V&V), every constituting document may be listed, with placeholder text when appropriate, and presented in the same layout to all users, stakeholders, or reviewers. However, different users may have varying authorization levels to view different documents or parts of documents. As a result, selective panels, windows, or tabs within the dashboard-view may be hidden or blurred. This allows the user access to a strict subset of parts of a document, based on his or her selective access rights. For instance, the user in FIG. 20 is authorized to view the summary of changes 2010 in the ICD Filled document, but not the document 2030 itself (e.g., "confidential").

In some other embodiments, the dashboard-view in FIG. 20 or 21 may be individualized, personalized, or customized for different users. For example, the system may verify the user's authorization level, and the dashboard may include just the documents and/or document parts that the user has access rights to in a specific review project.

Similarly, the system may check the user's attributes or profile to determine the user's role within a particular review project, or the user's upcoming review deadlines across multiple documents or multiple projects, and present to the user just the documents and/or document parts (from the same review project or from different review projects) that require the user's immediate attention.

When a review is conducted by multiple reviewers in a pre-set sequential order, the dashboard-view that every reviewer sees may vary depending on the review round, or depending on what changes or comments had been added by previous reviewers.

In some embodiments, a reviewer may designate the next reviewer for the subsequent round of review. Changes by the reviewer may be received via the user interface and added to the document splice, which is sent to the next reviewer. The new reviewer may see specific comments or highlights addressed to them that require their immediate attention.

In yet some embodiments, the dashboard view may be customized based on a user profile or user preference settings. For example, some users may choose to see comments or change summaries first in a dominant part of the dashboard, while others may prefer to see approval statistics first. Some may choose to see comments in a top-down fashion, starting from comments on the whole review project, then individual documents, document parts, models, etc.; some may choose to see comments in a bottom-up fashion, starting from individual models, then document parts, documents, and the whole review-project.

In some embodiments, a reviewer may comment, edit, or approve a document shown through the dashboard view. For example, the reviewer may check box 2040 upon approving the document. The reviewer may double click on panel 2010 and edit the summary of changes, or choose to add a comment on the summary of changes. As a document subunit, the summary of changes may be updated with such edits, with metadata recorded on who made the edits and when, and comments may be saved separately but linked from the document subunit using a unique identifier for each comment.

Exemplary Document Viewing Options: Document Editing

FIG. 22 shows a screenshot of an exemplary graphical user interface (GUI) 2200 for viewing and interacting with a generated document, in accordance with some embodiments of the present invention. In this screenshot, the user has navigated into the ICD Filled Document in FIG. 21. The complete document is presented in a scrollable format, accompanied by a hyperlinked table of contents menu positioned on the left side.

GUI 2200 includes a browser window header 2202 which includes a document link for easy navigation. Below the header, a domain and security level banner 2204 displays the domain, platform software version, and security level, ensuring that users are aware of the domain they are operating in and the security protocols in place. A security level indicator 2206 displays the user's maximum security access level within the platform (e.g., "Level 1").

The interface also includes a search bar 2212, allowing the user to carry out comprehensive cross-platform searches through the IDMP for digital models, files, and documents, thus facilitating efficient retrieval of information across the platform. Next to the search bar, a user and domain field 2210 provides information on the user's domain (e.g., client name). User and domain field 2210 may allow the user to login and to access user profile and subscription information.

A top menu of GUI 2200 offers additional functionalities. For example, a document name field 2220 displays the document's name, and may include its version. A document security level indicator 2222 displays a security level (e.g., "Level 1") of document 2220. In one embodiment, using an expandable security level menu adjacent to document security level indicator 2222, the user may select the document's target security access level "view", thus filtering only the parts of the document accessible through a given security level. In other embodiments, the user may also use document security level indicator 2222 to down-select the security level while sharing the document, thus sharing portions of the document that correspond to the specified security level. Only security access levels below the user's security level (e.g., "Level 1" in FIG. 22) would be available for the user to view and share. Furthermore, user interface buttons 2224 include options to request access to all models related to this document, or email review information to a stakeholder.

Granular dynamic information security ("infosec") tags (e.g., 2206 and 2222, and the like) are an important but optional element of a digital documentation system and its associated GUI. Model splicing and the IDMP system enable such granular dynamic infosec tags. In some embodiments, the IDMP may use metadata of digital models or documents to cross-reference against authorizations, licenses, or regulations to update. In some embodiments, such granular dynamic infosec tags (e.g., 2206 and 2222) are dynamic, and are refreshed ahead of any document updates to confirm the right authenticated user has the right authorized access to the digital artifacts and data to perform or view the updates. In other words, user authorization for selective access may be implemented by cross comparing infosec levels of digital entities and infosec levels of the user.

For document organization and navigation, GUI 2200 features a document outline viewer 2230 on the left of FIG. 22, providing hyperlinked access to the document's headers and paragraphs and/or sections. Such document parts or subunits are obtained via document splice generation. Within outline viewer 2230 and under a selected document part (e.g., section 1.1 Purpose), an expanded mini viewer 2232 shows additional metadata on this document part, including but not limited to, documentation part locator (e.g., file name "Heading_1_Purpose.xml:), linked DE model(s) (e.g., "Derived from 1.4-InterfaceControl . . . "), a source IT domain (e.g., "defense.airplane.istari.app"), and the last update timestamp (e.g., "Last Update Jan. 28, 2024, 9:45 AM"), some tagged with an appropriate security level (e.g., "L1"). In some examples, if sections of a document contain content requiring a higher security level for viewing, the user may be presented with an option to request access. Were the user to request such access, an authorized user with access at a higher security level may be notified for their review. In other examples, if sections of a document contain content requiring a higher security level for viewing, such sections may not be shown for display, nor provide the user with any prompt for requesting access.

At the center of FIG. 22, a viewer panel 2240 displays the content of the ICD (e.g., a "clean" or "ready-to-print" version). Citation references or hyperlinks (e.g. superscript 2245, "[2]") are provided to reference individual data fields (e.g., 2246, "149.6 kg") with digital thread execution and transaction information or metadata (e.g., 2255, "Digital Thread Info List") shown in a digital thread metadata pane 2250 on the right of GUI 2200. As indicated by item 2252 in digital thread metadata pane 2250, a digital thread "Link" is utilized to generate and/or update the live ICD document shown in viewer pane 2240, by linking a document model "requirements.mdzip" and a digital model Airplane.CAT-PART. Data field 2246 refers to the weight of a drone under a current design, and was last updated on Aug. 8, 2023 at 10:26 AM by executing the digital thread, with the weight value originating from part model Airplane.CATPART, owned by Orville Wright, with version ID s98jn9vbc9jns. Data field 2247 refers to a current cost of the drone, redacted from view. The user may request access via a request 2257 to link, access, or execute a relevant cost model.

As discussed in the context of FIG. 20 or 21, the view of the ICD document shown in FIG. 22 is enabled by digital model splicing, document model splicing, and model splice linking via digital thread script execution. The text shown in viewer panel 2240 is a snapshot view of the document's splice, which also provides the document outline and metadata shown in outline viewer 2230. Digital thread execution updates data fields in the live document or the document splice, to ensure that every document part is updated based on linked digital models with minimal manual intervention. Digital thread metadata as shown in metadata pane 2250 are added to the live document or the document splice to ensure the validity, legitimacy, or authenticity of the data values.

Although not shown explicitly in FIG. 22, in various embodiments, live document updates may be completed in real-time, within a maximum delay threshold, or on-demand, in a push or a pull configuration. In a push configuration, a model splice may send any occurring relevant updates to trigger the digital thread script to update the linked document splice or live document immediately or within a specified maximum time delay. In a pull configuration, a model splice may flag recent modifications until the digital thread script queries relevant digital models (via the model splice) or other associated digital threads for flagged modification, periodically or upon user-request. The digital thread script may regularly check relevant digital models (via their model splices) or associated digital threads, for modified data fields, by comparing the data found in the live DE document with regularly extracted model and digital thread data. If a discrepancy is found, the digital thread script may use the modified data to update the live digital document.

Furthermore, A change highlighting function as provided by the IDMP is shown with the dotted box 2201. In this particular example, a paragraph within subsection 1.1 Purpose is highlighted. When clicked, a linked annotation or comment on the highlighted subsection may appear. This comment could be the result of a reviewer's feedback on the paragraph. If the reviewer has made direct edits to a document part, such edits may be applied to the document splice using API endpoints of the document part.

When a reviewer adds a comment, the comment may be saved into the document splice used to generate the human-readable document, allowing the next reviewer to see the comment directly upon loading the document splice. Moreover, annotation comments may be automatically generated when digital model(s) and/or digital thread(s) linked to data within this paragraph are altered. For instance, the comment could indicate when a related digital model was last modified and by whom, complete with a hyperlink to the digital model itself or an accessible model splice of the digital model.

To facilitate the identification of changes in documents, the IDMP may implement several change highlighting features. A color-coded highlights feature may use varied shades to pinpoint additions, modifications, or removals in the document. A side-by-side comparison feature may display the pre-edited and updated versions of the document side-by-side for convenient comparison. A track changes with annotations feature may log all changes made to the document and allow annotations or comments offering explanatory notes about the particular changes. In some embodiments, links to underlying digital models and digital threads may be provided in annotations or comments as well.

Furthermore, in some embodiments of the IDMP, selected highlighted changes may be provided for a sequential approval process. That is, each alteration may be targeted to individual reviewers, requiring approval from the relevant stakeholders in a set-order or set-sequence. Selected highlighted changes may be implemented with different colors, font formats and similar highlighting options. In a sequential approval process, only certain highlighted changes may be actionable to a specific user for that step in the review sequence. This approach ensures a comprehensive review process for every change, affirming the accuracy and pertinence of every modification, and is especially useful when changes affect multiple departments or job functions.

Figure 23:
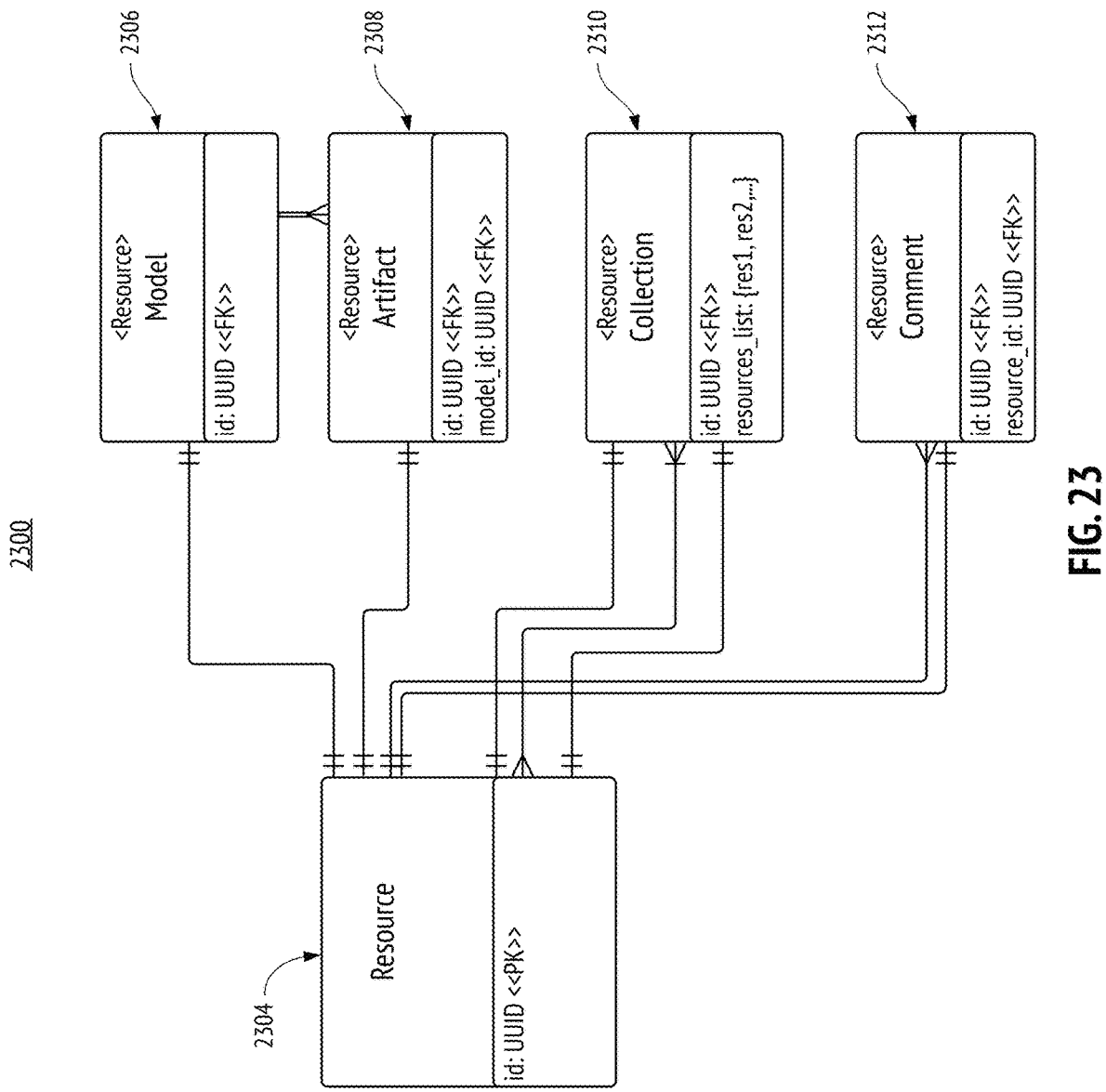
FIG. 23 illustrates an exemplary data architecture within the IDMP to support a robust commenting system, in accordance with some embodiments of the present invention.

Data Architecture in an Integrated Digital Model Platform (IDMP) to Support Commenting FIG. 23 illustrates an exemplary data architecture 2300 within the IDMP to support a robust commenting system, in accordance with some embodiments of the present invention. This illustrative architecture is centered around the concept of a Resource Primitive, a foundational entity or atomic element uniquely identified by a Universally Unique Identifier (UUID). This structure facilitates a systematic association and management of comments across various resources, such as files and folders, within the IDMP.

In the IDMP, a Resource Primitive can represent different types of entities, including a model, an artifact, a comment, or a collection of these entities.

1. Resource (2304): The core entity within the system, depicted as a generic node, is uniquely identified by a UUID, which serves as the primary key (e.g., UUID «PK») for each resource. Resources are categorized into various sub-classes, representing different types of entities within the IDMP. It is important to note that not every resource necessarily has a file associated with it; however, each resource can have associated metadata or a linked file within the data architecture of the IDMP.

2. Model (2306): A specific sub-class of resources, representing a digital model or a model-type file within the IDMP. Each model contains an id field, which functions as a foreign key (e.g., UUID «FK»), linking the model to related resources such as artifacts. This relationship is often visualized as a connection between the model and its associated artifacts.

3. Artifact (2308): A specific sub-class of resources, representing a data artifact that is extracted from a digital model within the IDMP. Each artifact has an id (e.g., UUID «FK») and is linked to a model through a model_id field, establishing its relationship with the corresponding model. That is, an artifact resource includes a reference to its source model resource. This linkage may be represented as a directed edge from the model to the artifact, indicating the derivation or association.

4. Collection (2310): A Collection is a sub-class of resources that can contain multiple other resources. Each collection has an id (e.g., UUID «FK»), and the resources it contains may be visualized as a list or set of their respective resource_ids. This representation illustrates the flexible organization where a resource may belong to multiple collections, facilitating complex data management and retrieval.

5. Comment (2312): Comments may be associated with any resource type, whether it be a model, artifact, or collection. Each comment may include an id field (e.g., UUID «FK») and a resource_id (e.g., UUID «FK»), connecting it to the specific resource it is linked to. A resource may have many comments, and a comment may be made on another comment as a reply. This design allows for comments to be systematically organized and referenced in relation to the resources they discuss.

In summary, in the IDMP, a model, an artifact, and a comment are all considered resources. An artifact, which is also a resource, includes a reference to its source model, establishing a link between the two. Resources can be organized within collections, with each collection capable of containing multiple resources, and any given resource can belong to multiple collections, allowing for flexible data management. Comments are treated as resources as well, and each comment is associated with a specific resource, whether it be a model, an artifact, or a collection. Importantly, every resource can have multiple comments, facilitating detailed discussions and feedback. Additionally, a comment on a comment may be recognized as a reply, enabling threaded conversations within the platform.

In many implementations, the data architecture supports back-referencing, so that a resource, such as an artifact resource, is linked to the digital model it is derived from. Consequently, a digital model can maintain a collection of artifact resources that are extracted from it, allowing for easy traceability and organization of related resources.

Figure 28:
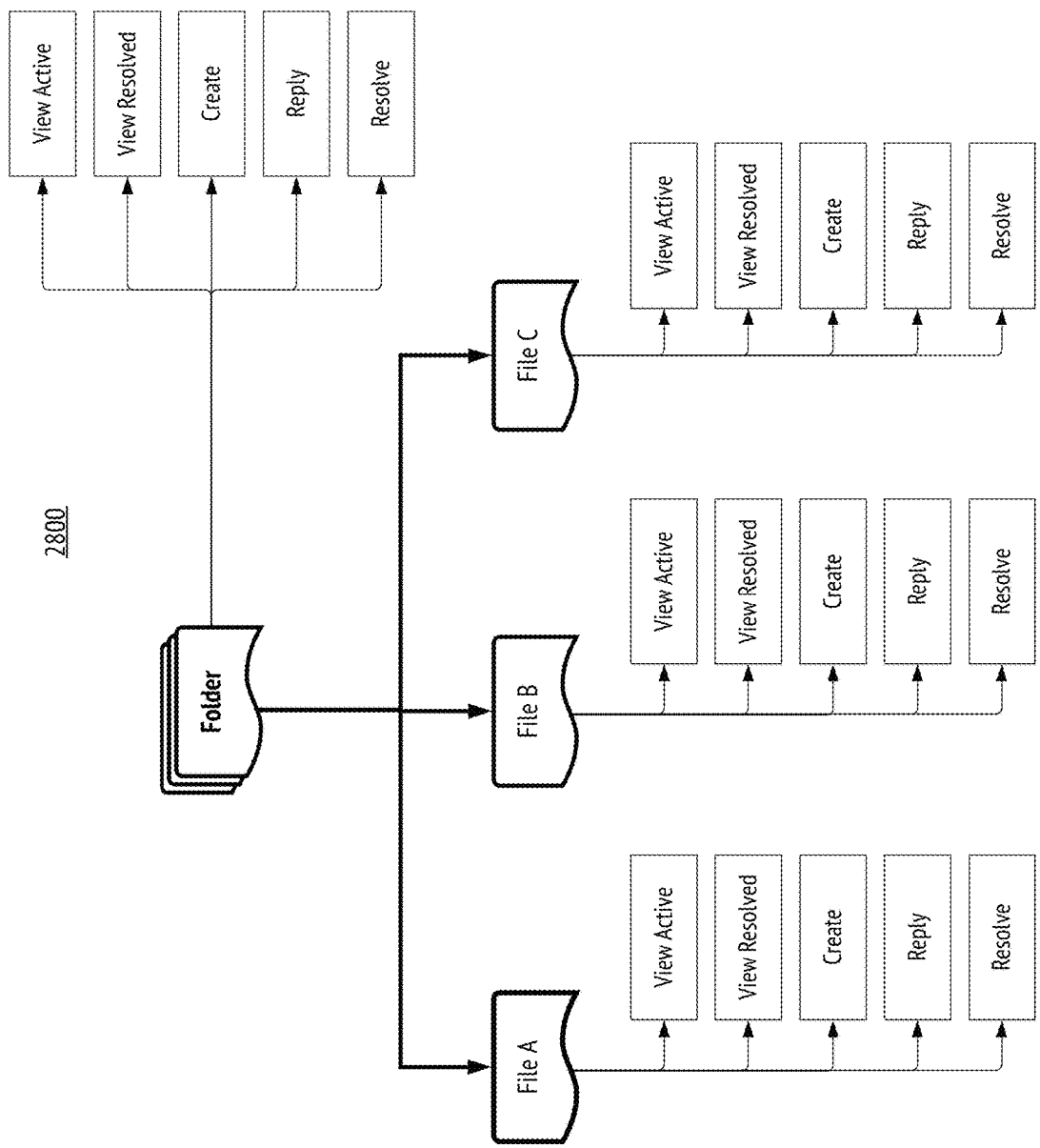
FIG. 28 shows an illustrative commenting architecture within the IDMP, in accordance with some embodiments of the present invention.

In some implementations, a folder is conceptualized as a collection of resources. As depicted in FIG. 28 later, the commenting approach described next for files and folders may be implemented through this data architecture of resources and the comments associated with them. In exemplary embodiments of FIG. 28, a file can be implemented for any resource or its sub-class shown in FIG. 23 and a folder in FIG. 28 can be implemented as a collection of files of the respective resources as shown in FIG. 23. With the resource primitive concept, every resource in the IDMP can have a file and a folder; a folder is a collection of resources, and is itself another resource.

This Resource Primitive-based data architecture within the IDMP enables uniform resource management, comment association, and collection management to effectively handle commenting and collaboration among users. Uniform resource management ensures that all digital entities, whether they are models, artifacts, comments, or collections, are treated as IDMP resources with a consistent structure, identified by a UUID. This uniformity simplifies the process of associating comments with any resource, ensuring that the same methods and data structures can be applied regardless of the resource type. Comment association is handled by linking each comment to the specific resource it pertains to through the resource_id field, allowing users to provide feedback or start discussions directly on any resource. The hierarchical nature of comments supports nested replies, enabling threaded discussions that are easy to follow and organize. Collection management allows for the grouping of resources into collections (or folders), where each collection can contain multiple resources. A document splice may also be viewed as a collection of document artifacts in the form of document subunits. This facilitates organized collaboration by allowing users to manage related resources together, with the ability to comment on individual items within the collection or on the collection as a whole. The combination of these features in the IDMP creates a cohesive and flexible system for managing collaboration and feedback, ensuring that discussions are logically structured and accessible across different types of resources.

Hierarchical Architecture of Digital Resources

With the resource primitive design, the IDMP further enables a hierarchical architecture of digital entities/resources that may be commented on. Specifically, in a tiered structure, generic and in-context comments may be implemented for digital data entities such as folders, digital model type files, model wrappers/splices, wrapper functions, parameters, input/output schemas, or any other individual data components or data entities that are individually accessible within a digital workflow in the IDMP. In an illustrative example, general comments may refer to high-level comments on entire directories, digital models, or wrappers, while "in-context" comments may refer to specific comments directed towards data components such as parts, functions, parameters, and the like, each having an associated position or location within a file. For example, a CAD model or a collection of CAD models within a folder may be visualized through a viewer interface, and comments may be added "in-context" to particular parts of the visualization, including but not limited to, points, vertices, lines, boundaries, edges, surfaces, planes, geometric models, perspective views, material preferences, dimensions or measurements, and the like. Similarly, in-context comments may be added to specific pages, chapters, sections, and paragraphs in a requirements document.

In the present disclosure, a "folder" or "directory" broadly refers to a group or a collection of files, often related and corresponding to a specific project or task within a digital workflow. That is, a folder is an organizational structure for files. A "file" represents an individual data entity within a folder, such as a digital model, human-readable document, a digital model splice, and the like. Each file or folder within the system can be associated with multiple comments, facilitating a multi-faceted discussion and feedback process. In the exemplary embodiments of FIG. 28, a file may be implemented for any resource or its sub-class shown in FIG. 23 and a folder in FIG. 28 may be implemented as a collection of files of the respective resources as shown in FIG. 23.

A digital workflow, on the other hand, is a set of steps implemented in sequence during a digital process. That is, a digital workflow may refer to any, or all parts of the systematic digital process of using digital tools on digital models to conceptualize, design, simulate, analyze, prototype, test, manufacture, optimize, verify, and/or document products or complex systems. A digital workflow reflects actions performed by engineers to iterate on designs in a virtual environment before committing to physical prototypes, minimizing human-errors and data misalignments, and allowing for innovative and efficient product design, development, and certification. The concept of a digital workflow is closely related to that of a digital thread. A digital thread (DT) refers to the flow of digital information throughout a digital workflow. That is, a DT integrates data generated throughout a digital workflow, providing a unified and traceable view of the engineering lifecycle. Embodiments of the present invention provides commenting capabilities for data entities established throughout digital workflows, and for ensuing digital threads.

As discussed with reference to FIG. 7, a digital model splice for a given digital model file is generated by wrapping digital model data and selected API function scripts that are specific to the particular digital model type, thus allowing only access to and enabling modifications of limited portions of the original digital model file for controlled sharing and collaboration with authorized stakeholders. A model wrapper is a file-level data entity. Model wrappers may be listed under both folders and model files. Model wrappers comprise collections of splicer functions, and execution of such functions may produce digital model artifacts, or may enable model access functionalities such as digital model visualization through a viewer interface. While general comments may be added to folders, models, wrappers, and human-readable documents, in-context comments may be added through a viewer interface to data components within the digital models, model wrappers, and human-readable documents.

Commenting Examples on a Folder, a Digital Model File, and a Model Splice

Figure 24:
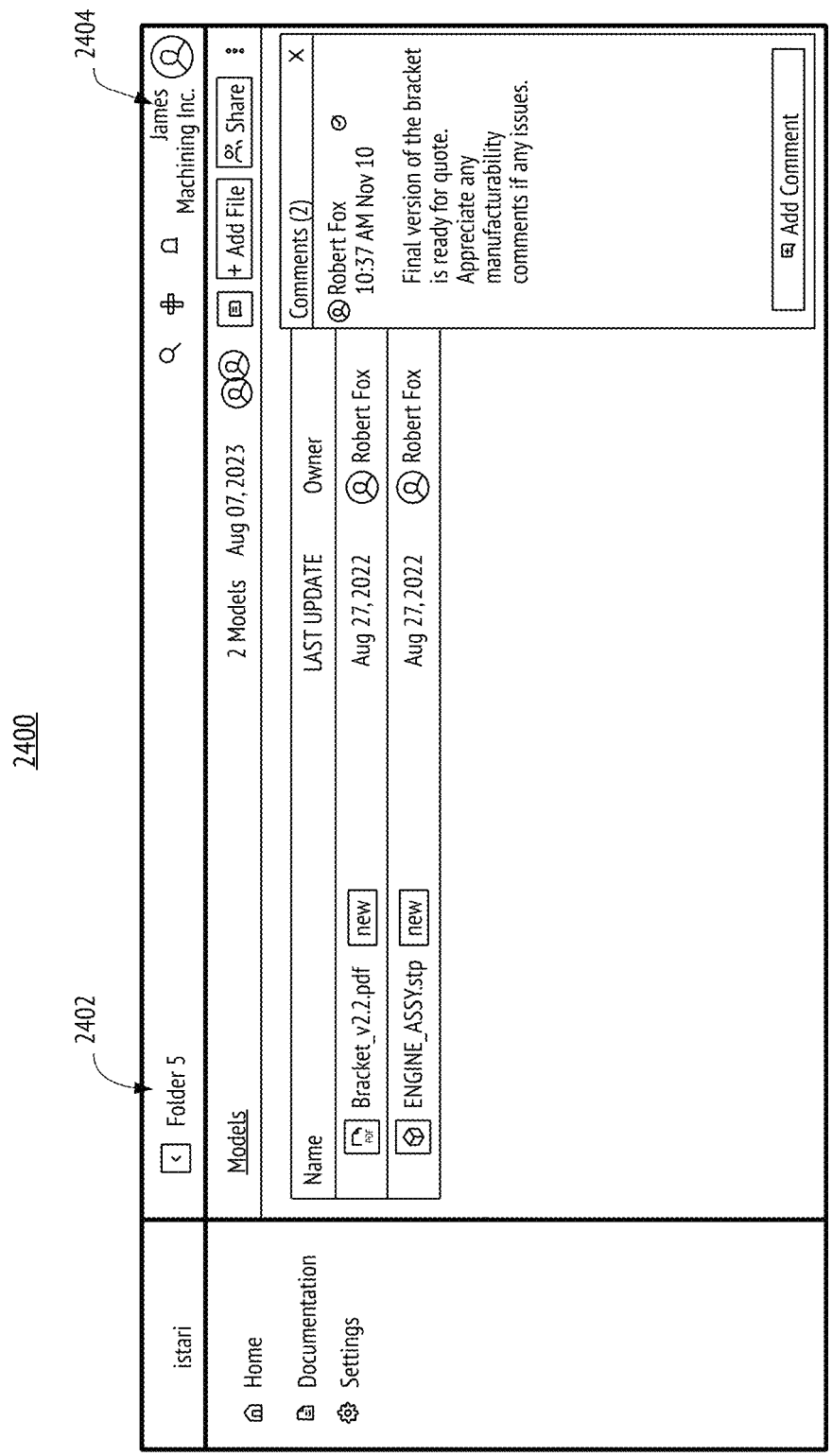
FIG. 24 shows a screen capture illustrating comments on a folder, in accordance with some embodiments of the present invention.

FIG. 24 shows a screen capture 2400 illustrating comments on a folder, in accordance with some embodiments of the present invention. In this illustrative example, the directory "Folder 5" 2402 is being viewed by a user James 2404 from Machining Inc. on the IDMP. Folder 5 contains two separate digital model files owned and shared by another user Robert Fox. The two digital model files are Bracket_v2.2.pdf and ENGINE_ASSY.stp. Robert Fox has commented on Folder 5, stating that "Final version of the bracket is ready for quote, Appreciate any manufacturability comments if any issues."

Figure 25:
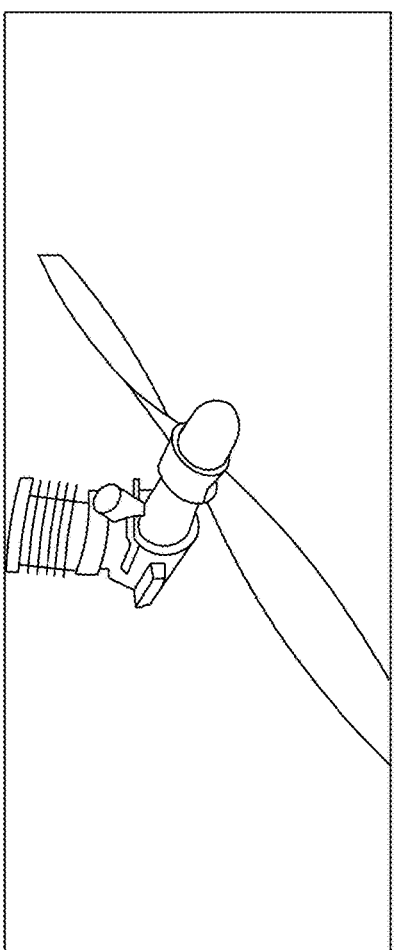
FIG. 25 shows a screen capture illustrating comments on a digital model file, in accordance with some embodiments of the present invention.

FIG. 25 shows a screen capture 2500 illustrating comments on a digital model file, in accordance with some embodiments of the present invention. In this illustrative example, a CAD data file "diesel-engine-v2.dxf" for a propeller engine is loaded into the IDMP and viewed by Robert Fox from Airplane Inc. He has commented on the file itself. Such a comment may be stored separately from the digital model file in a relational database, with one or more foreign keys linking to the digital model file and directories containing the digital model file.

Figure 26:
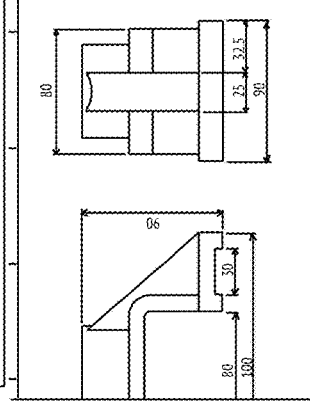
FIG. 26 shows a screen capture illustrating comments on a digital model splice, in accordance with some embodiments of the present invention.

FIG. 26 shows a screen capture 2600 illustrating comments on a digital model splice, in accordance with some embodiments of the present invention. In this illustrative example, the "Hide parts & Share 2D file" model splice/wrapper of the propeller engine (as discussed with reference to FIG. 25) is loaded. A 2D drawing of a component bracket is selected as output for visualization. User Robert Fox has commented on this component bracket in-context.

Figure 27:
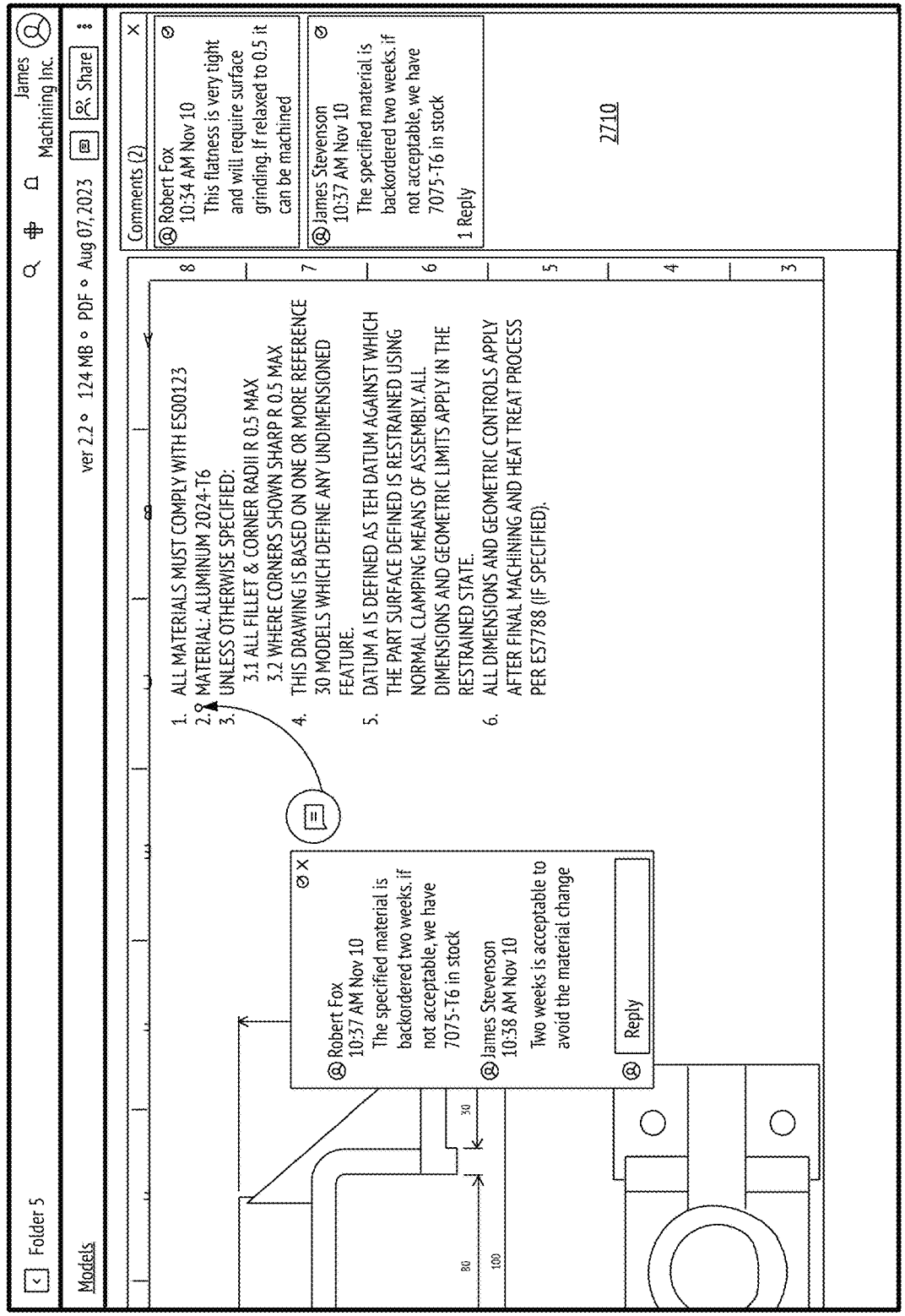
FIG. 27 shows exemplary file-level commenting options for digital model visualization, in accordance with some embodiments of the present invention.

Correspondingly, FIG. 27 shows a screen capture 2700 of exemplary file-level commenting options for digital model visualization, in accordance with some embodiments of the present invention. In this illustrative example, orthographic projections of a bracket are shown with measurements, comprising three 2D drawings showing the bracket being viewed along parallel lines that are perpendicular to the planes of the drawings. Again, comments may be added to any specific location regarding any data component within the drawing. Location information in drawings may be specified in relative coordinates of the drawing frame, so when a drawing is rescaled, the comment location is rescaled accordingly as well. Moreover, when a data component in a file is updated, associated comments may be automatically updated as well. For example, if parts of a model splice are hidden, so are the associated comments. These comments may still be in the database for the original model with all the part assembly.

In FIG. 27, a side panel 2710 shows two root comments. A first comment is by user Robert Fox on a flatness of the bottom surface of the bracket, stating that "This Flatness is very tight and will require surface grinding. If relaxed to 0.5 it can be machined." A second comment is by user James Stevenson on design notes for material to be used for manufacturing, stating that "the specific material is backordered two weeks. If not acceptable, we have 7075-T6 in stock." A floating comment panel is also shown when the corresponding comment icon is clicked, providing a full comment thread, where James Stevenson has responded to the suggestion made by Robert Fox to change the material to avoid manufacturing delay.

It is important to note that while comments shown in FIGS. 24, 25, 26, and 27 are written text-based, in various embodiments of the present invention, comments may take on multimodal formats. A user may choose to provide gestures, images, voice inputs, and/or video-recordings as new comments, or reply to existing comments with multimodal responses.

Exemplary Commenting Architecture

FIG. 28 shows an illustrative commenting architecture 2800 within the IDMP, according to some embodiments of the present invention. This illustrative architecture of the commenting and collaboration system is designed around two fundamental digital data entities: folders and files. As discussed with reference to FIG. 23, every folder may host multiple files, including digital model type files, human-readable documents, and model splices that allow for specific user actions via splice scripts. Comments may be stored independently in a relational database, as records that link to the files or folders they target or refer to. While not shown directly in FIG. 28, nesting of folders is also possible. In some embodiments, the digital data entity folder as shown in FIG. 28 may be set up within the IDMP, separate from actual file folders in the underlying computer file system. That is, files A, B, and C may be stored at different file directories (e.g., File A may be local on a user device, File B may be on a remote server, and File C may be stored in the cloud), but collectively identified as a collection, group or "folder" of files through the IDMP for commenting purposes. For example, a data entity table may be established in the relational database to track logical folders/collections and their constituting files/resources.

Exemplary Commenting Actions

In various embodiments of the present invention, customer use cases for commenting may be centered around enhancing collaboration and adding efficiency to their workflows. In this subsection, exemplary commenting actions are described for both folder-level and file-level collaboration. Recall that general commenting may be conducted at the folder level, while context-specific commenting may be conducted at the file level, where users select specific areas on a file to create comments.

For folder-level commenting options, the commenting system may facilitate real-time or asynchronous discussions among users, centered around folders for brainstorming and idea exchange. This commenting structure is reminiscent of a message board. For example, a design team can initiate a discussion around a project directory, where any member with appropriate access rights may contribute. This folder-level discussion space ensures that important conversations around a suite of files can happen in a centralized manner. This detailed commenting functionality enhances transparency and reduces the likelihood of important remarks and feedback getting lost in one-off conversations.

For collaboration at folder level, users may perform actions include, but not limited to:
  View Active Comments: when a user clicks a comment icon in a sub-header, active comments may appear in a dynamic comment window.
  View Resolved Comments: when a user clicks a comment icon in a sub-header, resolved comments may appear, each with a dedicated color or symbol (e.g., a green check-mark) to indicate it has been resolved.
  Create a Comment: when a user clicks "Add Comment", an interface (e.g., a text box, a pop-up voice or recording window) is provided for the user to input a new comment, with options to "Save" or "Cancel".
  Reply to a Comment: a user navigates to a comment or comment thread, provides a reply, and "Save" or "Cancel".
  Resolve a Comment: a user navigates to a comment or comment thread, and clicks a resolve icon.

When implementing the aforementioned commenting actions, query code may be executed to assess comment databases that persist comment data. For example, in a web application architecture, a user may request applicable actions via an API endpoint to create, read, update, or delete a comment. Depending on the applicable action requested by the user, a backend application may either create a new record in the database, return an existing record from the database, make changes to an existing record, or delete an existing record.

Similarly, file-level commenting options offer a more focused discussion platform for collaboration and feedback, and allow for targeted discussions on specific files within a folder. It provides a granular level of engagement, enabling users to zero-in on particular parts of a file for precise feedback and to pinpoint exact areas of interest. For instance, in a complex project, the marketing team might have a detailed discussion on a specific copy document within a broader campaign folder, focusing both on the document as a whole and its individual pages, chapters, sections, paragraphs, tables, graphs, or other similar data components within the file. In another example, a CAD model or a collection of CAD models within a folder may be visualized through a 3D viewer interface, and comments may be added at specific locations to particular parts of the visualization, including but not limited to, points, vertices, lines, boundaries, edges, surfaces, planes, geometric models, perspective views, material preferences, dimensions or measurements, and the like. Allowing users to comment on specific parts of the file makes file-level commenting invaluable for detailed, nuanced collaboration.

For collaboration at file level, users may perform actions include, but not limited to:
  View Active Comments: when a user clicks a comment icon in a sub-header, active comments may appear in a dynamic comment window. Alternatively, active threads may be presented in a vivid color, rather than being grayed out.
  View Resolved Comments: when a user clicks a comment icon in a sub-header, resolved comments may appear, each with a dedicated color or a symbol to indicate it has been resolved. For example, resolved threads may be presented as grayed out.
  Create a Comment: a user clicks to select an area of the file, and an interface is provided for the user to put in a new comment, with options to "Save" or "Cancel".
  Reply to a Comment: a user navigates to a comment thread and clicks on a comment bubble, provides a reply, and "Save" or "Cancel".
  Resolve a Comment: a user navigates to a comment thread and clicks on a comment bubble, then clicks a resolve icon or provides verbal instructions to resolve the comment.

An Exemplary Commenting Record

FIG. 29 shows an illustrative relationship diagram 2900 comprising a comment record and a reply record in a relational database, each having multiple data fields, in accordance with some embodiments of the present invention. In this particular example, the data architecture of the system is designed to maintain comments in a table in a standalone relational database. This setup promotes data independence and easy management, as comments are not directly embedded within the files or folders they refer to. In what follows, relational databases and tables are considered for storing and persisting comment data, for illustrative purposes only. In various embodiments of the present invention, comment records and reply records may be stored in other appropriate data structures and be referenced with pointers or keys, possibly tailored for the underlying data entity being commented on.

In the example shown in FIG. 29, comments are stored in a comment table in the database, each with its own Primary Key (PK) and references Foreign Keys (FK) from any possible parent data entities such as model/artifact, folder, file, or wrapper. A reply to a comment may be stored in a reply table in the database, which may use a universal unique identifier (uuid) of the parent comment as a FK to link the reply to the comment. A primary key is a unique identifier (ID) for a record in a database table. It can be viewed as a unique ID for each row in the table. A foreign key is a column or a set of columns that refers to or references the PK in another table. The table with the foreign key may be called the child table, and the table being referred to may be called the referenced or the parent table. For example, a parent data entity table may identify each data entity being commented on with respective PKs, and child comment tables and grandchild reply tables may link to their respective parents with FKs.

More specifically, an exemplary comment record from a comment table is shown on the left of FIG. 29, while an exemplary reply record from a reply table is shown on the right. This exemplary comment record is for illustrative purpose only and may comprise the following data fields. Other additional data fields may be included in comment records implemented in different embodiments of the present invention.

Primary Key (PK): a unique identifier for this record in the comment table (e.g., an 8-digit unique ID, rckq4n41)

Foreign Key (FK): column(s) in a child table referencing the primary key of a parent table, for example, to identify what user, folder, or file this comment is referencing.

FK1 (created_by_id): uuid linking to the user (e.g., a record in a user table) who created the comment (e.g., hZ7vQSqk)

FK2 (artifact_id): uuid linking to the file/model/artifact (e.g., a record in a data entity table) this comment ties to (e.g., yufgkxxD)

FK3 (folder_id): uuid linking to the folder this comment ties to (e.g., a Folder table PK, 6UzM34AG). Note that FK3 and FK2 in this example are not implemented together. For example, if the comment is on a folder, the folder may be referenced in FK3, while FK2 is set to NULL comment_type: a categorization of the comment (e.g., text-voice-video, folder-file-model-artifact, general-in-Context, etc.)

content: the actual content or text of the comment position_x, position_y, position_z: spatial coordinates for placing the comment in-context within a 3D model/document when visualized through a viewer.

page_num: the relevant page number, or the page number where the comment is found or related to updated_at: timestamp indicating when the comment was last updated created_at: timestamp indicating when the comment was created.

is_resolved: a boolean flag indicating whether the issue or query raised by the comment has been resolved.

is_deleted: a boolean flag indicating whether the comment has been deleted (i.e., soft deletion)

Table 2 shows exemplary data field entries for an exemplary model wrapper and an exemplary file.

TABLE 2

Exemplary Data Field Entries for a Comment Record

| | For an Exemplary Wrapper | For an Exemplary File |
|---|---|---|
| id | rckq4n4l | uRrCCpfz |
| created_by_id | hZ7vQSqk | tFbgwky3 |
| artifact_id | yufgkxxD | wgsTAX4d |
| folder_id | 6UzM34AG | 7VMTDFG0 |
| comment_type | wrapper | file |
| content | Can you share this output data with Bob in the Aero department? | Change this dimension to 2.05 mm |
| position_x | null | 1 |
| position_y | null | 3 |
| position_z | null | 4 |
| page_num | 1 | 1 |
| updated_at | 2023-10-11 16:00 | 2023-10-12 12:00 |
| created_at | 2023-10-11 15:30 | 2023-10-12 11:30 |
| is_resolved | Yes | No |
| is_deleted | No | No |

Furthermore, in this exemplary embodiment shown in FIG. 29, replies are stored as records in a reply database table with a foreign key that relates the specific reply record with the corresponding parent comment record. An exemplary reply record is shown for illustrative purpose only and may comprise the following data fields. Other additional data fields may be included in reply records implemented in different embodiments of the present invention.

Primary Key (PK): a unique identifier for this record in the reply table

Foreign Key (FK):
    FK1 (comment_id): PK of the parent comment record
    FK2 (created_by_id): uuid linking to a user table record for creating the reply.

content: the actual content or text of the reply updated_at: timestamp indicating when the reply was last updated created_at: timestamp indicating when the reply was created.

is_deleted: a boolean flag indicating whether the reply has been deleted (i.e., soft deletion)

The use of a standalone relational database with foreign keys that link comments to files or folders provides several benefits. First, it allows for a clear and direct connection between a comment and its relevant target data entity. Second, it enables the system to manage comments independently of the files or folders they refer to. Third, it facilitates efficient retrieval and display of comments, as the system can simply follow the foreign key(s) from a comment to its associated file or folder. Furthermore, data entity tables as used herein may be dynamic instead of static, and may be updated as the location of a file or a folder in memory changes, ensuring that the link between a comment and its associated file or folder remains accurate and reliable, even as files or folders are moved, modified, or deleted within the system. Furthermore, when a file-level data entity is duplicated and copied over, associated prior comments may not be duplicated automatically unless authorized by the owner. When a file is duplicated with comments, comment records may be duplicated in the comment table but assigned new PKs, then linked to the duplicated file.

As illustrated by FIG. 29 and Table 2, each comment record may include various properties, attributes, or metadata for each comment. Such attributes include, but are not limited to, the creator/author/contributor of a comment (e.g., as represented by a user ID or user name), the data entity the comment refers to (e.g., as represented by file ID and/or folder ID), a timestamp (e.g., date and time when a comment was created or last updated), a status (e.g., active, resolved, "waiting for response from Reviewer X," etc.), urgency level (e.g., flagged for immediate attention), deadline for resolution (e.g., a target date and/or time), vote of confidence (e.g., options to "agree" or "accept this proposed alternative"; current vote distribution among all participating reviewers), the text of the comment itself, and the like. These additional attributes add depth to the data tracked by the system, facilitating comprehensive comment management, user tracking, and interaction analysis.

Exemplary Use Case: Commenting in a Digital Engineering Workflow

In an exemplary implementation of collaboration using the IDMP, a requirement verification process benefits from comments on individual data artifacts that are resolved collaboratively, while avoiding needing to share entire digital models. An example collaboration process begins with a Company X uploading a digital model file to the IDMP, where it is spliced into a collection of data artifacts, each uniquely assigned their UUIDs and addressable by splice functions via their associated API endpoints. A model splice function generates a specific UUID and version for each data artifact, ensuring precise traceability throughout the process. For secure and efficient sharing, the platform may adjust the fidelity of individual artifacts, with each adjusted version being assigned a new UUID. The tailored data artifact is then shared with a Supplier Y via the IDMP, triggering a notification for review. Supplier Y can insert comments directly into the artifact through the platform, with these comments, attributed to Supplier Y, linked to specific parts, functions, or data components within the digital model. These comments can be stored in a separate database, with their unique UUIDs and additional foreign keys linking back to the relevant model or artifact, thereby maintaining the integrity of the collaboration process. As Company X makes updates in response to the feedback, new versions of the data artifacts are generated, each with its own UUID, preserving a clear version history. Throughout the process, additional comments can be added to annotate changes, linking them to relevant artifacts, models, or stages of the certification workflow, ensuring a structured and transparent feedback loop within the IDMP.

Machine Learning (ML) and Neural Networks

Machine learning (ML) algorithms are characterized by the ability to improve their performance at a task over time without being explicitly programmed with the rules to perform that task (i.e., learn). An ML model is the output generated when a ML algorithm is trained on data. As described herein, embodiments of the present invention use one or more artificial intelligence (AI) and ML algorithms to perform splice function generation, document updating, and/or document generation. Various exemplary ML algorithms are within the scope of the present invention. The following description describes illustrative ML techniques for implementing various embodiments of the present invention.

Neural Networks

Figure 30:
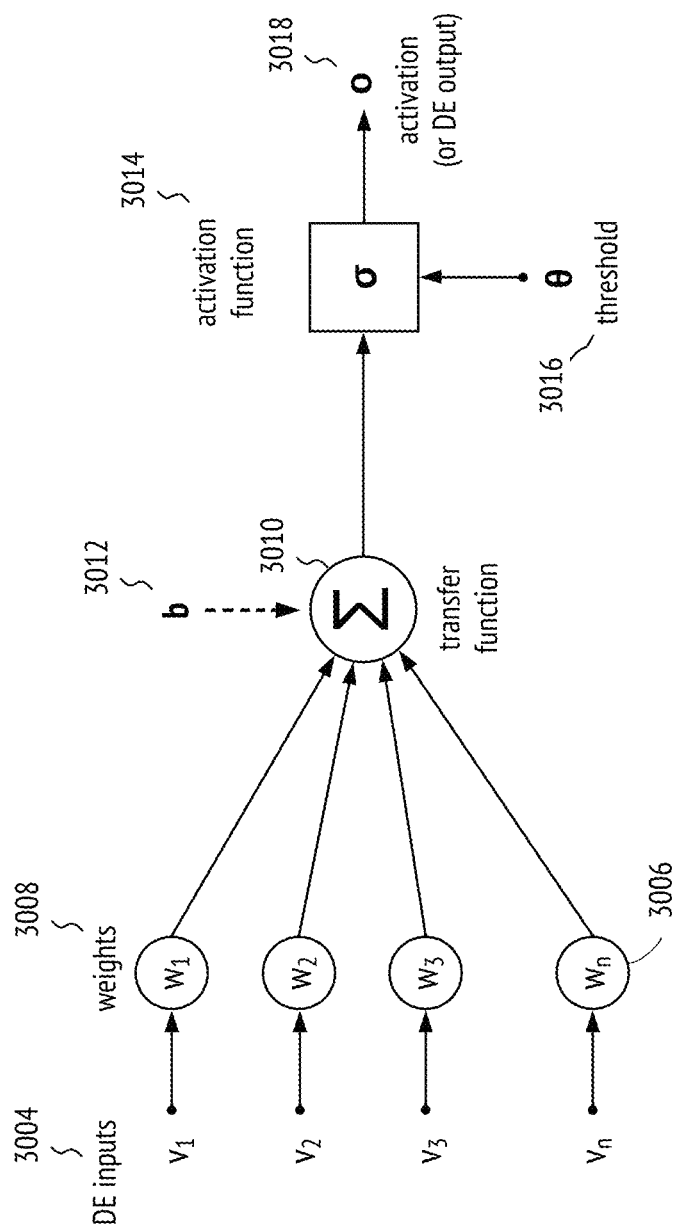
FIG. 30 describes neural network operation fundamentals, in accordance with some embodiments of the present invention.

A neural network is a computational model comprising interconnected units called "neurons" that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 30 describes neural network operation fundamentals, according to exemplary embodiments of the present invention.

FIG. 30 shows a single-layered neural network, also known as a single-layer perceptron. The operation of a single-layered neural network involves the following steps:

1. Input: Receiving a DE input vector v 3004 with elements $v_j$, with $j \in [1, n]$ representing the $j^{th}$ DE input, and where each element of the vector corresponds to an element 3006 in the input layer. For an exemplary neural network model (e.g., to implement a recommender engine) trained to determine whether a splice function is to be recommended based on user input, the DE input vector v 3004 may take the form of a user prompt. A DE input can be a user prompt, a DE document, a DE model, DE program code, system data from the IDMP, and/or any useful form of data in digital engineering.

2. Transfer Function: Multiplying each element of the DE input vector by a corresponding weight $w_j$ 3008. These weighted inputs are then summed together as the transfer function, yielding the net input to the activation function $\Sigma_{j=1}^{n} v_j \cdot w_j$ 3010.

Each neuron in a neural network may have a bias value 3012, which is added to the weighted sum of the inputs to that neuron. Both the weights and bias values are learned during the training process. The purpose of the bias is to provide every neuron with a trainable constant value that can help the model fit the data better. With biases, the net input to the activation function is $\Sigma_{j=1}^{n} \{v_j \cdot w_j\} + b$.

In the exemplary neural network model described above (e.g., to implement a recommender engine), the value of the transfer function 3010 may represent the probability that the target splice function will be recommended.

3. Activation Function: Passing the net input through an activation function 3014. The activation function σ determines the activation value o 3018, which is the output of the neuron. It is typically a non-linear function such as a sigmoid or ReLU (Rectified Linear Unit) function. The threshold θ 3016 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.

In the exemplary neural network model described above (e.g., to implement a recommender engine), the activation function o 3014 may be a ReLU that is activated at a threshold θ 3016 representing the minimum probability for the target splice function to be recommended. Hence, the activation function 3014 will yield a positive recommendation when the recommendation likelihood exceeds the threshold θ 3016.

4. Output: The activation value o 3018 is the output of the activation function. This value is what gets passed on to the next layer in the network or becomes the final DE output in the case of the last layer. In the exemplary neural network model described above (e.g., to implement a recommender engine), the activation value o 3018 is a DE output that is a boolean or binary parameter taking a positive value when the target splice function is to be recommended and a negative value otherwise. A DE output can be a DE document, a DE model, DE program code, or any useful form of data in digital engineering.

In the exemplary neural network discussions of FIG. 30, examples are provided with respect to a particular recommender engine implementation using neural networks. Analogous approaches can be used to implement the generator engine and any other NN-based components of the systems and subsystems described herein.

Figure 31:
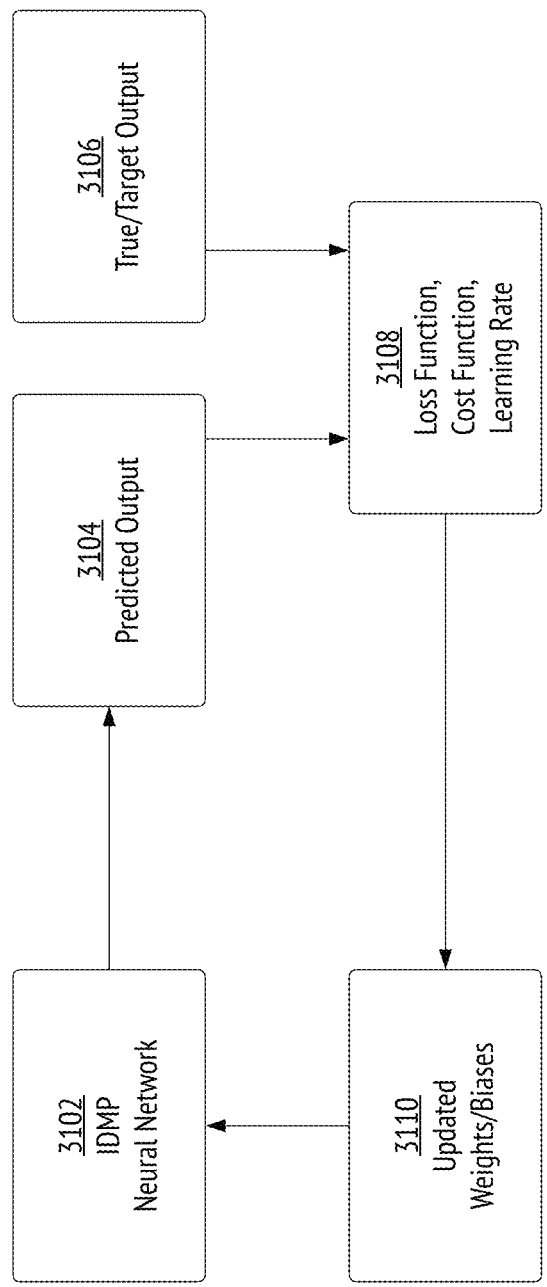
FIG. 31 shows an overview of an IDMP neural network training process, in accordance with some embodiments of the present invention.

FIG. 31 shows an overview of an IDMP neural network training process, according to exemplary embodiments of the present invention.

The training of the IDMP neural network involves repeatedly updating the weights and biases 3110 of the network to minimize the difference between the predicted output 3104 and the true or target output 3106, where the predicted output 3104 is the result produced by the network when a set of inputs from a dataset is passed through it. The predicted output 3104 of an IDMP neural network 3102 corresponds to the DE output 3018 of the final layer of the neural network. The true or target output 3106 is the true desired result. The difference between the predicted output and the true output is calculated using a loss function 3108, which quantifies the error made by the network in its predictions.

The loss function is a part of the cost function 3108, which is a measure of how well the network is performing over the whole dataset. The goal of training is to minimize the cost function 3108. This is achieved by iteratively adjusting the weights and biases 3110 of the network in the direction that leads to the steepest descent in the cost function. The size of these adjustments is determined by the learning rate 3108, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

For an IDMP neural network model 3102 based on the exemplary neural network model (e.g., to implement a recommender engine) discussed above in the context of FIG. 30, and trained to determine whether a target splice function is to be recommended based on user instructions:
- the weights and biases 3110 are the IDMP neural network's hyperparameters that get updated at each iteration of the training process, as discussed in the context of FIG. 30,
- the predicted output 3104 is the binary prediction on whether the target splice function is to be recommended based on a sample user prompt, (or a normalized score ranking prioritizing the order of splice functions to be displayed to the user),
- the true/target output 3106 is the correct decision (i.e., sample ground truth output) on whether to recommend the target data based on the sample user prompt,
- the loss function 3108 is the difference between the evaluation and the true output (e.g., a binary error indicating whether the IDMP neural network's decision was correct),
- the cost function 3108 is the average of all errors over a training dataset including sample user prompts and corresponding binary recommendations on the target splice function, and
- the learning rate 3108 is the rate at which the cost function 3108 in consecutive training epochs approaches a pre-specified tolerable cost function.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 3110 of the network based on the error (e.g., cost function) 3108 of the output. After forward propagation through the IDMP neural network 3102, the output 3104 of the network is compared with true output 3106, and the error 3108 is calculated. This error is then propagated back through the network, starting from the output layer and moving towards the input layer. The weights and biases 3110 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

Figure 32:
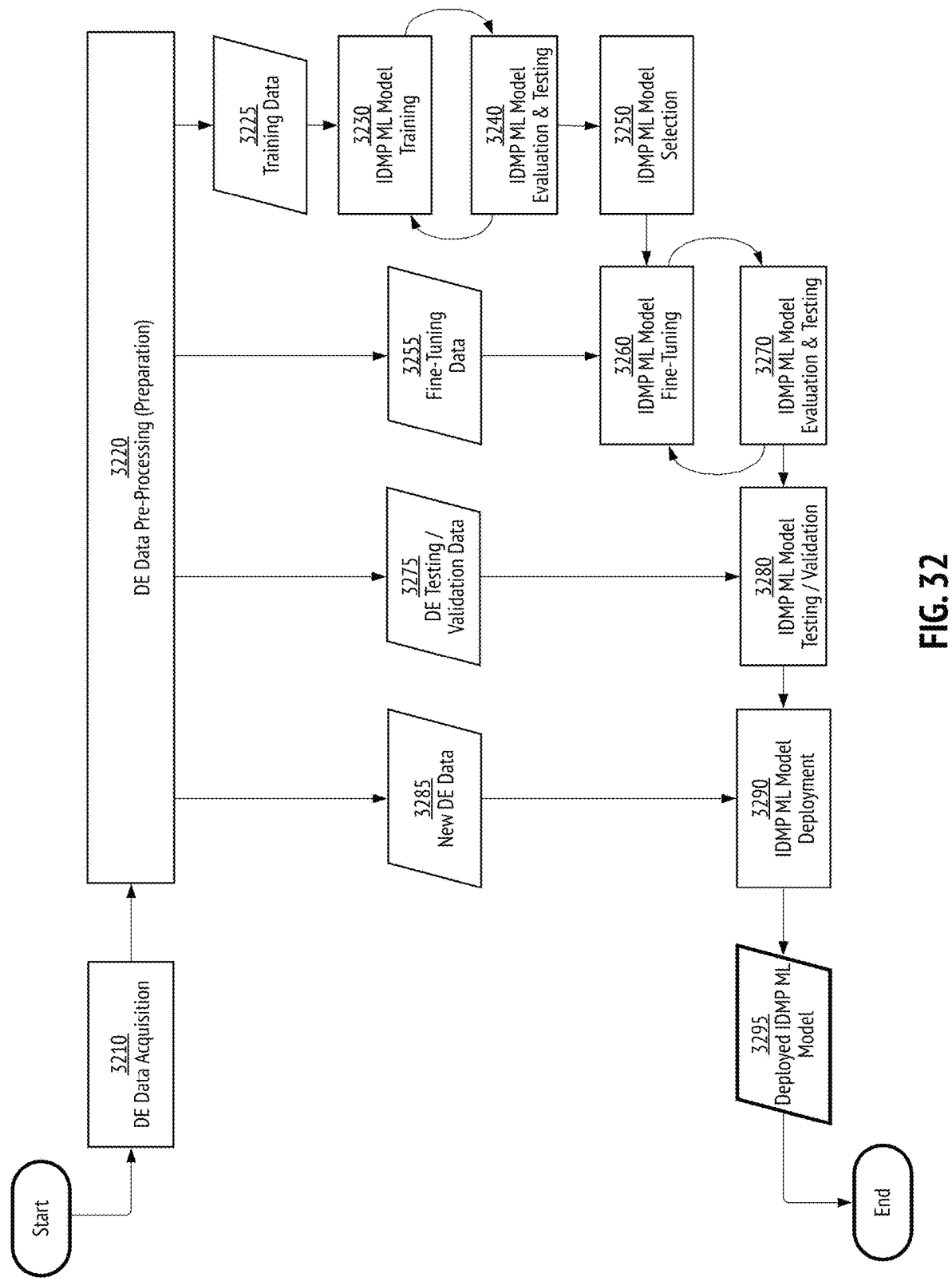
FIG. 32 is an illustrative flow diagram showing the different phases and datasets involved in training an IDMP machine learning model, in accordance with some embodiments of the present invention.

FIG. 32 provides additional details on the training process or an IDMP machine learning model, according to exemplary embodiments of the present invention.

Transformer Model Architecture

The transformer architecture is a neural network design that was introduced in the paper "*Attention is All You Need*" by Vaswani et al. published in June 2017 (available at https://arxiv.org/abs/1706.03762), and incorporated herein by reference as if fully set forth herein. Large Language Models (LLMs) heavily rely on the transformer architecture.

The architecture (see FIG. 1 in Vaswani et al.) is based on the concept of "attention", allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens". This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding", transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding". Therefore, the training of a neural network and its evaluation (i.e., its use upon deployment) both occur within the embeddings space.

In this document, the processes of tokenization, encoding, decoding, and de-tokenization may be assumed. In other words, the processes described below occur in the "embeddings space". Hence, while the tokenization and encoding of training data and input prompts may not be represented or discussed explicitly, they may nevertheless be implied. Similarly, the decoding and de-tokenization of neural network outputs may also be implied.

Training and Fine-Tuning Machine Learning (ML) Modules

FIG. 32 is an illustrative flow diagram showing the different phases and datasets involved in training an IDMP ML model, according to exemplary embodiments of the present invention.

The training process starts at step 3210 with DE data acquisition, retrieval, assimilation, or generation. At step 3220, acquired DE data are pre-processed, or prepared. At step 3230, the IDMP ML model is trained using training data 3225. At step 3240, the IDMP ML model is evaluated, validated, and tested, and further refinements to the IDMP ML model are fed back into step 3230 for additional training. Once its performance is acceptable, at step 3250, optimal IDMP ML parameters are selected.

Training data 3225 is a dataset containing multiple instances of system inputs (e.g., user inputs, user prompts, input DE documents and/or templates, etc.) and correct outcomes (e.g., data field, document section, documents, specific splice function scripts etc.). It trains the IDMP ML model to optimize the performance for a specific target task, such as the prediction of a specific target output data field within a specific target document. In FIG. 32, training data 3225 may also include subsets for validating and testing the IDMP ML model, as part of the training iterations 3230 and 3240. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 3225 may be expanded via a document database augmentation process.

In some embodiments, an additional fine-tuning 3260 phase including iterative fine-tuning 3260 and evaluation, validation, and testing 3270 steps, is carried out using fine-tuning data 3255. Fine-tuning in machine learning is a process that involves taking a selected 3250 pre-trained model and further adjusting or "tuning" its parameters to better suit a specific task or fine-tuning dataset 3255. This technique is particularly useful when dealing with deep learning models that have been trained on large, general training datasets 3225 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 3225, such as ImageNet (available at https://image-net.org/) for image recognition tasks. The model's existing weights, which have been learned from the original training, serve as the starting point. During fine-tuning, the model is trained further on a new fine-tuning dataset 3255, which may contain different classes or types of data than the original training set. This additional training phase allows the model to adjust its weights to better capture the characteristics of the new fine-tuning dataset 3255, thereby improving its performance on the specific task it is being fine-tuned for.

In some embodiments, additional test and validation 3280 phases are carried out using DE test and validation data 3275. Testing and validation of a ML model both refer to the process of evaluating the model's performance on a separate dataset 3275 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the IDMP ML model is trained 3230, selected 3250, and optionally fine-tuned 3260 and validated/tested 3280, the process ends with the deployment 3290 of the IDMP ML model. Deployed IDMP ML models 3295 usually receive new DE data 3285 that was pre-processed 3280.

In machine learning, data pre-processing 3220 is tailored to the phase of model development. During model training 3230, pre-processing involves cleaning, normalizing, and transforming raw data into a format suitable for learning patterns. For fine-tuning 3260, pre-processing adapts the data to align with the distribution of the specific targeted task, ensuring the pre-trained model can effectively transfer its knowledge. Validation 3280 pre-processing mirrors that of training to accurately assess model generalization without leakage of information from the training set. Finally, in deployment 3290, pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models—A Transformative Reading List*", by S. Raschka (posted Feb. 7, 2023, available at https://sebastianraschka.com/blog/2023/11m-reading-list.html), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances and output instances, or may be generated synthetically by subject matter experts.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be cloud-based, and in direct or indirect communication with, for example, one another over the same or different wired or wireless networks. All of these devices, including servers, clients, and other computing entities or nodes may be run internally by a customer (in various architecture configurations including private cloud), internally by the provider of the IDMP (in various architecture configurations including private cloud), and/or on the public cloud.

Figure 33:
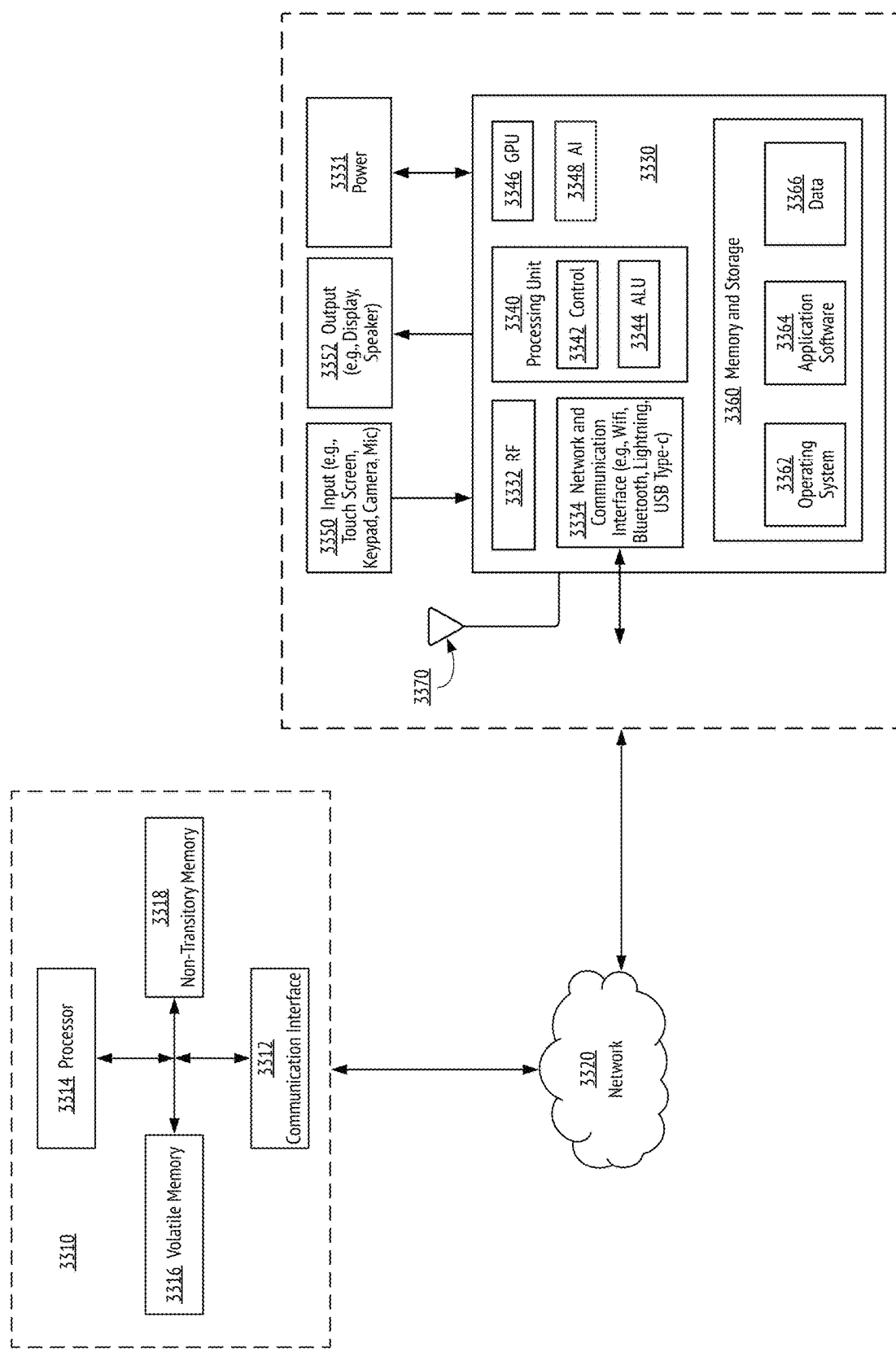
FIG. 33 provides illustrative schematics of a server (management computing entity) and a client (user computing entity) used for documentation within an IDMP, in accordance with some embodiments of the present invention.

FIG. 33 provides illustrative schematics of a server (management computing entity) 3310 connected via a network 3320 to a client (user computing entity) 3330 used for documentation within an IDMP, according to some embodiments of the present invention. While FIG. 33 illustrates the various system entities as separate, standalone entities, the various embodiments are not limited to this particular architecture. Additionally, the terms "client device", "client computing entity", "edge device", and "edge computing system" are equivalent and are used interchangeably herein.

Exemplary Management Computing Entity

An illustrative schematic is provided in FIG. 33 for a server or management computing entity 3310. In general, the terms computing entity, computer, entity, device, system, and/or similar words used herein interchangeably may refer to, for example, one or more cloud servers, computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, crawling, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably), as they are used in a digital engineering process.

In one embodiment, management computing entity 3310 may be equipped with one or more communication interfaces 3312 for communicating with various computing entities, such as by exchanging data, content, and/or information (similar terms used herein interchangeably) that can be transmitted, received, operated on, processed, displayed, stored, and/or the like. For instance, management computing entity 3310 may communicate with one or more client computing devices such as 3330 and/or a variety of other computing entities. Network or communications interface 3312 may support various wired data transmission protocols including, but not limited to, Fiber Distributed Data Interface (FDDI), Digital Subscriber Line (DSL), Ethernet, Asynchronous Transfer Mode (ATM), frame relay, and data over cable service interface specification (DOCSIS). In addition, management computing entity 3310 may be capable of wireless communication with external networks, employing any of a range of standards and protocols, including but not limited to, general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

As shown in FIG. 33, in one embodiment, management computing entity 3310 may include or be in communication with one or more processors 3314 (also referred to as processors and/or processing circuitry, processing elements, and/or similar terms used herein interchangeably) that communicate with other elements within management computing entity 3310, for example, via a bus. As will be understood, processor 3314 may be embodied in a number of different ways. For example, processor 3314 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. The term circuitry may refer to an entire hardware embodiment or a combination of hardware and computer program products. Thus, processor 3314 may be embodied as integrated circuits (ICs), application-specific integrated circuits (ASICs), field-programmable gate arrays (FPGAs), programmable logic arrays (PLAs), hardware accelerators, other circuitry, and/or the like. As will therefore be understood, processor 3314 may be configured for a particular use or configured to execute instructions stored in volatile or non-volatile (or non-transitory) media 3316 and 3318, or otherwise accessible to processor 3314. As such, whether configured by hardware or computer program products, or by a combination thereof, processor 3314 may be capable of performing steps or operations according to embodiments of the present disclosure when configured accordingly.

In one embodiment, management computing entity 3310 may further include or be in communication with non-transitory memory 3318 (also referred to as non-volatile media, non-volatile storage, non-transitory storage, physical storage media, memory, memory storage, and/or memory circuitry—similar terms used herein interchangeably). In one embodiment, the non-transitory memory or storage may include one or more non-transitory memory or storage media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store cloud storage buckets, databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, management computing entity 3310 may further include or be in communication with volatile memory 3316 (also referred to as volatile storage, memory, memory storage, memory and/or circuitry-similar terms used herein interchangeably). In one embodiment, the volatile storage or memory may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, processor 3314. Thus, the cloud storage buckets, databases, database instances, database management systems, data, applications, programs, program modules, scripts, source code, object code, byte code, compiled code, interpreted code, machine code, executable instructions, and/or the like may be used to control certain aspects of the operation of management computing entity 3310 with the assistance of processor 3314 and an operating system.

Although not shown, management computing entity 3310 may include or be in communication with one or more input elements, such as a keyboard input, a mouse input, a touch screen/display input, motion input, movement input, audio input, pointing device input, joystick input, keypad input, and/or the like. Management computing entity 3310 may also include or be in communication with one or more output elements, also not shown, such as audio output, visual output, screen/display output, motion output, movement output, spatial computing output (e.g., virtual reality or augmented reality), and/or the like.

As will be appreciated, one or more of the components of management computing entity 3310 may be located remotely from other management computing entity components, such as in a distributed system. Furthermore, one or more of the components may be combined and additional components performing functions described herein may be included in management computing entity 3310. Thus, management computing entity 3310 can be adapted to accommodate a variety of needs and circumstances. As will be recognized, these architectures and descriptions are provided for exemplary purposes only and are not limited to the various embodiments.

Exemplary User Computing Entity

A user may be a human individual, a company, an organization, an entity, a department within an organization, a representative of an organization and/or person, an artificial user such as algorithms, artificial intelligence, or other software that interfaces, and/or the like. FIG. 33 further provides an illustrative schematic representation of a client user computing entity 3330 that may be used in conjunction with embodiments of the present disclosure. In various embodiments, computing device 3330 may be a general-purpose computing device with dedicated modules for performing digital engineering-related tasks. It may alternatively be implemented in the cloud, with logically and/or physically distributed architectures.

As shown in FIG. 33, user computing entity 3330 may include a power source 3331, an antenna 3370, a radio transceiver 3332, a network and communication interface 3334, and a processor unit 3340 that provides signals to and receives signals from the network and communication interface. The signals provided to and received may include signaling information in accordance with air interface standards of applicable wireless systems. In this regard, user computing entity 3330 may be capable of operating with one or more air interface standards, communication protocols, modulation types, and access types. More particularly, user computing entity 3330 may operate in accordance with any of a number of wireless communication standards and protocols, such as those described above with regard to management computing entity 3310. Similarly, user computing entity 3330 may operate in accordance with multiple wired communication standards and protocols, such as those described above with regard to management computing entity 3310.

Via these communication standards and protocols, user computing entity 3330 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 3330 may also download changes, add-ons, and updates, for instance, to its firmware, software (e.g., including executable instructions, applications, program modules), and operating system.

In some implementations, processing unit 3340 may be embodied in several different ways. For example, processing unit 3340 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. Further, processing unit 3340 may be embodied as one or more other processing devices or circuitry. The term circuitry may refer to an entirely hardware embodiment or a combination of hardware and computer program products. Thus, processing unit 3340 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 3340 may be configured for a particular use or configured to execute instructions stored in volatile or non-volatile media or otherwise accessible to the processing unit. As such, whether configured by hardware or computer program products, or by a combination thereof, processing unit 3340 may be capable of performing steps or operations according to embodiments of the present invention when configured accordingly.

In some embodiments, processing unit 3340 may comprise a control unit 3342 and a dedicated arithmetic logic unit (ALU) 3344 to perform arithmetic and logic operations. In some embodiments, user computing entity 3330 may comprise a graphics processing unit (GPU) 3346 for specialized parallel processing tasks, and/or an artificial intelligence (AI) module or accelerator 3348, also specialized for applications including artificial neural networks and machine learning. In some embodiments, processing unit 3340 may be coupled with GPU 3346 and/or AI accelerator 3348 to distribute and coordinate digital engineering related tasks.

In some embodiments, computing entity 3330 may include a user interface, comprising an input interface 3350 and an output interface 3352, each coupled to processing unit 3340. User input interface 3350 may comprise any of a number of devices or interfaces allowing computing entity 3330 to receive data, such as a keypad (hard or soft), a touch display, a mic/speaker for voice/speech/conversation, a camera for motion or posture interfaces, and appropriate sensors for spatial computing interfaces. User output interface 3352 may comprise any of a number of devices or interfaces allowing computing entity 3330 to provide information to a user, such as through the touch display, or a speaker for audio outputs. In some embodiments, output interface 3352 may connect computing entity 3330 to an external loudspeaker or projector, for audio and/or visual output. In some embodiments, user interfaces 3350 and 3352 integrate multimodal data in an interface that caters to human users. Some examples of human interfaces include a dashboard-style interface, a workflow-based interface, conversational interfaces, and spatial-computing interfaces. As shown in FIG. 5, computing entity 3330 may also support bot/algorithmic interfaces such as code interfaces, text-based API interfaces, and the like.

User computing entity 3330 can also include volatile and/or non-volatile storage or memory 3360, which can be embedded and/or may be removable. For example, the non-volatile or non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory 3360 may store an operating system 3362, application software 3364, data 3366, databases, database instances, database management systems, data, applications, programs, program modules, scripts, source code, object code, byte code, compiled code, interpreted code, machine code, executable instructions, and/or the like to implement functions of user computing entity 3330. As indicated, this may include a user application that is resident on the entity or accessible through a browser or other user interface for communicating with management computing entity 3310 and/or various other computing entities.

In some embodiments, user computing entity 3330 may include one or more components or functionalities that are the same or similar to those of management computing entity 3310, as described in greater detail above. As will be recognized, these architectures and descriptions are provided for exemplary purposes only and are not limited to the various embodiments.

In some embodiments, computing entities 3310 and/or 3330 may communicate to external devices like other computing devices and/or access points to receive information such as software or firmware, or to send information from the memory of the computing entity to external systems or devices such as servers, computers, smartphones, and the like.

In some embodiments, two or more computing entities such as 3310 and/or 3330 may establish connections using a network such as 3320 utilizing any of the networking protocols listed previously. In some embodiments, the computing entities may use network interfaces such as 3312 and 3334 to communicate with each other, such as by communicating data, content, information, and/or similar terms used herein interchangeably that can be transmitted, received, operated on, processed, displayed, stored, and/or the like.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "processor", "computer," "data processing apparatus", and the like encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, code, program code, and the like) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a backend component, e.g., as an information/data server, or that includes a middleware component, e.g., an application server, or that includes a frontend component, e.g., a client computer having a graphical user interface or a web browser through which a user can interact with an implementation of the subject matter described herein, or any combination of one or more such back end, middleware, or front end components. The components of the system can be interconnected by any form or medium of digital information/ data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "program code," "computer program(s)", "computer code(s)," and the like. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

Terminology

Some illustrative terminologies used with the IDMP are provided below to assist in understanding the present invention, but these are not to be read as restricting the scope of the present invention. The terms may be used in the form of nouns, verbs, or adjectives, within the scope of the definition.

Digital engineering (DE): According to the Defense Acquisition University (DAU) and the Department of Defense (DOD) Digital Engineering Strategy published in 2018, digital engineering is "an integrated digital approach to systems engineering, using authoritative sources of systems' data and models as a continuum across disciplines to support lifecycle activities from concept through disposal." Digital engineering incorporates digital technological innovations into an integrated, model-based approach that empowers a paradigm shift from the traditional design-build-test methodology of systems engineering to a new model-analyze-build methodology, thus enabling systems design, prototyping, and testing all in a virtual environment.

DE data: Digital engineering (DE) data comprises project management, program management, product management, design review, and/or engineering data.

DE data field: A data field for DE data, for example, in a DE document template.

Phases: The stages within a DE product lifecycle, including but not limited to, stakeholder analysis, concept studies, requirements definition, preliminary design and technology review, system modeling, final design, implementation, system assembly and integration, prototyping, verification and validation on system, subsystem, and component levels, and operations and maintenance.

DE model, also referred to as a "digital model": A computer-generated model that represents characteristics or behaviors of a complex product or system. A DE model can be created or modified using a DE tool, and a DE model may be represented by one or more DE model files. A DE model file is the computer model file created or modified using the DE tool. In the present disclosure, the terms "digital model", "DE model" and "DE model file" may be used interchangeably, as the context requires. A DE model within the IDEP as disclosed herein refers to any digital file uploaded onto the platform, including documents that are appropriately interpreted, as defined below. For example, a computer-aided design (CAD) file, a Systems Modeling Language (SysML) file, a Systems Requirements Document (SDR) text file, and a Neural Network Model JSON file may each be considered a DE model, in various embodiments of the present invention. A DE model may be machine-readable only, may be human-readable as well but written in programming codes, or may be human-readable and written in natural language-based texts. For example, a word-processing document comprising a technical specification of a product, or a spreadsheet file comprising technical data about a product, may also be considered a DE model.

Digital Model: A computer-generated model that represents characteristics or behaviors of a complex product, system, or process. Digital models include DE models but are not limited to the field of digital engineering. For example, digital models include medical model files used to build digital twins of patients (e.g., digital patients), such as clinical documentation, laboratory results, physiological test results, psychological test results, patient communications and reports, patient medical data, health records, remote monitoring data, and the like. Digital models also include the financial models used to build digital twins of financial assets, such as enterprise data, business financial data, process data (e.g., manufacturing, logistics, sales, supply chain), research results, etc. Other examples of digital models are also within the scope of the present invention, for example, scientific models, geophysical models, climate models, biological models, biochemical models, chemical models, drug models, petrochemical models, oceanographic models, business process models, management science models, economic models, econometric models, sociological models, population dynamics models, socioeconomic models, planetary science models, mining models, mineral models, metallurgical models, supply chain logistics models, manufacturing models, and so on. Digital models include one or more digital artifacts, where each digital artifact is accessible with a security network. A model file can be created or modified using a software tool. A model file within the Interconnected Digital Model Platform (IDMP) as disclosed herein refers to any digital file uploaded onto the platform. All the terms and concepts defined above and included herein, including model splicing, model splices, and software-defined digital threads, apply in the context of the digital model and within the context of the IDMP.

Interconnected Digital Engineering Platform (IDEP), also referred to as a "Digital Engineering and Certification Ecosystem": According to the DAU, a "DE ecosystem" is the "interconnected infrastructure, environment, and methodology (process, methods, and tools) used to store, access, analyze, and visualize evolving systems' data and models to address the needs of the stakeholders." Embodiments of the IDEP as disclosed herein comprise software platforms running on hardware to realize the aforementioned capabilities under zero-trust principles. A DE and certification ecosystem performs verification and validation tasks, defined next. An IDEP is a type of Interconnected Digital Model Platform (IDMP), defined below. In general, any reference to an IDEP in the specification and drawings can be considered equivalent to a reference to an IDMP, and vice versa.

Interconnected Digital Model Platform (IDMP): Embodiments of the IDMP as disclosed herein include interconnected infrastructure, environment, and methodology (process, methods, and tools) used to store, access, analyze, visualize, and modify data and digital models associated with a product or system. In some embodiments, IDMPs include software platforms running on hardware to realize the aforementioned capabilities under zero-trust principles. Specifically, an embodiment of the IDMP is a software platform that interconnects a plurality of spliced model files through one or more software-defined digital threads.

Verification: According to the DAU, verification "confirms that a system element meets design-to or build-to specifications. Through the system's life cycle, design solutions at all levels of the physical architecture are verified through a cost-effective combination of analysis, examination, demonstration, and testing." Verification refers to evaluating whether a product, service, or system meets specified requirements and is fit for its intended purpose, checking externally against customer or stakeholder needs. For example, in the aerospace industry, a verification process may include testing an aircraft component to ensure it can withstand the forces and conditions it will encounter during flight.

Validation: According to the DAU, validation is "1) the review and approval of capability requirement documents by a designated validation authority. 2) The process by which the contractor (or as otherwise directed by the DoD component procuring activity) tests a publication/technical manual for technical accuracy and adequacy. 3) The process of evaluating a system or software component during, or at the end of, the development process to determine whether it satisfies specified requirements." Thus, validation refers to evaluating whether the overall performance of a product, service, or system is suitable for its intended use, including its compliance with regulatory requirements, and its ability to meet the needs of its intended users, checking internally against specifications and regulations. For example, for an industrial product manufacturing, a validation process may include consumer surveys that inform product design, modeling and simulations for validating the design, prototype testing for failure limits and feedback surveys from buyers.

Common Verification & Validation (V&V) products: Regulatory and certification standards, compliances, calculations, and tests (e.g., for the development, testing, and certification of products and/or solutions) are referred to herein as "common V&V products."

DE tool: A tool or DE tool is a DE application software (e.g., a CAD software), computer program, and/or script that creates or manipulates a DE model during at least one stage or phase of a product lifecycle. A DE tool may comprise multiple functions or methods.

Application Programming Interface (API): A software interface that provides programmatic access to services by a software program, thus allowing application software to exchange data and communicate with each other using standardized requests and responses. It allows different programs to work together without revealing the internal details of how each works. A DE tool is typically provided with an API library for code-interface access.

Script: A sequence of instructions that is interpreted and run within or carried out by another program, without compilation into a binary file to be run by itself through a computer processor without the support of other programs.

API scripts: Scripts that implement particular functions available via the IDEP as disclosed herein. An API script may be an API function script encapsulated in a model splice, or a "digital thread orchestration script," "orchestration script," "digital thread script," or "platform script," that orchestrates a workflow through a digital thread built upon interconnected model splices.

Platform API or ISTARI API: A library of API scripts available on the IDEP as disclosed herein.

API function scripts, "splice functions," "splice methods," "ISTARI functions," or "function nodes": A type of API scripts. When executed, an API function script inputs into or outputs from a DE model or DE model splice. An "input" function, input method, or "input node" allows updates or modifications to an input DE model. An "output" function, output method, or "output node" allows data extraction or derivation from an input DE model via its model splice. An API function script may invoke native API function calls of native DE tools, where the terms "native" and "primal" may refer to existing DE model files, functions, and API libraries associated with specific third-party DE tools, including both proprietary and open-source ones.

Endpoints: an endpoint in the context of software and networking is a specific digital location or destination where different software systems communicate with each other. It enables external systems to access the features or data of an application, operating system, or other services. An API endpoint is the point of interaction where APIs receive requests and return data in response. A software development kit (SDK) endpoint or SDK-defined endpoint similarly provides a service handle for use with an SDK. References to API endpoints in the present disclosure are equally applicable to SDK endpoints.

Artifact: According to the DAU, a digital artifact is "an artifact produced within, or generated from, a DE ecosystem" to "provide data for alternative views to visualize, communicate, and deliver data, information, and knowledge to stakeholders." In the present disclosure, a "digital artifact" or "artifact" is an execution result from an output API function script within a model splice. Multiple artifacts may be generated from a single DE model or DE model splice.

Model splice: Within the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. The splice functions provide unified and standardized input and output API endpoints for accessing and manipulating the DE model data. The DE model data are model-type-specific, and a model splice is associated with model-type-specific input and output schemas. One or more different model splices may be generated from the same input DE model file(s), based on the particular user application under consideration, and depending on data access restrictions. In some contexts, the shorter terms "splice", "wrapper", and/or "graft" are used to refer to spliced, wrapped, and/or grafted DE models.

Model representation: Within the present disclosure, "model representation" of a given DE model includes any embodiment of the engineering model in the form of DE model file(s), model splices, or collections of digital artifacts derived from the DE model. In some embodiments, a DE model representation comprises model-type-specific locators to DE model data and metadata, potentially including standardized input and output API endpoints for accessing and manipulating the DE model data. Discussions related to the usage of model splices in the present disclosure are applicable to any other forms of model representation as well.

Model splicing or DE model splicing: A process for generating a model splice from a DE model file. DE model splicing encompasses human-readable document model splicing, where the DE model being spliced is a human-readable text-based document.

Model splicer: Program code or script (uncompiled) that performs model splicing of DE models. A DE model splicer for a given DE model type, when applied to a specific DE model file of the DE model type, retrieves, extracts, or derives DE model data associated with the DE model file, generates and/or encapsulates splice functions and instantiates API endpoints according to input/output schemas.

Model splice linking: Generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first and a second splice (e.g., input splice functions from both model splices are called upon). In the present disclosure, "model linking" and "model splice linking" may be used interchangeably, as linked model splices map to correspondingly linked DE models.

Digital thread, Software-defined digital thread, Software-code-defined digital thread, or Software digital thread: According to the DAU, a digital thread is "an extensive, configurable and component enterprise-level analytical framework that seamlessly expedites the controlled interplay of authoritative technical data, software, information, and knowledge in the enterprise data-information-knowledge systems, based on the digital system model template, to inform decision makers throughout a system's lifecycle by providing the capability to access, integrate, and transform disparate data into actionable information." Within the IDEP as disclosed herein, a digital thread is a platform script that calls upon the platform API to facilitate, manage, or orchestrate a workflow through linked model splices to provide the aforementioned capabilities. That is, a digital thread within the IDEP is a computer-executable script that connects data from one or more DE models, data sources, or physical artifacts to accomplish a specific mission or business objective, and may be termed a "software-defined digital thread" or "software digital thread" that implements a communication framework or data-driven architecture that connects traditionally siloed DE models to enable seamless information flow among the DE models via model splices. In various embodiments, a digital thread associated with a digital twin is configured to execute a scripted workflow associated with the digital twin.

Tool linking: Similar to model splice linking, tool linking generally refers to jointly accessing two or more DE tools via model splices, where model splice functions that encapsulate disparate DE tool functions are called upon jointly to perform a DE task.

Zero-trust security: An information security principle based on the assumption of no implicit trust between any elements, agents, or users. Zero trust may be carried out by implementing systematic mutual authentication and least privileged access, typically through strict access control, algorithmic impartiality, and data isolation. Within the IDEP as disclosed herein, least privileged access through strict access control and data isolation may be implemented via model splicing and the IDEP system architecture.

Zero-knowledge approach: A zero-knowledge approach in data operations refers to a method where computational processes and data analyses are conducted such that the underlying data remains completely confidential and undisclosed to the parties performing the operations. This technique enables the validation, aggregation, and processing of data without exposing the actual data content, thereby preserving privacy and confidentiality.

Hyperscale capabilities: The ability of a system architecture to scale adequately when faced with massive demand.

IDEP enclave or DE platform enclave: A central command hub responsible for the management and functioning of DE platform operations. An enclave is an independent set of cloud resources that are partitioned to be accessed by a single customer (i.e., single-tenant) or market (i.e., multi-tenant) that does not take dependencies on resources in other enclaves.

IDEP exclave or DE platform exclave: A secondary hub situated within a customer environment to assist with customer DE tasks and operations. An exclave is a set of cloud resources outside enclaves managed by the IDEP, to perform work for individual customers. Examples of exclaves include virtual machines (VMs)

and/or servers that the IDEP maintains to run DE tools for customers who may need such services.

Digital twin: According to the DAU, a digital twin is "a virtual replica of a physical entity that is synchronized across time. Digital twins exist to replicate configuration, performance, or history of a system. Two primary sub-categories of digital twin are digital instance and digital prototype." A digital instance is "a virtual replica of the physical configuration of an existing entity; a digital instance typically exists to replicate each individual configuration of a product as-built or as-maintained." A digital prototype is "an integrated multi-physical, multiscale, probabilistic model of a system design; a digital prototype may use sensor information and input data to simulate the performance of its corresponding physical twin; a digital prototype may exist prior to realization of its physical counterpart." Thus, a digital twin is a real-time virtual replica of a physical object or system, with bi-directional information flow between the virtual and physical domains. In some embodiments, a digital twin is a digital replica configured to run in a virtual environment and instantiated through a scripted digital thread, where the digital thread accesses data (e.g., digital artifacts) from a set of digital models through splicing. A digital twin may be instantiated, run, or executed, through a digital thread. Updating a digital twin may include the actions of modifying, deleting, and/or adding data to its twin configuration, to an associated digital thread, or to an associated digital model associated with the updated digital twin. In one embodiment, digital twins may be ephemeral and may have in-built time and space restrictions (see "twin configuration" definition below). In various embodiments, a physical twin is a physical object instantiated in a physical environment based on a set of model files through an MBSE manufacturing and/or prototyping process. In various embodiments, digital twins can be created for both physical products and physical processes. They are not limited to tangible items like machinery or vehicles; they can also simulate complex physical processes, such as manufacturing workflows or supply chain logistics, to improve efficiency and predict outcomes. This flexibility allows digital twins to be applied across various industries and scenarios.

Authoritative twin: A reference design configuration at a given stage of a product life cycle. At the design stage, an authoritative twin is the twin configuration that represents the best design target. At the operational stage, an authoritative twin is the twin configuration that best responds to the actual conditions on the ground or "ground-truths".

Admins or Administrators: Project managers or other authorized users. Admins may create templates in the documentation system and have high-level permissions to manage settings in the IDEP.

Requesters: Users who use the platform for the implementation of the modeling and simulations towards certification and other purposes, and who may generate documentation in the digital documentation system, but do not have admin privileges to alter the required templates, document formats, or other system settings.

Reviewers/Approvers: Users who review and/or approve templates, documents, or other system data.

Contributors: Users who provide comments or otherwise contribute to the IDEP.

AI Agent or Tool Agent: a software entity or module that takes instructions from the enclave and acts on behalf of a user or another program to perform specific tasks or operations related to an AI model or a DE tool. An AI agent or a tool agent may be designed as part of the IDMP but deployed by a customer within a secured customer environment to interface in-between the IDMP, AI models, and/or proprietary tools the customer is licensed for. Inside the customer environment, modular agents interact directly with the domain-specific tools and models to allow for bi-directional data flow across distributed tools.

Security Network: A set of networked resources having identical access control restrictions (e.g., a security level), where each networked resource provides access to one or more digital model files. Information security networks are security networks that are configured to maintain the confidentiality, integrity, and availability of digital information (e.g., digital model data) through cybersecurity measures such as encryption, firewalls, intrusion detection systems, and access controls.

External Feedback: In various embodiments, external feedback comprises feedback data from at least one source external to a given digital twin, including digital twin performance data as received, analyzed or processed by the IDMP. External feedback may also include physical twin performance data, data from a virtual sensor, data from a physical sensor, user input (e.g., a user prompt, or a user response over a GUI), data from a simulation, a product certification file, or a product requirements file. In some embodiments, external feedback may also include feedback from control algorithms or processes in the IDMP that track digital twin performance (e.g., tracking error levels and/or tolerance between digital and corresponding physical twin data). External feedback data can also include feedback data that is external to the IDMP.

Workflow: A workflow typically representing an entire process or sequence of operations that achieves a specific goal or outcome. It encompasses the complete set of activities, from initiation to completion, that are required to fulfill a business process or software function. Workflows often involve multiple participants, systems, or departments and can be complex, involving branching paths, decision points, and parallel processes.

Digital Workflow: A digital workflow refers to a series of digital tasks and process steps that are carried out electronically to achieve a specific outcome. Digital workflows involve the use of digital tools, software applications, and technologies to streamline and manage various activities within an organization or project. They often enable full or partial automation, and typically include elements such as data input, information processing, task assignment, approval processes, and document management, all conducted in a digital environment. A digital workflow may be implemented through an orchestration script or a collection of orchestration scripts.

Tasks and Process Steps: A task is usually a subset of a workflow and represents a discrete unit of work that needs to be completed as part of the larger process. Tasks are more specific and focused than workflows and are often assigned to individual agents. They have defined inputs, outputs, and objectives. Multiple tasks typically make up a workflow, and each task contributes to the overall goal of the workflow. A process step, or simply "step", in turn, is the smallest unit of work within this hierarchy. Process steps are the individual actions or operations that, when combined, form a task. They are highly specific, often atomic actions that represent the most granular level of detail in a workflow. Multiple process steps are usually required to complete a single task, and the successful execution of all steps results in the completion of the task. In the context of digital workflows, the terms "digital task", "digital workflow task", and "digital engineering task" are used interchangeably herein.

Digital Task Implementation: An orchestration script, or a platform script, may be generated over the IDMP to implement a digital task including one or more process steps, where the "implementation" of the digital task through an orchestration script means that the orchestration script includes instructions carrying out each process step required to complete the digital task.

Resource-capability mapping: A framework for identifying and linking available resources with the capabilities they enable or support. An exemplary resource-capability mapping is the IDMP API, or platform API, where the resource refers to third-party tools and functions integrated into and accessible via the IDMP, and where the exemplary capability refers to IDMP functions written in scripts for completing certain tasks using the available resource. Such resource-capability mappings may be used to identify how tool-specific resources such as tool functions, access and control capabilities, human-machine interfaces, processes, and objects can be allocated, invoked, and utilized efficiently and effectively to achieve specific IDMP platform functions or tasks. Resource capability mapping also assists with zero-knowledge implementations where the capability details are available to a user while the specific digital tool resource or its functions are only mapped within the customer environment. Another example of the resource-capability mapping framework is the variable mapping table disclosed herein.

CONCLUSIONS

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like.

The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, process parameters, etc., to provide a thorough understanding of the present invention. The particular features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number ±10%, such that "about 10" would include from 9 to 11. In other exemplary embodiments, the term "about" may include the recited number ±X %, where X is considered the normal variation in said measurement by one of ordinary skill in the art.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. Features of the transitory physical storage medium described may be incorporated into/used in a corresponding method, digital documentation system and/or system, and vice versa.
5
Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, as defined by the claims.

What is claimed is:

1. One or more non-transitory storage media for a digital document review process, the non-transitory storage medium comprising program code executable by a hardware processor, the program code when executed by the hardware processor, causing the processor to:

receive a first sharable input digital model representation of a first digital model in an interconnected digital model platform,
wherein the first sharable input digital model representation comprises access to a first splice function script written in a scripting language,
wherein the first splice function script engages a first digital tool associated with the first input digital model via a first native tool Application Programming Interface (API), and
wherein the first splice function script provides a first addressable model endpoint for externally accessing model data from the first input digital model representation;

receive a second sharable input digital model representation of a second digital model,
wherein the second sharable input digital model representation comprises access to a second splice function script written in the scripting language,
wherein the second splice function script engages a second digital tool associated with the second input digital model via a second native tool API, and
wherein the second splice function script provides a second addressable model endpoint for externally accessing model data from the second input digital model representation;

execute a digital thread script written in the scripting language to generate a first digital artifact and a second digital artifact,
wherein the digital thread script invokes the first addressable model endpoint of the first sharable input digital model representation to execute the first splice function script to engage the first digital tool associated with the first input digital model to generate the first digital artifact, and
wherein the digital thread script invokes the second addressable model endpoint of the second sharable input digital model representation to execute the second splice function script to engage the second digital tool associated with the second input digital model to generate the second digital artifact, and
wherein the second digital tool is not directly interoperable with the first digital tool;

generate a document splice comprising access to a plurality of document subunits,
wherein a first document subunit is written in a natural language and comprises the first digital artifact,
wherein a second document subunit is written in the natural language and comprises the second digital artifact, and
wherein the access to each given document subunit is provided through an externally-accessible document endpoint for the given document subunit;

generate a human-readable document by combining the plurality of document subunits;

generate for presentation on a user interface of the interconnected digital model platform, a view associated with the human-readable document to a user, based on an user authorization result for the user,
wherein the user authorization result comprises selective access rights to the plurality of document subunits, and
wherein the view comprises access to the first digital model representation, access to the second digital model representation, the first digital artifact, the second digital artifact, each of the plurality of document subunits, and the human-readable document;

receive a user input from the user via the user interface; and update, via one of the externally-accessible document endpoints, the document splice based on the user input.

2. The one or more non-transitory storage media of claim 1,
wherein each of the first digital model representation, the second digital model representation, the first digital artifact, the second digital artifact, the plurality of document subunits, the document splice, the human-readable document, and the user input is uniquely identified by a universally unique identifier (UUID),
wherein the first digital artifact comprises the first digital model representation's UUID,
wherein the second digital artifact comprises the second digital model representations' UUID,
wherein the document splice comprises each of the plurality of document subunit's UUID,
wherein the user input is associated with the human-readable document's UUID, and
wherein the access to the first digital model representation, the second digital model representation, the first digital artifact, the second digital artifact, each of the plurality of document subunits, and the human-readable document is provided by their UUIDs.

3. The one or more non-transitory storage media of claim 1, wherein the program code to generate a document splice causes the processor to:
execute the digital thread script to prompt a large language model (LLM)-based artificial intelligence (AI) model to generate the first document subunit written in the natural language and comprising the first digital artifact.

4. The one or more non-transitory storage media of claim 1, wherein the program code to generate the document splice further causes the processor to generate the first document subunit comprising the first digital artifact using an AI module comprising a transformer model.

5. The one or more non-transitory storage media of claim 1, wherein the user is a first user, wherein the user input is a first user input, and wherein the program code further causes the processor to:
generate for presentation on the user interface of the interconnected digital model platform, a second view associated with the human-readable document based on a user authorization result for a second user, wherein the user authorization result for the second user comprises selective access rights to the plurality of document units;

receive, from the second user via the user interface, a second user input related to the human-readable document; and update the document splice based on the second user input.

6. The one or more non-transitory storage media of claim 5, wherein the first user input is an approval decision on the human-readable document, and wherein the program code to generate the second view further causes the processor to:
determine whether or not the first user has approved the human-readable document, wherein the second view comprises an option to approve the human-readable document by the second user after the first user has approved the human-readable document.

7. The one or more non-transitory storage media of claim 1,
wherein the user input is a comment on a digital data entity, and
wherein the program code further comprises program code to:
generate a record comprising the comment, a key corresponding to the digital data entity, and at least one attribute for the comment; and
store the record in a comment table.

8. The one or more non-transitory storage media of claim 1, wherein the user input is a comment, and wherein the program code further causes the processor to add the comment to the document splice.

9. The one or more non-transitory storage media of claim 1, wherein the program code to generate the document splice further causes the processor to:
identify, from a compliance standard, one or more requirements corresponding to the first digital artifact; and
determine whether or not the one or more requirements are satisfied, wherein the first document subunit comprising the first digital artifact further includes an indication of whether or not the one or more requirements have been satisfied.

10. The one or more non-transitory storage media of claim 1, wherein the view comprises an access to the digital thread script.

11. The one or more non-transitory storage media of claim 1, wherein the user interface is a multimodal interface comprising a conversational interface configured to receive a text-based input or a voice-based input, and wherein the user input comprises the text-based input or the voice-based input.

12. The one or more non-transitory storage media of claim 1, wherein the user interface is a multimodal interface comprising a spatial computing interface configured to receive input from at least two different modalities, and wherein the user input comprises input from the at least two different modalities.

13. The one or more non-transitory storage media of claim 1, wherein the program code further causes the processor to update the first input digital model representation based on the user input.

14. A method for a digital document review, comprising:
receiving a first sharable input digital model representation of a first digital model in an interconnected digital model platform,
wherein the first sharable input digital model representation comprises access to a first splice function script written in a scripting language,
wherein the first splice function script engages a first digital tool associated with the first input digital model via a first native tool Application Programming Interface (API), and
wherein the first splice function script provides a first addressable model endpoint for externally accessing model data from the first input digital model representation;
receive a second sharable input digital model representation of a second digital model,
wherein the second sharable input digital model representation comprises access to a second splice function script written in the scripting language,
wherein the second splice function script engages a second digital tool associated with the second input digital model via a second native tool API, and
wherein the second splice function script provides a second addressable model endpoint for externally accessing model data from the second input digital model representation;
executing a digital thread script written in the scripting language to generate a first digital artifact and a second digital artifact,
wherein the digital thread script invokes the first addressable model endpoint of the first sharable input digital model representation to execute the first splice function script to engage the first digital tool associated with the first input digital model to generate the first digital artifact, and
wherein the digital thread script invokes the second addressable model endpoint of the second sharable input digital model representation to execute the second splice function script to engage the second digital tool associated with the second input digital model to generate the second digital artifact, and
wherein the second digital tool is not directly interoperable with the first digital tool;
generating a document splice comprising access to a plurality of document subunits,
wherein a first document subunit is written in a natural language and comprises the first digital artifact,
wherein a second document subunit is written in the natural language and comprises the second digital artifact, and
wherein the access to each given document subunit is provided through an externally-accessible document endpoint for the given document subunit;
generating a human-readable document by combining the plurality of document subunits;
generating for presentation on a user interface of the interconnected digital model platform, a view associated with the human-readable document to a user, based on an user authorization result for the user,
wherein the user authorization result comprises selective access rights to the plurality of document subunits, and
wherein the view comprises access to the first digital model representation, the second digital model representation, the first digital artifact, the second digital artifact, each of the plurality of document subunits, and the human-readable document;
receiving a user input from the user via the user interface; and
updating, via one of the externally-accessible document endpoints, the document splice based on the user input.

15. The method of claim 14,
wherein each of the first digital model representation, the second digital model representation, the first digital artifact, the second digital artifact, the plurality of document subunits, the document splice, the human-readable document, and the user input is uniquely identified by a universally unique identifier (UUID), wherein the first digital artifact comprises the first digital model representation's UUID, wherein the second digital artifact comprises the second digital model representations' UUID, wherein the document splice comprises each of the plurality of document subunit's UUID, wherein the user input is associated with the human-readable document's UUID, and wherein the access to the first digital model representation, the second digital model representation, the first digital artifact, the second digital artifact, each of the plurality of document subunits, and the human-readable document is provided by their UUIDs.

16. The method of claim 14, wherein the first view comprises an access to the digital thread script.

17. One or more non-transitory storage media for a security compliance review process, the non-transitory storage medium comprising program code executable by a hardware processor, the program code when executed by the hardware processor, causing the processor to:

monitor a system log for transaction data related to transactions on one or more digital artifacts, digital models, digital documents, digital thread scripts, and digital workflows on an interconnected digital model platform;

detect one or more potential security threats from the transaction data under a zero-trust security access policy implemented on the digital model platform;

generate a security assessment report from the one or more detected potential security threats;

execute a digital thread script written in a scripting language on the interconnected digital model platform to generate a plurality of digital artifacts from the security assessment report, wherein the digital thread script executes a first splice function script associated with the security assessment report to engage a first digital tool associated with the security assessment report via a first native tool Application Programming Interface (API), wherein the digital thread script executes a second splice function script associated with the security assessment report to engage a second digital tool associated with the security assessment report via a second native tool API, and wherein the second digital tool is not directly interoperable with the first digital tool;

generate a document splice of an input standard document, wherein the document splice comprises access to a plurality of document subunits, and wherein the access to each document subunit is provided through an externally-accessible, addressable document endpoint for the document subunit;

execute the digital thread script to generate a security compliance review document by mapping each of the plurality of digital artifacts generated via execution of the digital thread script to a corresponding document subunit of the document splice of the input standard document, wherein the digital thread script invokes the externally-accessible, addressable document endpoint of the corresponding document subunit;

generate for presentation on a user interface of the digital model platform, a first view associated with the security compliance review document based on a first authorization result for a first user, wherein the first authorization result comprises selective access rights to the plurality of document subunits, and wherein the view comprises access to the detected potential security threats, the security assessment report, each of the plurality of document subunits, and the security compliance review document;

receive, from the first user, a first user input related to the security compliance review document via the user interface;

generate for presentation on the user interface of the digital model platform, a second view associated with the security compliance review document based on a second authorization result for a second user, wherein the second authorization result comprises selective access rights to the plurality of document subunits;

receive, from the second user, a second user input related to the security compliance review document; and generate a security compliance review approval based on the first user input and the second user input.

18. The one or more non-transitory storage media of claim 17, wherein the program code to detect one or more potential security threats from the transaction data causes the processor to analyze the transaction data using an artificial intelligence (AI) model.

* * * * *

UNITED STATES PATENT AND TRADEMARK OFFICE
CERTIFICATE OF CORRECTION

| | | |
|---|---|---|
| PATENT NO. | : 12,488,131 B2 | Page 1 of 1 |
| APPLICATION NO. | : 19/067938 | |
| DATED | : December 2, 2025 | |
| INVENTOR(S) | : Roper, Jr. et al. | |

It is certified that error appears in the above-identified patent and that said Letters Patent is hereby corrected as shown below:

In the Claims

In Claim 16 (Column 113, Line 16), delete "the first view" and replace with -- the view -- therefor.

Signed and Sealed this
Thirteenth Day of January, 2026

John A. Squires
*Director of the United States Patent and Trademark Office*